US007777461B2

(12) United States Patent
Martin et al.

(10) Patent No.: US 7,777,461 B2
(45) Date of Patent: Aug. 17, 2010

(54) POWER SUPPLY AND CONTROLLER CIRCUITS

(75) Inventors: Gary D. Martin, Boxford, MA (US); Praveen K. Jain, Kingston (CA)

(73) Assignee: CHiL Semiconductor Corporation, Tewksbury, MA (US)

( * ) Notice: Subject to any disclaimer, the term of this patent is extended or adjusted under 35 U.S.C. 154(b) by 387 days.

(21) Appl. No.: 11/969,655

(22) Filed: Jan. 4, 2008

(65) Prior Publication Data

US 2008/0157742 A1 Jul. 3, 2008

Related U.S. Application Data

(63) Continuation-in-part of application No. 11/261,661, filed on Oct. 31, 2005, now Pat. No. 7,456,618, and a continuation-in-part of application No. 11/261,660, filed on Oct. 31, 2005, now Pat. No. 7,489,117.

(51) Int. Cl.
*G05F 1/59* (2006.01)

(52) U.S. Cl. ....................................... 323/272

(58) Field of Classification Search ................ 323/272, 323/282, 283, 284, 285, 351
See application file for complete search history.

(56) References Cited

U.S. PATENT DOCUMENTS 5,699,238 A * 12/1997 Lee et al. ............... 363/21.03
6,091,614 A * 7/2000 Malenfant ................. 363/97
6,657,877 B2 * 12/2003 Kashima et al. ........... 363/127
7,035,119 B2 * 4/2006 Koike ..................... 363/19
7,456,618 B2 * 11/2008 Jain et al. ................. 323/272
7,592,789 B2 * 9/2009 Jain ........................ 323/276
7,609,040 B1 * 10/2009 Jain ........................ 323/283
7,623,361 B2 * 11/2009 Basso et al. ............... 363/49
2002/0089860 A1 * 7/2002 Kashima et al. ............ 363/13
2005/0259448 A1 * 11/2005 Koike .................... 363/21.01
2009/0174262 A1 * 7/2009 Martin et al. .............. 307/82

\* cited by examiner

*Primary Examiner*—Adolf Berhane
(74) *Attorney, Agent, or Firm*—Chapin IP Law, LLC; Barry W. Chapin, Esq.

(57) ABSTRACT

A power supply system includes multiple power converter phases. A controller (e.g., a processor device, ASIC) monitors an output voltage generated by a combination of multiple power converter phases that supply power to a load. Based on the monitoring, the controller determines: i) a magnitude of an error signal representing a relative difference between the output voltage and a predetermined setpoint value, and ii) a rate-of-change associated with the output voltage. The controller compares the rate-of-change to threshold criteria. In response to detecting that the rate-of-change associated with the output voltage exceeds a threshold value, the controller adjusts a time of turning on of a phase switch (e.g., a power switch configured to convey an input voltage to an inductor that in turn delivers energy to the load) in one or more of the multiple power converter phases depending on the magnitude of the error signal.

28 Claims, 40 Drawing Sheets

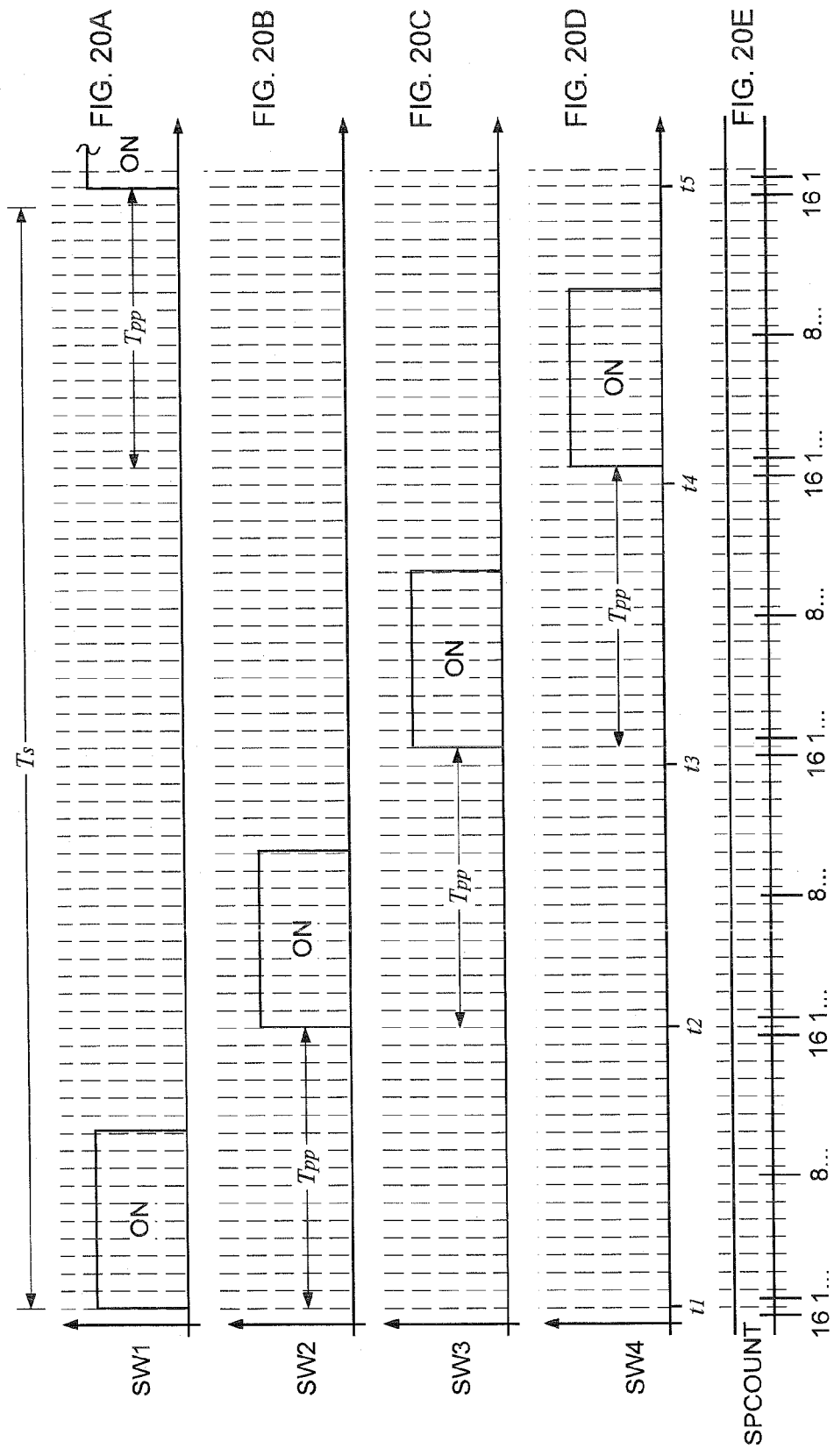

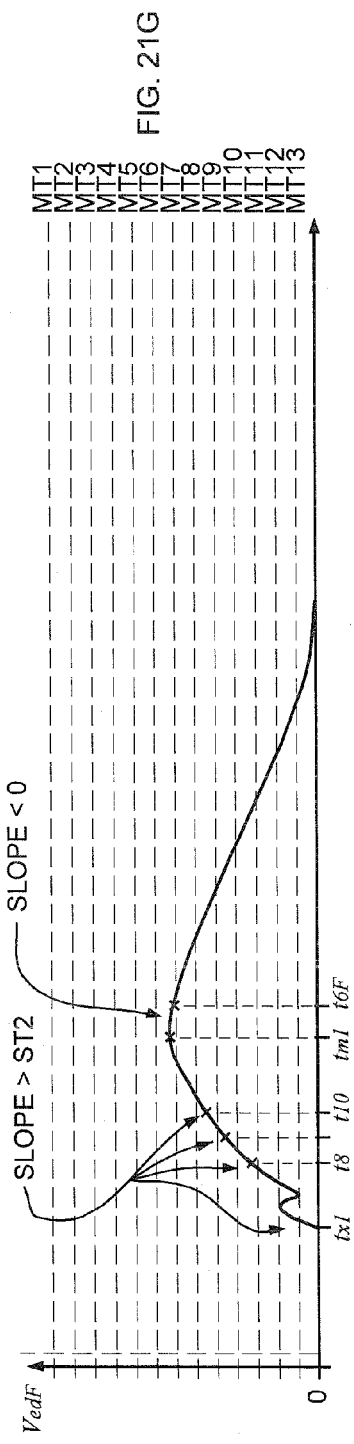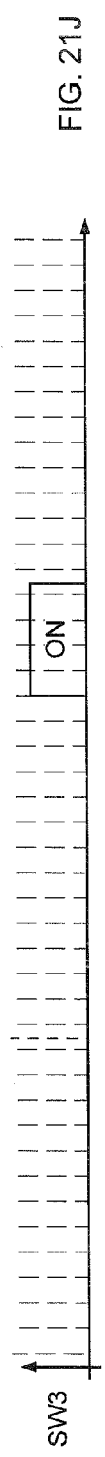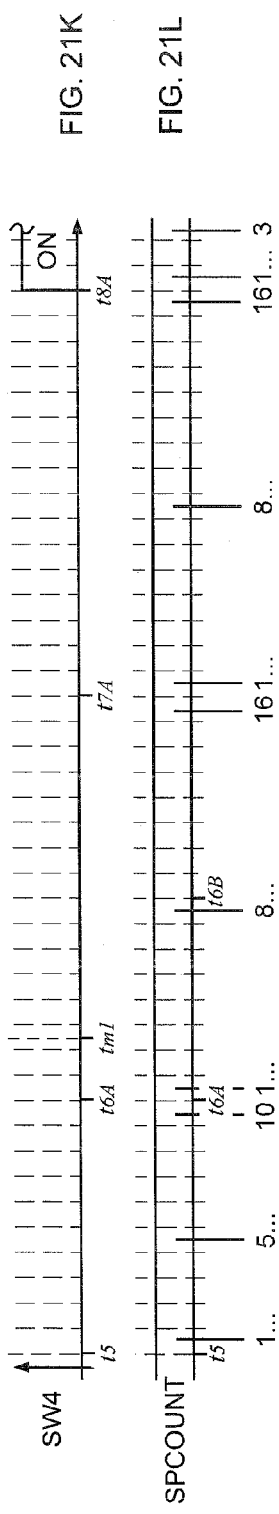

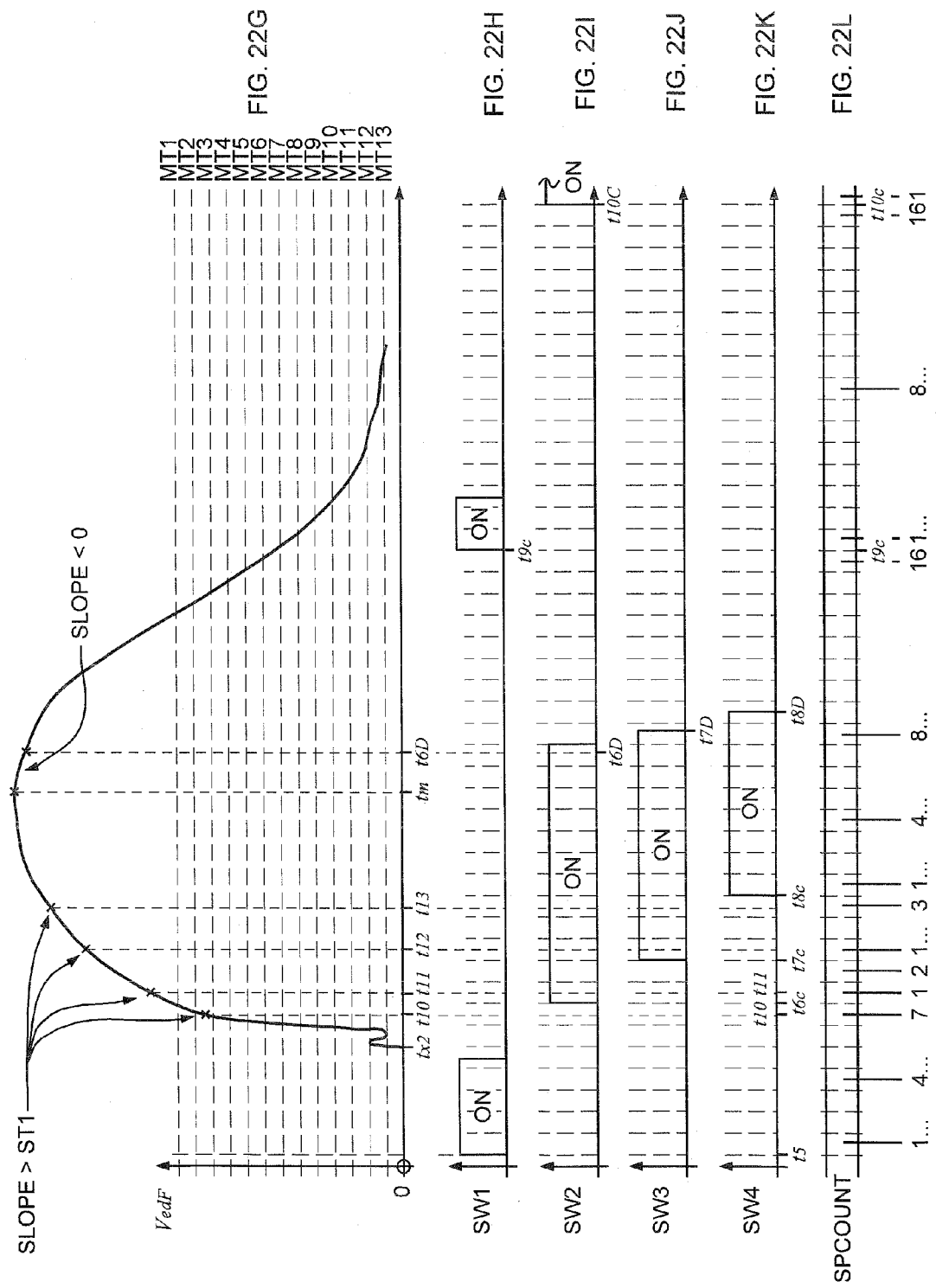

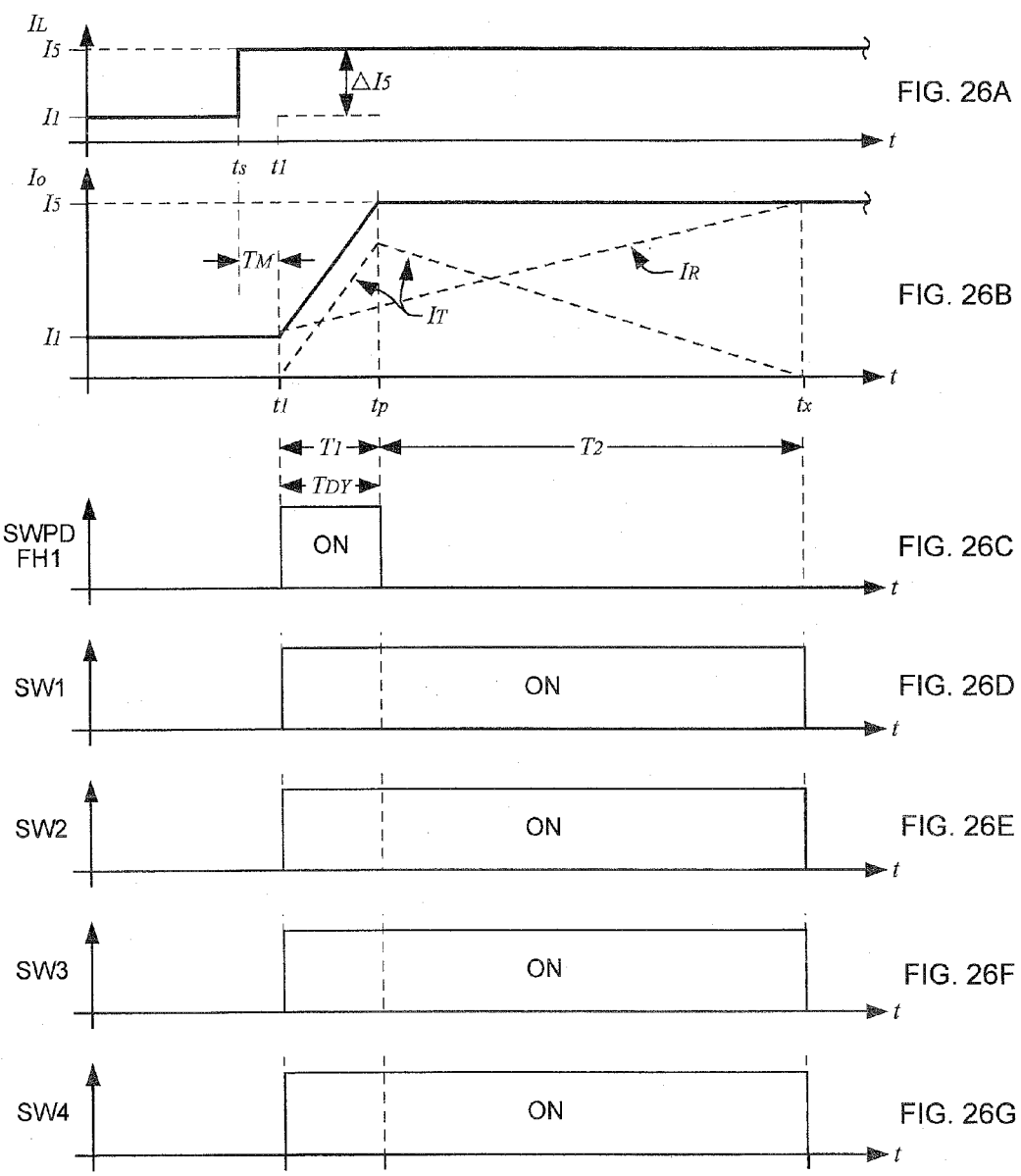

POWER SUPPLY AND CONTROLLER CIRCUITS

RELATED APPLICATIONS

This application is a continuation in part of earlier filed U.S. patent application Ser. No. 11/261,661, entitled "DIGITAL CONTROLLER FOR A VOLTAGE REGULATOR MODULE," filed on Oct. 31, 2005 now U.S. Pat. No. 7,456, 618, the entire teachings of which are incorporated herein by this reference.

This application is also a continuation in part of earlier filed U.S. patent application Ser. No. 11/261,660, entitled "DYNAMIC CONVERSION CIRCUIT FOR A VOLTAGE REGULATOR MODULE," filed on Oct. 31, 2005 now U.S. Pat. No. 7,489,117, the entire teachings of which are incorporated herein by this reference.

This application is related to U.S. patent application Ser. No. 11/969,659 entitled "POWER SUPPLY AND CONTROLLER CIRCUITS," filed on the same day as the present application, the entire teachings of which are incorporated herein by this reference.

This application is related to U.S. patent application Ser. No. 11/969,662 entitled "POWER SUPPLY AND CONTROLLER CIRCUITS," filed on the same day as the present application, the entire teachings of which are incorporated herein by this reference.

BACKGROUND

A voltage regulator module (VRM) is used to regulate a DC voltage supplied to a load, such as microprocessor. A VRM includes a power converter, such as a DC-DC converter, and may include other components such as a controller for controlling operation of the power converter. An example of a DC-DC converter is a synchronous buck converter, as shown in FIG. 1, which has minimal components, and therefore is widely used in VRM applications. In microprocessor applications, the input voltage to the VRM is typically $12V_{DC}$. The output voltage may be $5.0V_{DC}$, $3.3 V_{DC}$, or lower.

As microprocessors become more advanced, required supply voltages become lower. Supply voltages are expected to be as low as $0.5 V_{DC}$ in the near future, which will require currents up to 200 A or more. Currently, the CPU of a typical personal computer operates at 3 GHz, and operating frequencies are expected to reach 10 GHz in the near future.

A consequence of the low supply voltage and high clock frequency is the high slew rate (di/dt) of the load current at power up. For example, when a microprocessor wakes from sleep mode to full operating mode, the step of the output current may be as high as 200 A, with a slew rate of 1,000 A/µs or higher. The slew rate may be over 1,000 A/µs in future designs. The voltage supplied to current microprocessors is required to be regulated within 2%, and 1% for future VRMs ("VRM 9.1 DC-DC converter design guidelines", Intel Order Number 298646-001, January 2002). The absolute value of such voltage regulation is currently 30 mV and 10 mV for future designs.

Such tight voltage regulation is required to maintain normal operation of CMOS transistors in the microprocessor under all conditions. For instance, under worst case (high slew rate of the output current) conditions, the output voltage should not drop by more than 30 mV to avoid abnormal operation of the CPU. However, the voltage drop of VRMs based on existing designs may be so large that the output voltage regulation limit may easily be exceeded.

Various VRM topologies and control methods have been proposed in an attempt to satisfy the transient response requirements of microprocessors. However, such designs are not well-suited to the harsher dynamic requirements of next generation microprocessors.

For example, simply increasing the output capacitance can reduce the output voltage ripple, and also help maintain the output voltage during a sudden load change. However, for a single phase $1.5 V_{DC}/25 A$ VRM, for instance, a design that can meet the steady state and transient voltage regulation specification typically requires at least 5,000 µF output capacitance. Such filter capacitors are bulky and expensive. It is estimated that for a VRM supplying $0.5 V_{DC}$ at 100 A, the required output capacitance would be more than 10,000 µF, and should have considerably lower equivalent series inductance (ESL) and equivalent series resistance (ESR) to be effective during load transients. FIG. 2 (top curve only) shows such a relationship between the output capacitance and load current for typical prior VRMs. Although multiphase topology, which helps to reduce output capacitance, may be used for applications when the load current exceeds 20 A, the value of the capacitance is still exceedingly high at high load current.

Reducing the output inductance of a buck converter can improve its dynamic response. However, the inductance can not be reduced unbounded, otherwise the output voltage ripple will increase above acceptable limits (e.g., above 10 mV for next generation microprocessors). The increased voltage ripple will in turn reduce the room for the output voltage drop during load dynamics. In addition, a larger ripple current through the filter inductor implies a larger RMS current through the power switches, which will reduce the overall efficiency of the VRM under steady state operation. Moreover, even though the inductance can be reduced for a faster dynamic response, it is not enough to provide adequate response speed for future microprocessors if the output capacitance is required to be small to reduce cost and to satisfy size and volume constraints.

Multiphase interleaved VRM topology provides two or more power converters in parallel and shares the same output capacitors among converters. In each of the power converters (or each phase), the filter inductor can be smaller than that of a single phase VRM to achieve a faster dynamic response. The large output voltage ripple in each phase due to the small inductance can be cancelled by the ripple of other phases. The more phases are in parallel, the smaller the ripple will be, but at the expense of increased circuit cost. Multiphase topology can therefore enhance the output current capability of a VRM. However, if the output current can be provided by a single phase VRM or a VRM with fewer phases, then adopting a multiphase topology or adding extra phases in parallel solely for the purpose of reducing the ripple voltage adds considerable complexity, size, cost. More importantly, it is very difficult for a conventionally-controlled multiphase VRM to achieve the dynamic response required by future microprocessors, without having very large output capacitance.

Current mode control has a faster dynamic response than that of conventional voltage mode control in situations where only a small perturbation such as a small load change occurs. However, its dynamic performance is not superior to that of voltage mode control when a large transient occurs. More importantly, in current mode control, the current is detected by employing a sensing resistor or a current transformer. However, for an output current of 100 A or higher, it would be impractical to use a resistor to accurately and efficiently sense the current. On the other hand, a current transformer is bulky and the sensed current must be averaged, resulting in further increases in the reaction time and drop in the output voltage when a large load step happens.

The voltage droop control method takes advantage of the upper and lower limits of the VRM output voltage to gain more room for dynamic responses. When the load current is low, the reference voltage is set to be higher than the nominal value but still within the specified upper limit. When a load step-up happens, the output voltage will drop but will have more room to drop than if it were starting from the nominal value. When the load current is high, the reference voltage is set to be low; thus when a load step-down happens, the output voltage has more room for the overshoot. However, this small room is far from being enough to handle the harsh dynamic requirements of next generation microprocessors. Moreover, the voltage droop control method also requires current sensing, which again is not very practical, as discussed above.

Operating the power converter at a very high frequency will improve the dynamic response of a VRM having a very small output capacitance. However, design of an efficient power converter operating at a very high frequency is difficult. Further, the efficiency of a power converter decreases eventually to an unacceptable or unsatisfactory level as its operating frequency increases. In general, increasing the switching frequency of a power converter solely for the purpose of improving the dynamic performance is not an optimum solution.

A stepping inductor method for fast transient response of switching converters is disclosed in U.S. Pat. No. 6,188,209, issued Feb. 13, 2001 to Poon et al. Relative to the basic buck converter, this design requires significantly more circuit components, which may be difficult and expensive to implement in a multiphase interleaved VRM, because all of the components need to be repeated for each phase. Moreover, the control circuit for load transients is analog based and the output voltage is compared to fixed hysteresis reference voltages to trigger and terminate the transient operation of the converter independently of the load current conditions. This implies that the transient circuit works the same way for a 25%, 50%, and 100% load step, for instance. Therefore, the voltage response during a load transient is not regulated and may exceed the specified limits of the output voltage during many load conditions.

A transient override circuit is proposed in U.S. Pat. No. 6,696,882, issued Feb. 24, 2004 to Markowski et al. This circuit detects the load voltage level to trigger a transient operation mode of the VRM. In transient operation mode, the power switch of a buck converter is forced to be turned on, and the synchronous power switch of the buck converter is turned off, to override the current through the output inductor. However, the circuit and control method are analog based, and, importantly, are not able to regulate the output voltage during the transient.

Peterchev et al. ("Architecture and IC implementation of a digital VRM controller", *IEEE Transactions on Power Electronics*, 18 (1):356-364, 2003) relates to a digital controller for a dc-dc switch mode converter. However, the reference focuses on digital control only for normal steady state operation. Saggini et al. ("An innovative digital control architecture for low-voltage, high current dc-dc converters with tight voltage regulation", *IEEE Transactions on Power Electronics*, 19 (1):210-218, 2004) addresses digital control for improving the transient response of a VRM. However, this reference teaches a variable frequency control method in combination with voltage droop control, which requires accurate sensing of the load current. U.S. Patent Publication No. 2004/015098, published Aug. 5, 2004, relates to a digital controller for a VRM; however, some of the operations carried out by this controller are effected through analog circuitry.

SUMMARY

Techniques discussed herein deviate with respect to conventional power supply systems. For example, embodiments of the present disclosure provide novel and useful ways for more effectively delivering power to a load.

More specifically, according to one embodiment herein, a power supply system includes multiple power converter phases. A controller (e.g., a processor device) monitors an output voltage generated by a combination of multiple power converter phases that supply power to a load. Based on the monitoring, the controller determines: i) a rate of change associated with the output voltage, and ii) a magnitude of an error signal representing a relative difference between the output voltage and a predetermined setpoint value. The controller compares the rate of change to threshold criteria. In response to detecting that the rate of change of the output voltage exceeds a threshold value, the controller adjusts a time of turning on of a phase switch (e.g., a power switch configured to convey an input voltage to an inductor that in turn delivers power to the load) in one or more of the multiple power converter phases depending on the magnitude of the error signal.

In one embodiment, the controller turns on the phase switches in a non-overlapping sequence (e.g., one phase at a time) in designated windows of time. A time between the turning-on of successive (power) switches in the power converter phases under steady-state load conditions can define a phase period (e.g., a time window) in which one of the multiple phases is turned on. In response to detecting that the rate-of-change associated with the output voltage exceeds a threshold criteria (e.g., as a result of a transient load condition in which the load requires more current), the controller can modify a length or duration of the phase period (e.g., window) depending on the magnitude of the error signal such that, e.g., a next power converter phase (and corresponding power switch) in a sequence is more quickly activated to convey power to the load. For example, if the controller detects a condition in which an error in the output voltage of the multiple power converter phases exceeds a threshold value, the controller can immediately respond by turning on a next power converter phase (and corresponding switch) in the sequence sooner rather than waiting until the end of a current window period as originally scheduled to account for a change in load conditions.

In this way, embodiments herein include a controller configured to modify the time of turning on of a phase switch of first power converter phase relative to a time of turning on of a phase switch of another power converter of the multiple power converters phases.

A process of monitoring the output voltage and initiating earlier activation of switches in the multiple power converter phases to account for transient conditions can be repeated over time. For example, a power supply system can be configured to create a sequence of windows (e.g., time durations or phase periods) in which a corresponding power switch in a power converter phase can be activated. In other words, each window can be allocated or assigned for use by a different power converter phase. The controller activates each power converter phase in the appropriate window so that a burden of supplying current or power to the load is distributed amongst the power converter phases.

If the controller detects a transient condition with respect to the load (e.g., a condition in which the rate of change of the output voltage exceeds a threshold value), the controller can modify (e.g., reduce) a duration of a current window (e.g., phase period) for purposes of more quickly turning on a next power converter phase to account for the transient condition. If necessary, the controller can modify or shorten the time windows for successive periods to more quickly turn on switches in following windows to account for the change in load.

According to one embodiment, the decision by the controller whether to reduce a window size (and whether to turn on a next power converter phase sooner) can depend on whether the change in the output voltage exceeds a threshold value. Additionally, an amount of time by which the controller reduces a current window to more quickly turn on a next phase (e.g., via activation of the power switch in the phase) in the sequence can depend on a magnitude of the error in the output voltage relative to a predetermined setpoint.

Accordingly, based on detection of successively larger magnitudes of the error signal (e.g., based on larger load transients) over multiple error signal sampling cycles, the controller can turn on a phase switch of a respective power converter phase at an earlier time relative to a time at which a phase switch of a last activated power converter phase of the multiple power converter phases was turned on.

Thus, prior to detecting that the rate of change of the output voltage exceeds a threshold value, the controller can initiate activation of the multiple power converter phases in a sequential manner one after another to maintain the output voltage within a desired range. After detecting presence of a transient condition based on detecting that the rate of change of the output voltage or error voltage (e.g., a difference between the output voltage and a predetermined setpoint value) exceeds a threshold value as discussed above, the controller modifies a duration of the activation windows (e.g., phase period) to more quickly turn on a phase to compensate for the transient load condition.

Note that, when necessary, the controller can initiate turning on multiple power converter phases at the same time in order to compensate for the transient load condition. For example, the controller can be configured to activate (e.g., turn on) a phase switch in a first power converter phase at least for a portion of time when another one of the multiple phases switches in another one of the multiple power converter phases is also activated to deliver current to the load. As previously discussed, the controller can initiate such an action to maintain the output voltage within an acceptable voltage range during a transient increase in the load current. In other words, instead of activating power switches in the phases in respective windows one after the other, the controller can activate power switches in multiple phases to be on at the same time to account for a transient load condition.

During a condition in which the controller initiates turning on multiple power converter phases at the same time, the controller can initiate delaying activation of each additional power converter phase (that needs to be activated) depending on how many of the multiple power converter phases are currently activated.

For example, assume that the controller activates a first power converter phase of the multiple power converter phases to account for a change in the load as discussed above. After activating the first power converter phase, assume that the controller detects that the rate of change of the output voltage still exceeds a threshold value. After waiting a first delay time, the controller can initiate activation of a second power converter phase to supply power to the load. After activating the second power converter phase, assume that the controller detects that the rate of change of the output voltage still exceeds the threshold value. After waiting a second delay time (e.g., where the second delay time is greater than the first delay time), the controller can initiate activation of a third power converter phase to supply power to the load.

Thus, according to embodiments herein, each additional power converter phase can be activated earlier in time by different amounts depending on how many power converter phases are activated.

Note that embodiments disclosed herein can include any type of computerized device (e.g., a controller, microprocessor, digital signal processor, etc.) or the like configured with software and/or circuitry (e.g., a processor) to process any or all of the method operations disclosed herein. In other words, embodiments herein can include a computerized device such as a computer or any type of processor that is programmed or configured to support operations such as those explained herein.

Other embodiments disclosed herein can include software programs or sets of computer executable instructions to perform the steps and operations summarized above and disclosed in detail below. For example, one such embodiment can include a computer program product (e.g., a tangible computer-readable medium) including computer program logic encoded thereon that, when executed by a computerized device (e.g., a processor), programs the processor to perform any of the operations disclosed herein. Such arrangements can be provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware (e.g., instructions) or other such configurations can be installed onto a computerized device to cause the computerized device to perform the techniques explained herein as embodiments disclosed herein.

Yet other embodiments of the present disclosure include software programs to perform the method embodiment and operations summarized above and disclosed in detail below in the Detailed Description section of this disclosure. More specifically, one embodiment herein includes a computer program product (e.g., a computer-readable medium). The computer program product includes computer program logic (e.g., software instructions) encoded thereon. Such computer instructions can be executed on a computerized device to support task management and related functions according to embodiments herein. For example, the computer program logic, when executed on at least one processor associated with a computing system, causes the processor to perform the operations (e.g., the methods) indicated herein as embodiments of the present disclosure. Such arrangements as further disclosed herein can be provided as software, code and/or other data structures arranged or encoded on a computer readable medium such as an optical medium (e.g., CD-ROM), floppy or hard disk, or other medium such as firmware or microcode in one or more ROM or RAM or PROM chips or as an Application Specific Integrated Circuit (ASIC). The software or firmware or other such configurations can be installed on a computerized device to cause one or more processors in the computerized device to perform the techniques explained herein.

As an example, a more particular technique of the present disclosure is directed to a computer program product or controller that includes a computer readable medium having instructions stored thereon to facilitate execution of tasks such as those as described herein. For example, the instructions and their corresponding execution can support operations of: i) monitoring an output voltage generated by a combination of multiple power converter phases that supply power to a load; ii) based on the monitoring, detecting: i) a rate of change associated with the output voltage, and ii) a magnitude of an error signal representing a relative difference between the output voltage and a predetermined setpoint value; and iii) in response to detecting that the rate of change of the output voltage exceeds a threshold value, adjusting a time of turning on of a phase switch in a first power converter phase of the multiple power converter phases depending on the magnitude of the error signal.

The instructions as discussed above can be stored in a repository such as memory accessible by a processor. During operation, the processor accesses the memory and initiates execution of the instructions to carry out the embodiments as described herein.

It should be understood that the different embodiments disclosed herein may be embodied strictly as a software program, as software and hardware, or as hardware alone. The features disclosed herein may be employed in technology developed, manufactured and sold by CHiL Semiconductor Corporation, of Tewksbury, Mass.

Note that each of the different features, techniques, configurations, etc. discussed herein can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below. Although not exhaustive, the claims section also provides different perspectives of the invention based on matter recited in the specification.

Based on techniques (e.g., systems, devices, circuits, configurations, arrangements, instructions, software, methods, processes, etc.) such as those discussed above as well as those discussed below in the detailed description below, a power supply circuit including multiple power converter phases according to certain embodiments herein produces a reliable output voltage even under transient load conditions.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

FIGS. 20A, 20B, 20C, 20D, and 20E are examples of timing diagrams illustrating activation of phases in a multiphase converter according to embodiments herein.

FIGS. 21A, 21B, 21C, 21E, 21F, 21G, 21H, 21I, 21J, 21K and 21L are example timing diagrams illustrating occurrence of a transient load condition according to embodiments herein.

FIGS. 22A, 22B, 22C, 22E, 22F, 22G, 22H, 22I, 22J, 22K and 22L are example timing diagrams illustrating occurrence of a transient load condition according to embodiments herein.

FIGS. 26A, 26B, 26C, 26D, 26E, 26F, and 26G are example timing diagrams illustrating occurrence of a transient load condition and activation of multiple power converter phases according to embodiments herein.

DETAILED DESCRIPTION OF PREFERRED EMBODIMENTS

Figure 1:
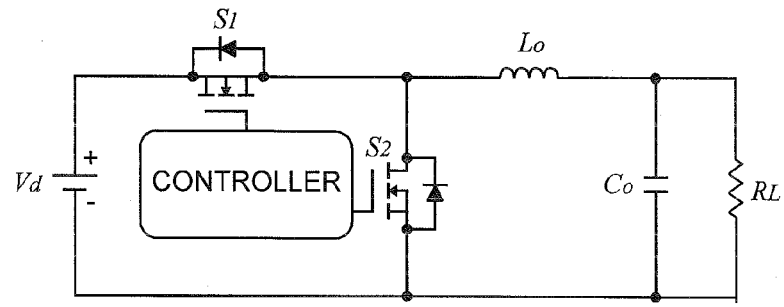
FIG. 1 is a schematic diagram of a prior art single phase synchronous buck converter.
Figure 2:
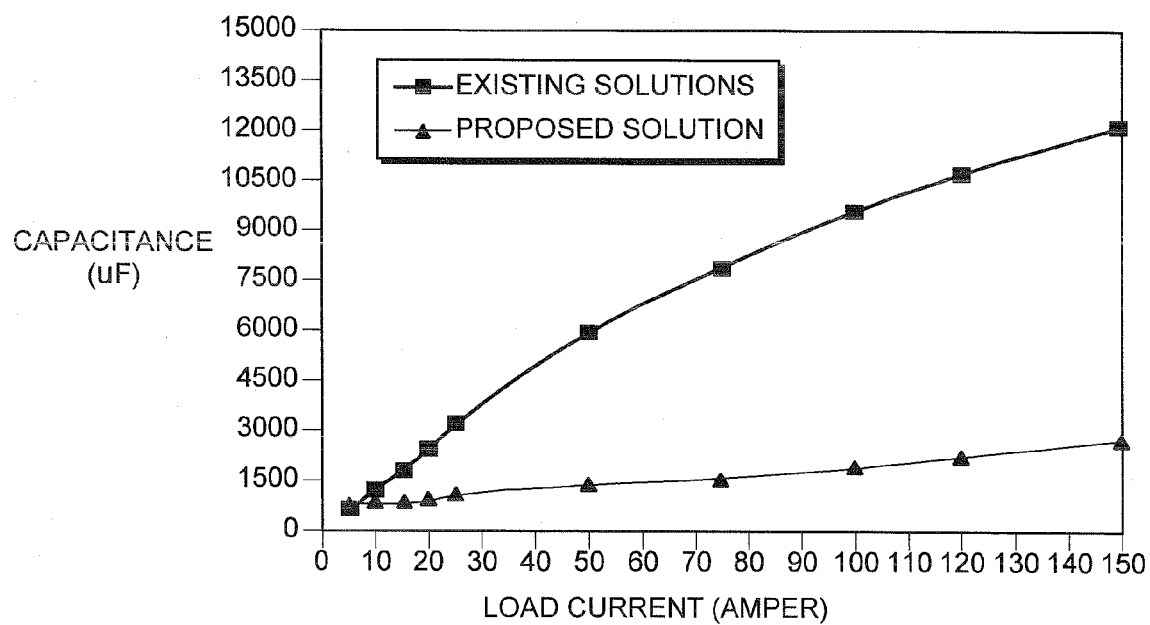
FIG. 2 is a plot of estimated output capacitance versus load current for the invention compared with prior art VRMS.

Digital control has many advantages over analog control in a power converter. One of the most important advantages relates to the flexibility of digital control. Various control schemes that may be difficult to implement in analog control become feasible when digital control is applied. However, no previous digital controllers for VRMs provide satisfactory solutions for transient load conditions, particularly the transients expected to be presented by future microprocessors.

A digital controller as described herein provides a novel solution to the control of a VRM during transients, by employing voltage sensing of the VRM output voltage. By sensing minute changes in the output voltage, and relating the output voltage to the corresponding required output current (e.g., predicting the output current from the sensed output voltage), a digital controller as described herein may respond quickly to sudden demands for current that would otherwise result in a substantial drop in output voltage, compromising performance of the load. As exemplified by the embodiments described herein, the digital controller of the invention has been optimized to work in conjunction with either a dynamic conversion circuit and a power converter, such as a buck converter, or with only a power converter, as use of the digital controller to enhance performance of any power converter may be accomplished with only minor modifications to the embodiments described herein.

By implementing the digital controller and the control method of the invention, increasing the switching frequency of the DC-DC converter is unnecessary, because an increased switching frequency does not further improve the dynamic response of the converter. The switching frequency may be kept below 500 kHz to achieve a higher efficiency and at the same time maintain a very fast dynamic response with greatly reduced output capacitance. The greatly reduced output capacitance enables the use of ceramic capacitors, which are smaller in size and have a much smaller equivalent series resistance (ESR). Consequently, a VRM according to the invention will require less space on a PCB and cost will be reduced. Further, the digital implementation offers great flexibility, including external programming, such that no analog components need to be substituted under different conditions. Factors such as tolerance, temperature, and aging of components have no effect on components such as the compensator due to the digital implementation.

According to one aspect of the invention there is provided a voltage regulator module, comprising a power conversion circuit, an optional dynamic conversion circuit, and a digital controller. The load may be of various devices that require tight output voltage regulation. A microprocessor is an example of such a load due to its large current consumption and the extreme load transients it presents to the VRM. For these reasons, a microprocessor will be considered as the load for the VRM in this disclosure. The power conversion circuit of the VRM is power converter, typically a DC-DC voltage converter such as a synchronous buck converter, but is not limited thereto. Other isolated and non-isolated power converter circuits, such as, for example, boost and buck-boost, may also be used. The power converter may be single phase or multiphase interleaved to regulate the output voltage, depending on how much load current is needed.

The dynamic conversion circuit is a circuit capable of responding rapidly to sudden changes in the load connected to the VRM output. A sudden change in the load, such as an increase in current consumption, results in a decrease in the output voltage from its nominal value. Such a load transient represents a deviation in output current of the power converter from its operating current (i.e., steady-state current). The dynamic conversion circuit responds to such transient decreases in output voltage by transiently increasing the output current of the DC-DC converter, thereby preventing further decreases in output voltage. Thus, the dynamic conversion circuit substantially improves the voltage regulation of the VRM under dynamic load conditions. An example of a suitable dynamic conversion circuit is set forth in our co-pending U.S. patent application Ser. Nos. 11/261,660 and 11/261,661, the entire teachings of are incorporated herein in their entirety. Such a dynamic conversion circuit may be used with any isolated or non-isolated switching DC-DC converter, such as, for example, buck, boost, or buck-boost, single phase or multiphase interleaved, for any load requiring tight voltage regulation under both steady-state and transient conditions.

Figure 3:
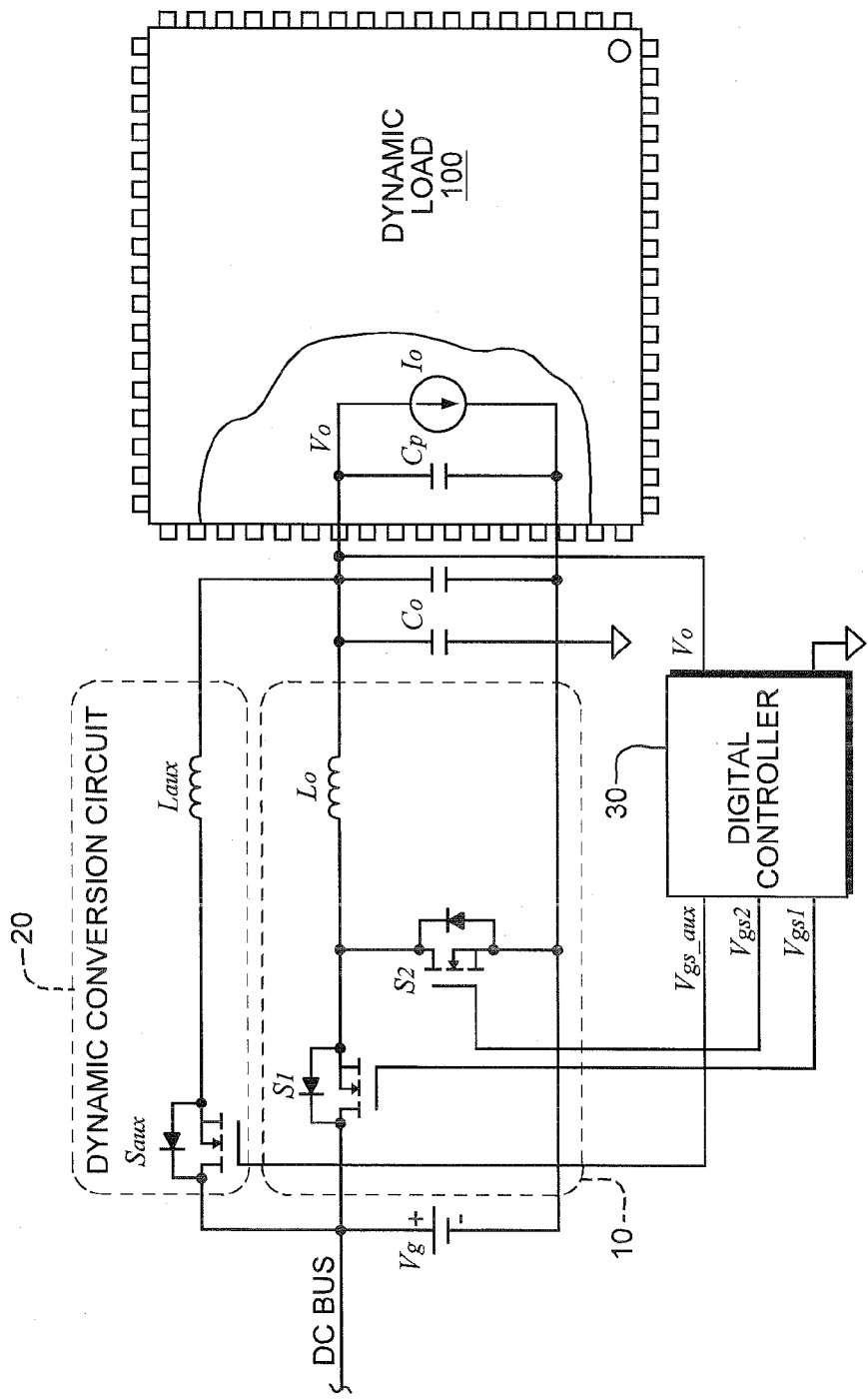
FIG. 3 is a schematic diagram of a single phase VRM circuit including a digital controller according to an embodiment of the invention.

In the embodiment shown in FIG. 3, a VRM comprises a buck converter 10, an optional dynamic conversion circuit 20, and a digital controller 30, and the VRM is connected to a dynamic load 100 (e.g., a microprocessor). The power converter 10 includes switching power devices $S_1$ and $S_2$, and an output filter inductor $L_o$ and capacitor $C_o$. The dynamic conversion circuit 20 includes an auxiliary power switch $S_{aux}$ in series with an auxiliary inductor $L_{aux}$. The dynamic conversion circuit is connected in parallel with the power converter 10. In an alternative embodiment the dynamic conversion circuit 20 may be connected in parallel with only the output inductor $L_o$ of the power converter 10. In either case, the same configuration of digital controller 30 may be used. Further, other configurations of a dynamic conversion circuit may also be used. In various embodiments, the digital controller 30 may be used to control the gate signal of the power switches $S_1$ and/or $S_2$, and/or the auxiliary switch $S_{aux}$ during transients.

Figure 4:
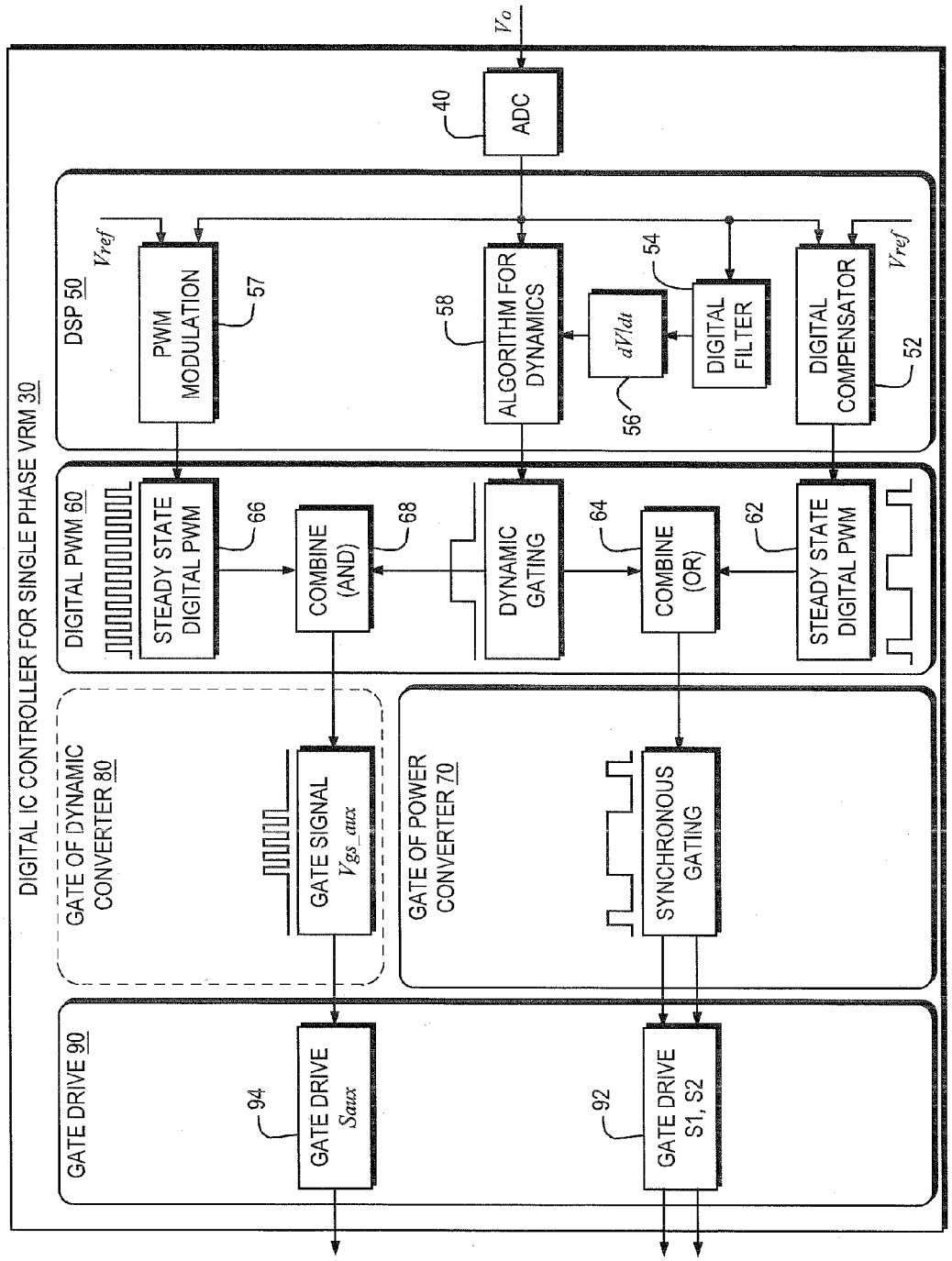
FIG. 4 is a block diagram of a digital controller for a single phase VRM according to the invention.

A block diagram of an embodiment of the digital controller 30 is shown in FIG. 4. This embodiment is for a single phase VRM having a single power converter, for example a buck converter, and an optional dynamic conversion circuit. The digital controller includes six major function blocks:

1) An analog-to-digital converter (ADC) 40 which senses the output voltage at the load and converts the analog voltage signal into digitized bits. The speed and resolution (e.g., number of bits) of the ADC may be specified according to the required performance and the design considerations. For example, we have found that a 12-bit, 125 MSPS (mega samples per second), ADC, part number AD9433-125, available from Analog Devices, is suitable.

2) A digital signal processing (DSP) block 50, which receives the output from the ADC 40 and processes the sampled output voltage based on an algorithm, an example of which is discussed below with respect to FIG. 6;

3) A digital pulse width modulation (PWM) block 60, which receives output from the DSP block 50 and generates a digitized PWM gate signals for the switches of the power converter, and optionally for an auxiliary circuit if used;

4) A gate of power converter block 70, which generates the synchronous gate signals for the two switches of the power converter;

5) An optional gate of dynamic converter block 80, which generates the gate signal for the switch $S_{aux}$ of the optional dynamic conversion circuit; and 6) A gate drive block 90, which drives the gates of the switches of the power converter and optional dynamic conversion circuit with the synchronized PWM signals.

Preferably the digital controller is implemented as an integrated circuit. However, the ADC and the gate drive block may not be necessarily integrated into the digital controller device; that is, either one or both of these blocks may be physically discrete from such an integrated digital controller device.

Figure 5:
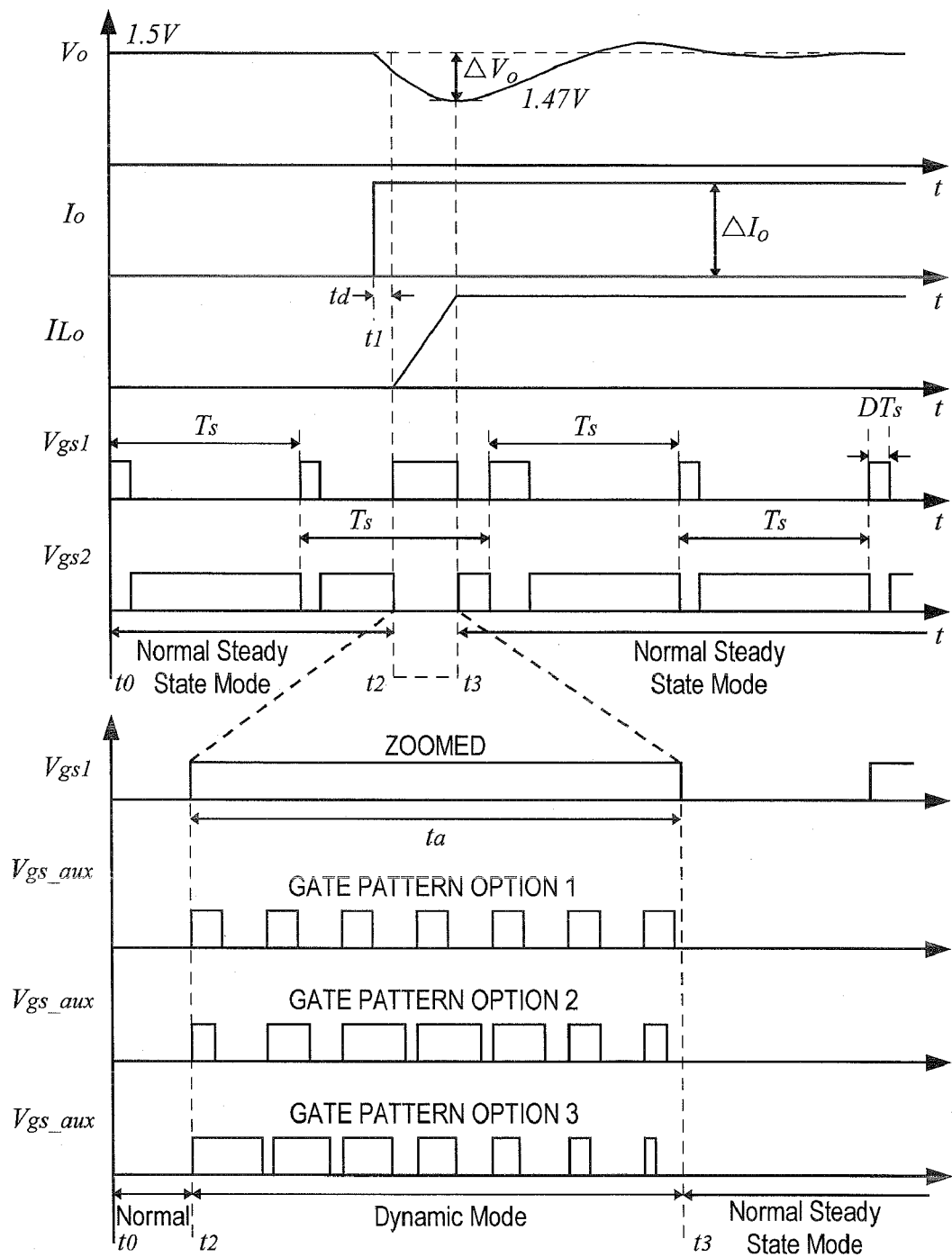
FIG. 5 is a plot of single phase VRM waveforms during the steady state and during a transient state according to the control method of the invention.

Operation of the digital controller will now be described with reference to FIGS. 4 and 5. In normal steady state operation of the power converter or when the load transient is within certain range, the pulse width of the gate signal is determined by the sensed load voltage, the nature of the power converter, and the way the system is compensated. The sampled load voltage is compared with a reference voltage in the DSP block 50 shown in FIG. 4. The discrete error signal is compensated by the compensator 52, which may be a digitally-implemented compensator such as, for example, a proportional integral derivative (PID), PI, Type II, Type III, or proportional/differential (PD) lead compensator. The compensator is selected according to the power converter requirements, based on voltage mode control. The synchronous gate signals of one phase of the converter during steady state are shown in FIG. 5 at time $t_o$-$t_2$ and $t_3$-$\infty$, Normal Steady State Mode. The frequency of the gate signal is always fixed. The pulse width or duty cycle of the gate signal is also stabilized during steady state operation. At time $t_1$ in FIG. 5, a load transient occurs. After a delay of $t_d$, at time $t_2$, the converter enters Dynamic Mode. The delay $t_d$ is due to the sampling and processing time of the digital controller. Once a load transient occurs, the duty cycle of the synchronous gate signal is adjusted, determined by how the system is compensated, and relates to factors such as the crossover frequency and the gain of the compensator. However, without the digital controller of the invention, the change in the duty cycle of the gate signal is not sufficient to handle a dramatic load change. Under such circumstances the occurrence of the next gate pulse is limited by the switching frequency of the power converter, and does not occur fast enough to transfer power to the output and minimize the output voltage drop during a load transient.

In the DSP block 50 in FIG. 4, the sampled load voltage is sent to a digital filter 54 to filter out noise and then is processed at 56 to obtain the derivative of the output voltage. The derivative of the output voltage is sent to the Algorithms for Dynamics function 58 for further processing. The algorithm for dynamic function block 58 determines when the dynamic mode will be triggered and terminated. The steady state PWM gating and the dynamic gating generated in the digital PWM block 60 are combined to form the gate signal for the power converter phase. This combined signal is thus for steady state operation and dynamic operation when a transient happens.

Figure 6:
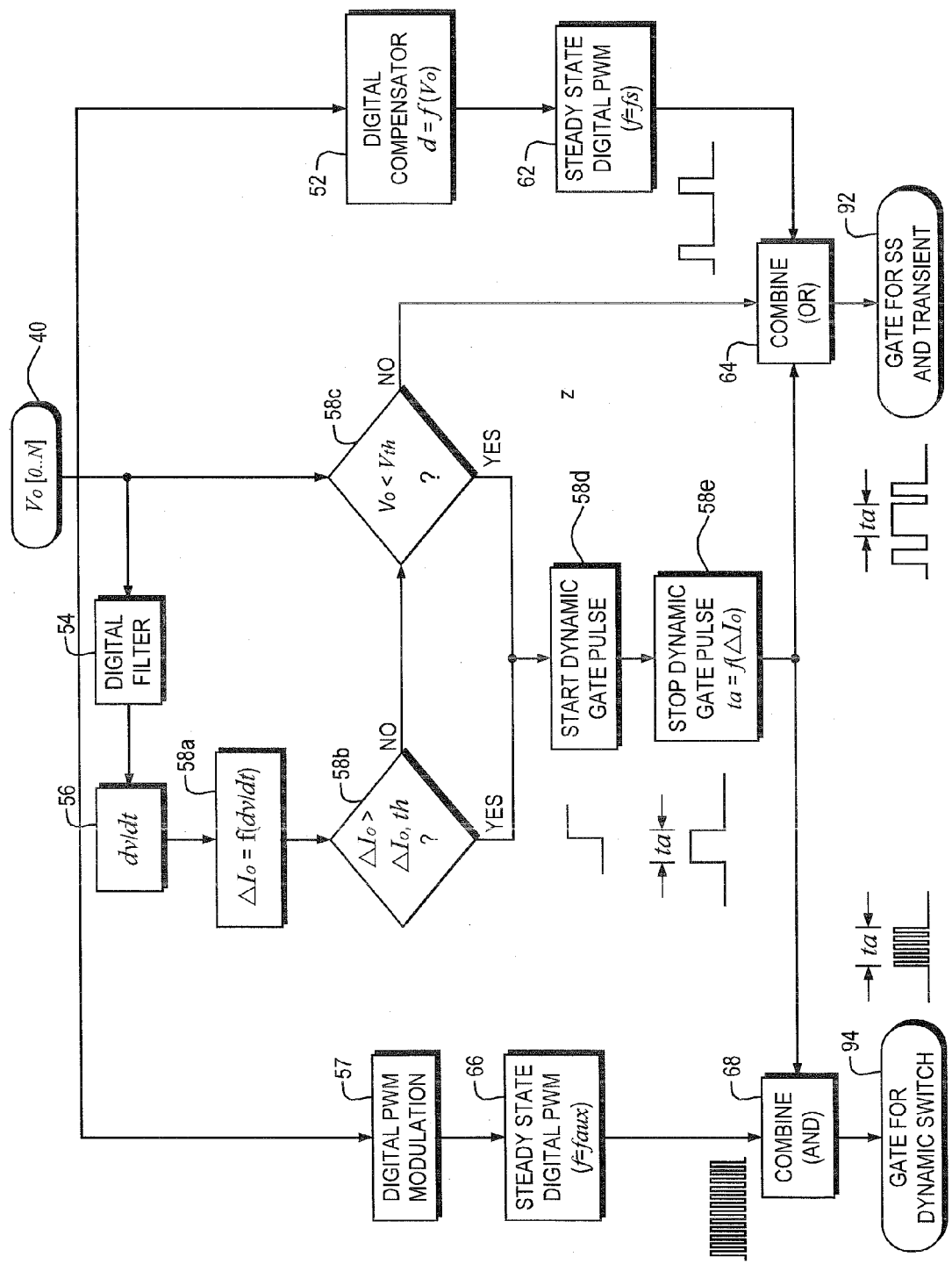
FIG. 6 is a flow chart of the control algorithm of an embodiment of a digital controller according to the invention.

The dynamic gate pattern is generated according to the process given in the flow chart shown in FIG. 6, where reference numerals corresponding to those in FIG. 4 indicate like steps. In the flow chart, the sampled voltage is filtered by a digital filter 54 to remove noise, and then is processed at 56 to obtain the derivative of the sampled voltage.

Figure 10:
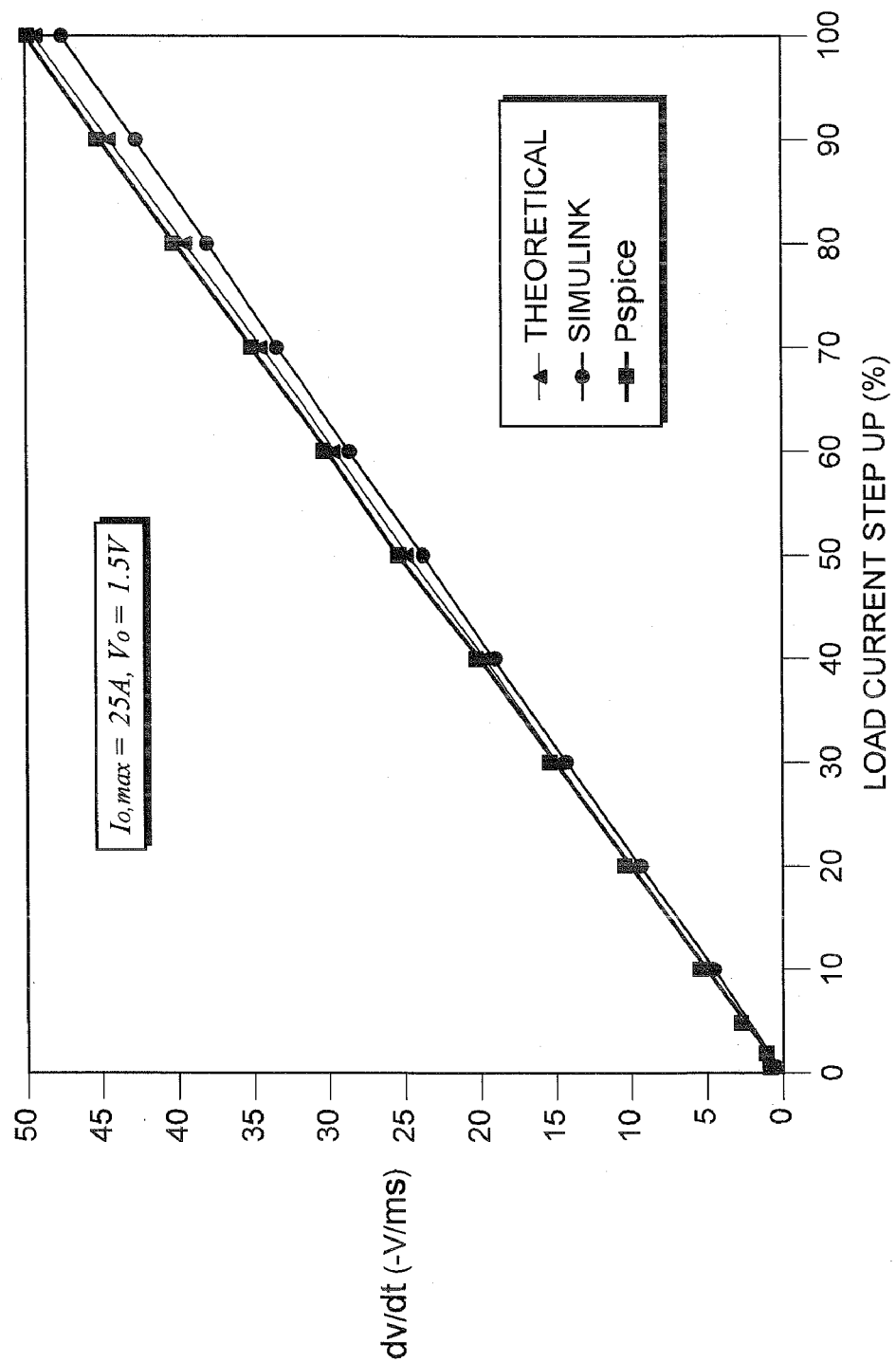
FIG. 10 is a plot of the load current change $\Delta Io$ as a function of the output voltage slew rate dv/dt.

In one embodiment, the algorithm for dynamics 58 uses the derivative of the sampled voltage to calculate, at 58a, the change in load current $\Delta I_o$ according to a linear or non-linear function (e.g., algebraic, trigonometric, exponential) (see equation (1)). The function is based on characteristics such as the output inductance, capacitance, equivalent series resistance (ESR), switching frequency, input/output voltage, and the parameters of the compensator. For example, the voltage vs. current relationship derived from equation (1) when f is a linear function is plotted in FIG. 10. This plot shows that once the derivative of the output voltage is obtained, the load step can be predicted.

$$\Delta I_o = f(dV_o/dt) \tag{1}$$

In another embodiment, rather than calculate the change in output current, the algorithm for dynamics stores data relating to possible output currents for various output voltages, and looks up the appropriate output current for any given sensed voltage. The advantages of such a look-up table approach are improved speed and the ability to implement functions which might be difficult to model mathematically (e.g., using curve-fitting approximations).

Once the derivative of the output voltage exceeds a certain value, indicating that the load current step will exceed a certain threshold value, the algorithm for dynamics 58 (FIGS. 4 and 6) will initiate a pulse for dynamic. Specifically, at steps 58b and 58c of FIG. 6, if the load current increase exceeds a threshold value, and/or the voltage drop exceeds a threshold value, the dynamic gate pulse will be started. However, if both the output voltage drop and the load current step do not exceed their given threshold values, the dynamic gate pulse will not be initiated, in which case the combined gate signal is the gate signal from the path of the steady state PWM for the main switch in the flow chart of FIG. 6.

The dynamic gate pulse remains high for a certain period of time. Theoretically, when the current through the output inductor $L_o$ reaches the value that the output current should step to (e.g., according to equation (1)), the dynamic gate pulse should be turned off. However, in accordance with the invention it is not necessary to measure the current through the inductor to determine when to turn off the dynamic gate pulse. Rather, it is only necessary to turn off the dynamic gate pulse after a period of time $t_a$ equal to that required for the output current to rise to the predicted value (e.g., according to equation (1)). The time $t_a$ is calculated by the algorithm for dynamics 58 of the DSP block 50 of the digital controller. The time $t_a$ is a function of one or more parameters of the power converter such as, for example, the output inductance, capacitance, equivalent series resistance (ESR) of the output capacitor, switching frequency, input/output voltage, and parameters of the compensator, and a function of the load current step. Equation (2) reveals the relationships to obtain the time $t_a$.

$$t_a = \frac{\Delta I_0 \cdot L_0}{V_g - V_0} = \frac{f(dV_0/dt) \cdot L_0}{V_g - V_0} \quad (2)$$

As shown in FIGS. 4 and 6, the dynamic gate pulse of duration ta, determined at 58e, is combined at 64 with the steady state PWM to form the gate signal of the power converter switch for both steady state and transient situations. The combination process is similar to an OR logic function. The waveform of the combined gate signals generated at 92 is shown in the flow chart in FIG. 6 and in FIG. 5. Thus, during the dynamic mode, once a load transient is detected, the switch $S_1$ in FIG. 3 will be turned on and kept on for a period of time $t_a$, calculated by the digital controller, while the switch $S_2$ will be kept off during this period of time. Thus, with the digital controller, the gate pulse starts in time, and the pulse width is not limited by the bandwidth of the closed control loop and is wide enough to supply the current from the input to the output through the filter inductor $L_o$ to help maintain the output voltage during the transient.

The optional dynamic conversion circuit may also be activated by the digital controller during the load transient. When switch $S_1$ is turned on and switch $S_2$ is turned off for a time period of $t_a$, the switch $S_{aux}$ of the dynamic conversion circuit is turned on and off by the gate signal generated at 94. It is noted that the inductor $L_{aux}$ in the dynamic conversion circuit has a substantially smaller value than that of $L_o$, such that the power transferred from the input to the output of the VRM is further accelerated. Moreover, turning $S_{aux}$ of the dynamic conversion on and off may comprise modulating (e.g., PWM) the gate of $S_{aux}$ during a load transient. A PWM modulation block for the auxiliary switch is shown in FIGS. 4 and 6, and may provide a suitable pattern of gate switching such as, for example, those shown in FIG. 5 and described below.

The first gate pattern of $S_{aux}$ (option 1 in FIG. 5) switches Saux at a fixed switching frequency much higher than that of the main power converter circuit. For example, the switching frequency of $S_{aux}$ may be 2 to 10 times, 2 to 100 times, or higher, than the switching frequency of the power converter, as may be possible to achieve with available technology. The pulse width of the gate signal is modulated as a constant, predetermined by the digital controller.

The second gate pattern of $S_{aux}$ (option 2 in FIG. 5) also switches $S_{aux}$ at a fixed frequency much higher than that of the main power converter circuit. The gate signal is pulse width modulated based on voltage mode control. The output voltage of the VRM is sensed and compared with the reference voltage. The error between the sensed output voltage and the reference voltage is compensated by a compensator similar to the compensator of the main power circuit, but with a larger gain. The pulse width of the gate is varied according to how the loop is compensated. For example, the loop may be compensated by a Type III compensator with a high gain.

The third gate pattern of $S_{aux}$ (option 3 in FIG. 5) also switches $S_{aux}$ at a fixed frequency much higher than that of the main power circuit. The pulse width of the gate signal is predefined to be large initially and then decreases linearly as a function of time. The decreasing rate of the duty cycle is also predefined or calculated by the digital controller.

The PWM modulated signal for the auxiliary switch $S_{aux}$ is combined with the dynamic gate pulse at 68 to form the gate signal for $S_{aux}$. The combination process is similar to an AND logic function, as shown in FIGS. 4 and 6.

Figure 7:
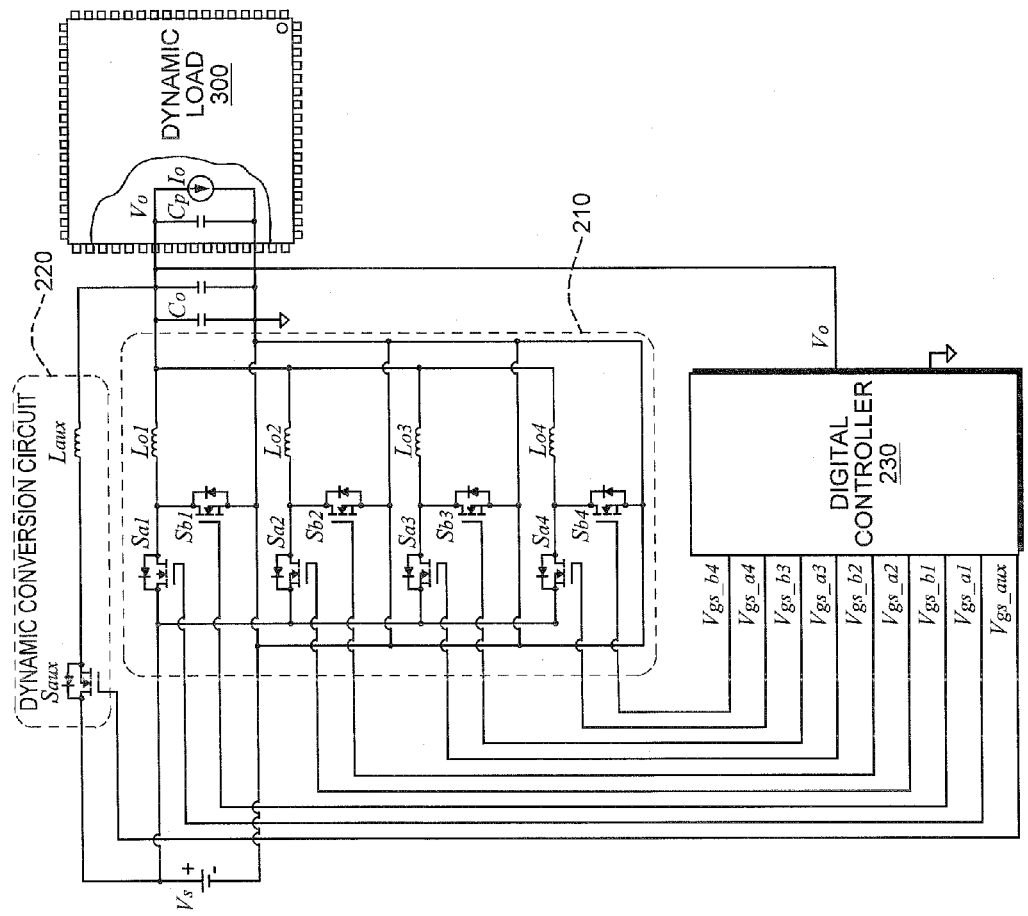
FIG. 7 is a schematic diagram of a multiphase interleaved VRM with a dynamic conversion circuit and a digital controller according to the invention.

In a second embodiment, shown in FIG. 7, the invention relates to a multiphase interleaved VRM with a dynamic conversion circuit and a digital controller. FIG. 7 shows a multiphase interleaved VRM with four power converter phases, although more or fewer phases are possible, depending on the amount of output current required. Shown in the embodiment of FIG. 7 are the main components of the interleaved VRM: the four power converter phases 210, the dynamic conversion circuit 220, and the digital controller 230. In this example, the load 300 is a microprocessor. The switches $S_{a1}$, $S_{b1}$ and the inductor $L_{o1}$ form the first phase of the multiphase interleaved power converter, each parallel phase being a synchronous buck converter. Other power converters, such as boost, buck-boost, isolated, and non-isolated could also be used. All four phases share the same output capacitor $C_o$. The auxiliary power switch $S_{aux}$ and inductor $L_{aux}$ form the optional dynamic converter of the VRM, which is connected in parallel with the four parallel power converters.

Figure 8:
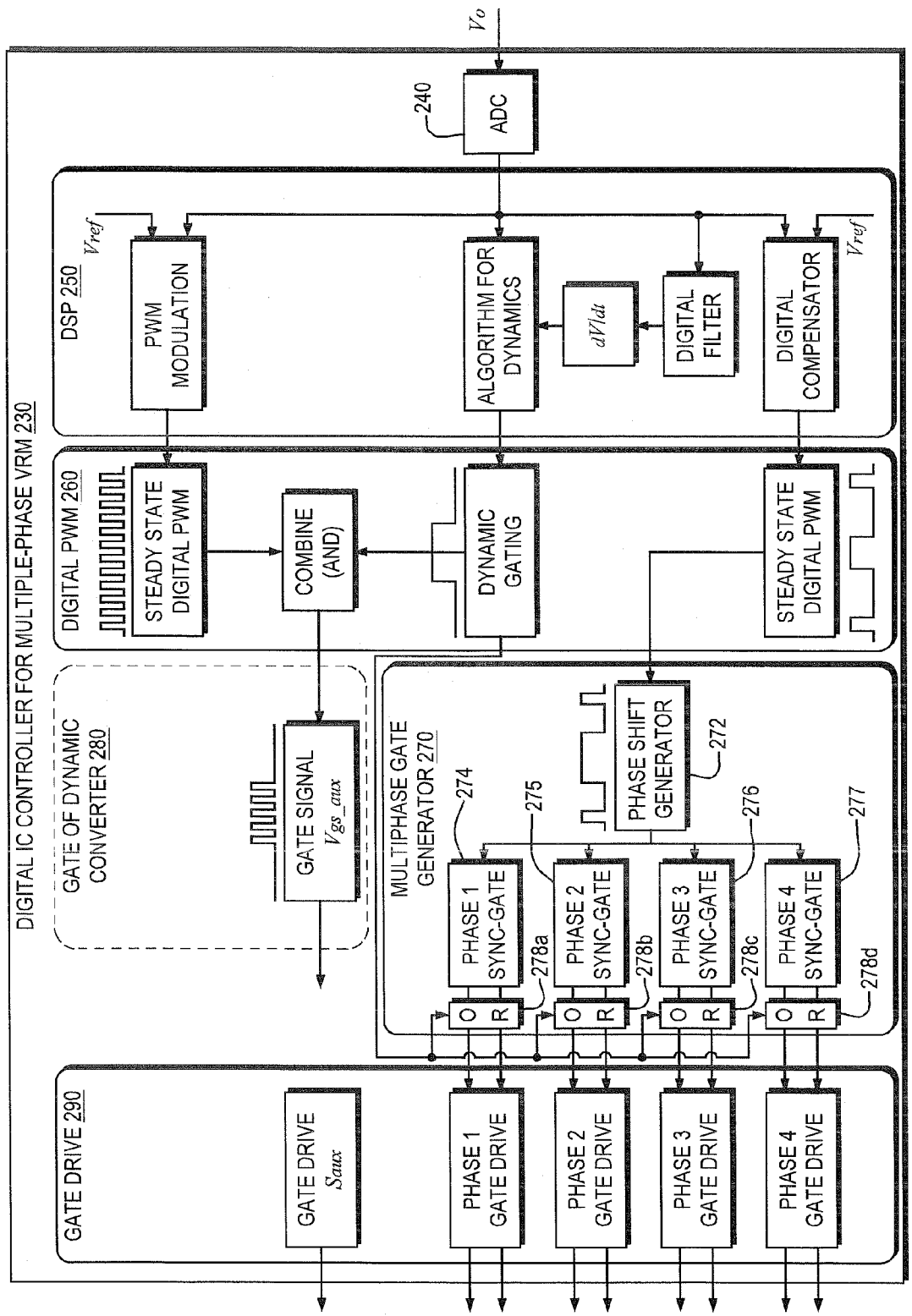
FIG. 8 is a block diagram a digital controller for a multiphase VRM embodiment.

The digital controller 230 for the interleaved VRM is shown in the block diagram of FIG. 8. The digital controller 230 has the same components and functions in the same way as the digital controller 30 in the single phase VRM described above (FIG. 4), except that the gate signal generation portion is now a multiphase gate generator 270, which generates the gate signals for paralleled buck converters. The multiphase gate generator block 270 includes a phase shift generator 272 for receiving the gate signal from the digital PWM, and four synchronous gating circuits 274 to 277, one for each of the four phases. Each synchronous gating circuit output is fed to a respective OR gating function 278a, 278b, 278c, 278d and each OR gating function output is fed to a corresponding gate drive circuit in the gate drive block 290. The gate drive block 290 drives and sends the phase-shifted PWM gate signals to the power switches of each paralleled branch of the power converter. Optionally, it also drives and sends the gate signal to the auxiliary switch of the dynamic conversion circuit. Operation of the digital controller is similar to the single phase embodiment (see FIG. 6), in that the steady state PWM gating and the dynamic gating generated in the digital PWM block 260 are combined via an AND function to form the gate signal for dynamic conversion circuit phase. However, in the multiphase embodiment, this steady state digital PWM signal is phase shifted by the phase shift generator 272 for multiphase switching power converters and the dynamic gating signal is combined, via OR functions 278a-278d, with the outputs of the four synchronous gating circuits 274, 275, 276, and 277. Also, as in the single phase embodiment, the period $t_a$ at which to turn off the dynamic gate pulse may be calculated by the DSP block 250 of the digital controller. The time $t_a$ is a function of buck converter parameters such as output inductance, output capacitance, ESR of the output capacitor, switching frequency, input/output voltage, parameters of the compensator, as well as the load current step. Equation (3) describes the relationship to obtain the time $t_a$.

$$t_a = \frac{\Delta I_0 \cdot L_0}{4 \cdot (V_g - V_0)} = \frac{f(dV_0/dt) \cdot L_0}{4 \cdot (V_g - V_0)} \quad (3)$$

Figure 9:
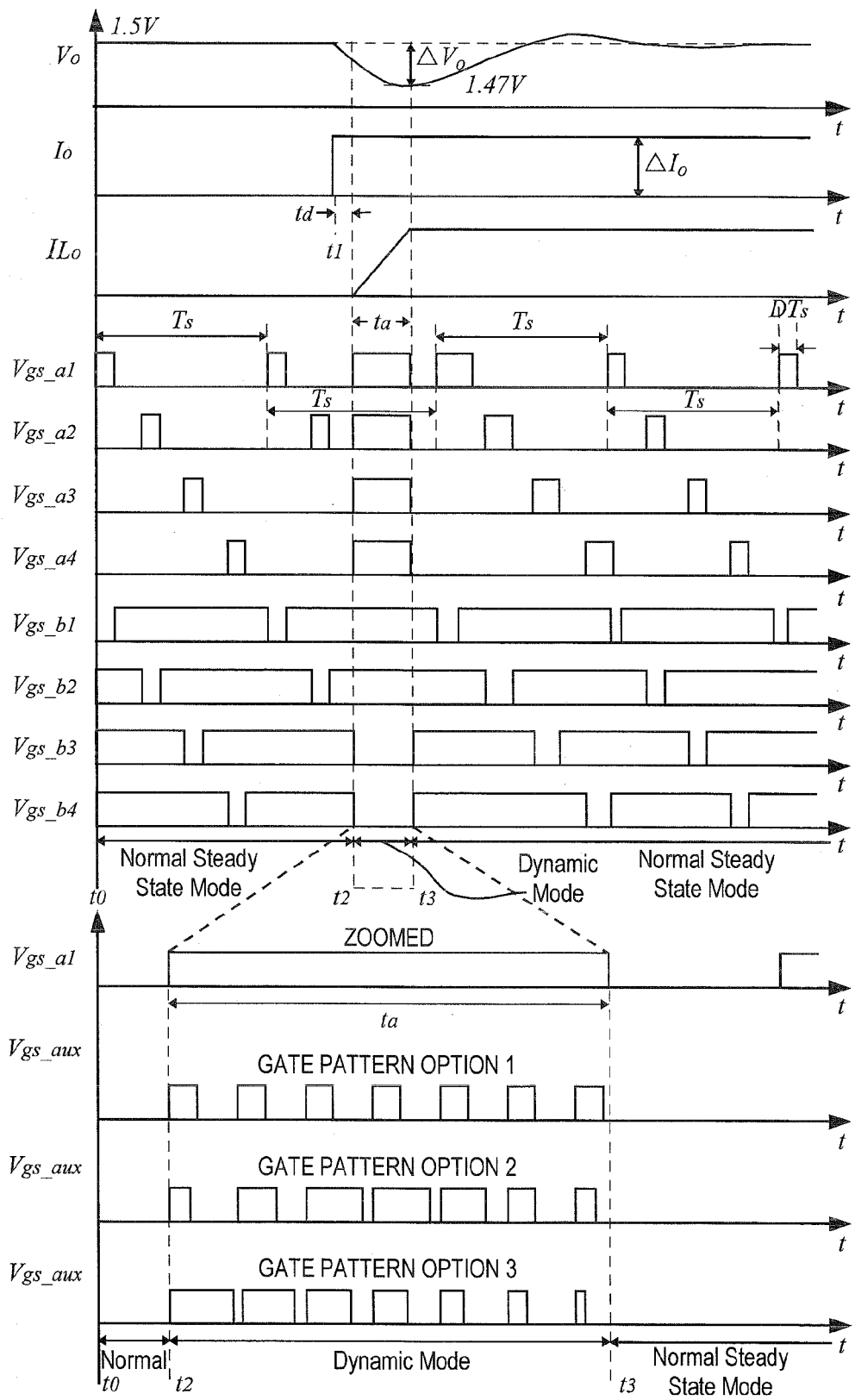
FIG. 9 is a plot of multiphase VRM waveforms during steady state and during a transient state according to the control method of the invention.

The synchronous gate signals of the converter during steady state are shown in the period referred to as Normal Steady State Mode ($t_o$-$t_2$ and $t_3$-$\infty$) in FIG. 9. The frequency of the gate signal is always fixed. The pulse width or duty cycle of the gate signal is also stabilized during steady state operation. At time $t_1$ in FIG. 9, a step load occurs. After a delay of $t_d$, at time $t_2$, the converter enters Dynamic Mode. The delay $t_d$ is due to the sampling and processing time of the digital controller. Once a load transient occurs, the increment of the duty cycle of the synchronous gate signal is determined by how the system is compensated, and relates to factors such as the crossover frequency and the gain of the compensator.

During Dynamic Mode, the switches $S_{a1}$, $S_{a2}$, $S_{a3}$, and $S_{a4}$ are turned on and kept on for a duration of time $t_a$, as calculated by the digital controller, while the switches $S_{b1}$, $S_{b2}$, $S_{b3}$, and $S_{b4}$ are kept off during this period of time. Thus the gate pulse starts in time and the pulse width will not be limited by the bandwidth of the closed control loop and will be wide enough to supply the current from the input to the output through the filter inductors $L_{o1}$, $L_{o2}$, $L_{o3}$, and $L_{o4}$ to help maintain the output voltage during the transient.

The optional dynamic conversion circuit is also activated by the digital controller during the load transient. When switches $S_{a1}$, $S_{a2}$, $S_{a3}$, and $S_{a4}$ are turned on and switches $S_{b1}$, $S_{b2}$, $S_{b3}$ and $S_{b4}$ are turned off for a time period of $t_a$, the switch $S_{aux}$ of the dynamic conversion circuit is turned on and off. In various embodiments the switch $S_{aux}$ may be modulated according to a desired gate signal drive pattern, three examples of which are shown in FIG. 9 as options 1 to 3. Options 1 to 3 are the same as those shown in FIG. 5 and described above with respect to the single phase VRM embodiment.

The invention is further illustrated by way of the following non-limiting example.

Example

Figure 11:
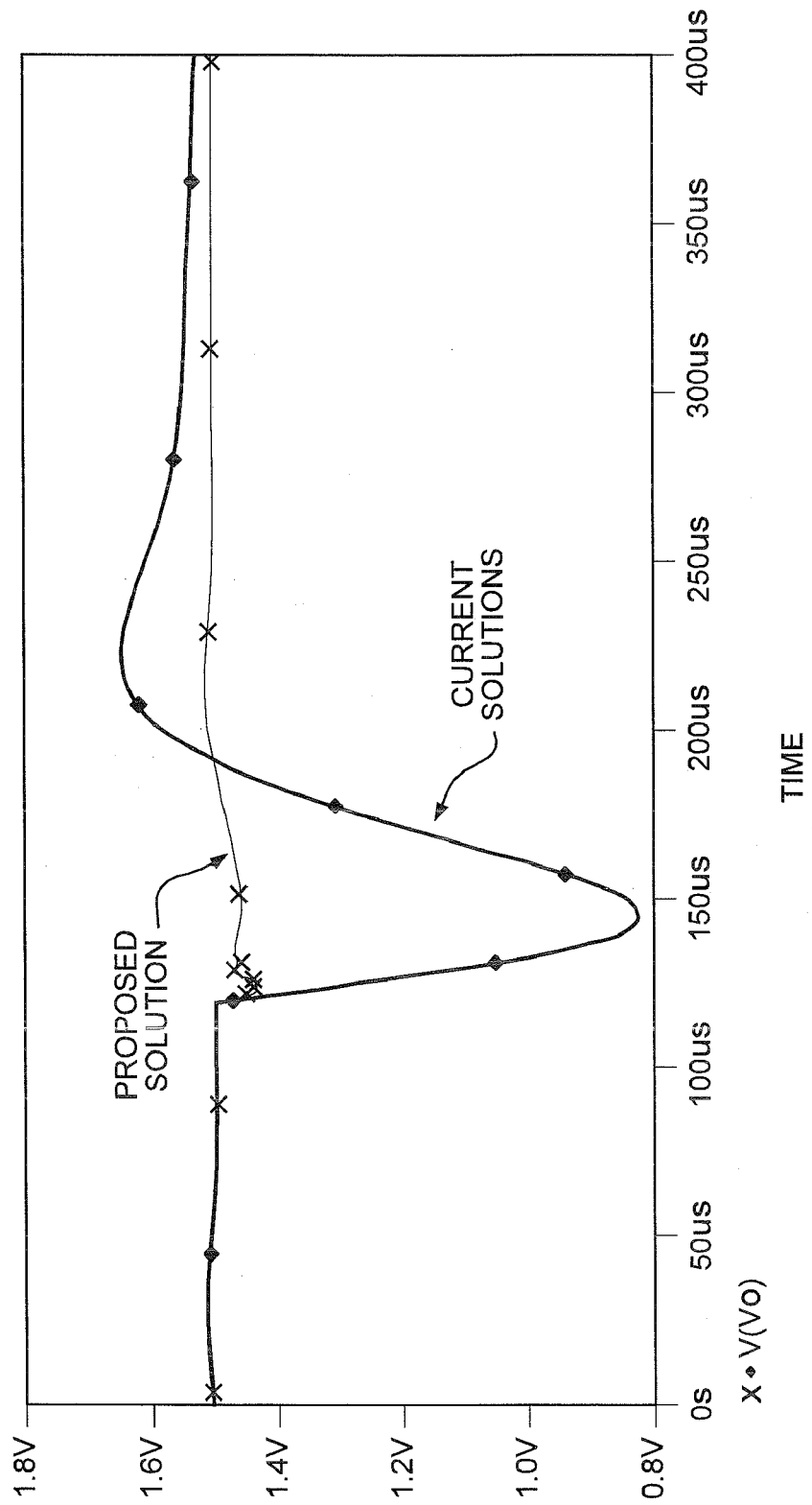
FIG. 11 is a plot showing the results of a simulation comparing the output voltage waveforms of a VRM of the invention and a conventional voltage mode controlled VRM during a load transient, in which $V_g=12$ $V_{DC}$, $V_o=1.5$ V, $I_o=25$ A, $C_o=500$ μF, $f_S=250$ kHz, and the load steps from 0.5 A to 25 A.

A voltage regulator module based on a buck converter and including a digital controller as described above and a dynamic conversion circuit was simulated in PSPICE v. 9.0 and its performance evaluated with respect to a VRM based on a typical buck converter. The input and output voltages of the two VRMs was 12 $V_{dc}$ and 1.5 $V_{dc}$ respectively, and the switching frequency of the two circuits was 250 kHz. The rated output current was 25 A and the load transient was from 0.5 A to 25 A, at a slew rate of 1000 A/µs. The results of the simulation are shown in FIG. 11, where it can be seen that the voltage drop of the VRM of the invention was less than 10% of that of the typical VRM. According to the simulation, to avoid exceeding a 70 mV output voltage drop at a 100% load current transient (25 A), an output capacitance of only 500 µF was required. In contrast, the conventional voltage mode controlled single phase VRM needed at least 5000 µF output filter capacitance. This is an approximately 6-fold reduction in output capacitance, which represents substantial savings in space on the printed circuit board, and ultimately in cost.

Figure 12:
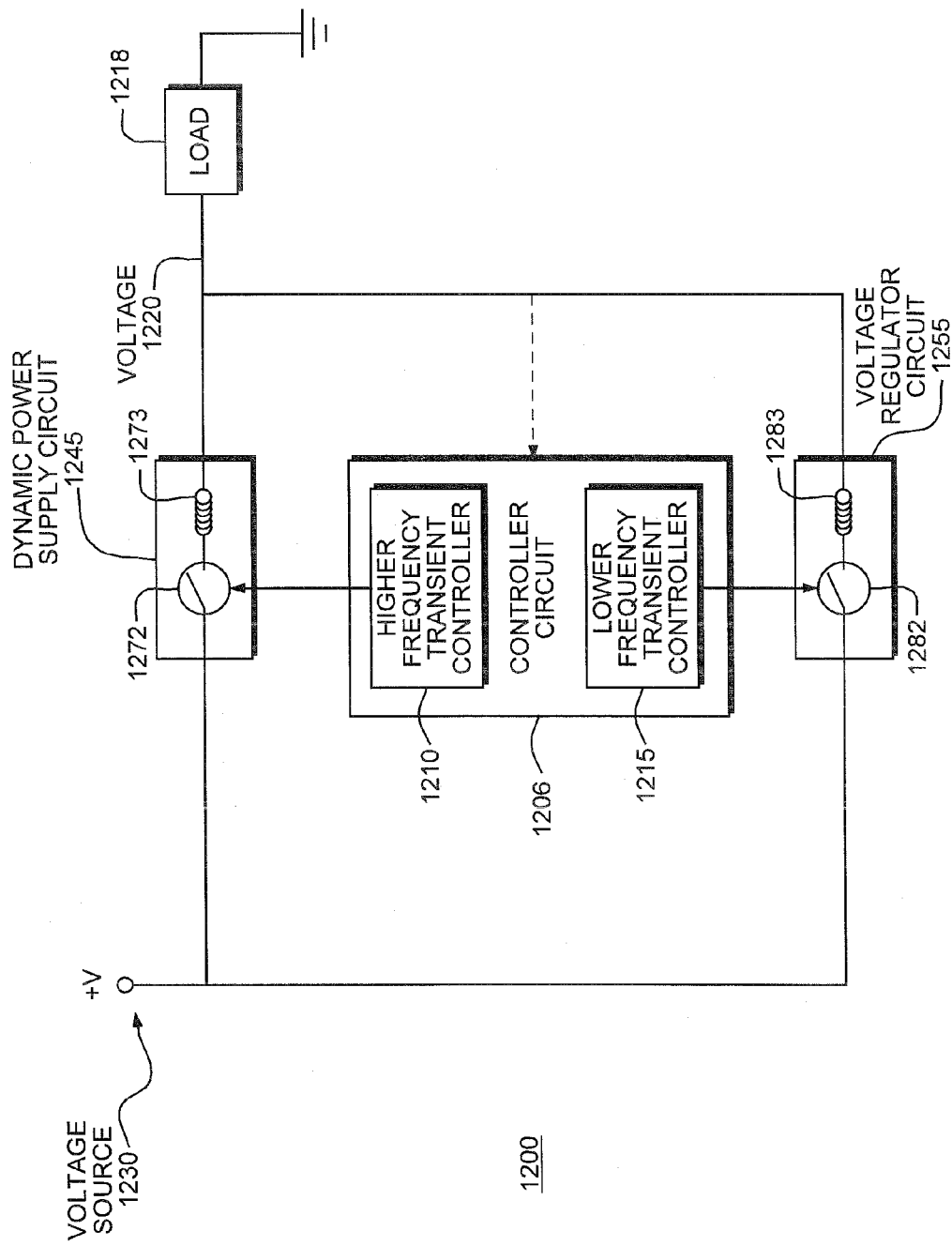
FIG. 12 is an example diagram of a power supply system according to embodiments herein.

FIG. 12 is an example diagram of a power supply system 1200 according to embodiments herein. As shown, power supply system 1200 includes a controller circuit 1206 that generates signals for controlling dynamic power supply circuit 1245 and voltage regulator circuit 1255. Dynamic power supply circuit 1245 includes element 1272 such as a switch and element 1273 such as an inductor. Voltage regulator circuit 1255 includes element 1282 such as a switch and element 1283 such as an inductor. Controller circuit 1206 includes transient controller 1210 and main controller 1215. Transient controller 1210 of controller circuit 1206 generates control signals to control dynamic power supply circuit 1245. Main controller 1215 of controller circuit 1206 generates control signals to control voltage regulator circuit 1255. The transient controller 1210 (and corresponding dynamic power supply circuit 1245) provides faster response to correct deviations in output voltage 1220 than main controller 1215 (and corresponding voltage regulator circuit 1255).

In one embodiment, the controller circuit 1206 in power supply system 1200 is configured to simultaneously control both a voltage regulator circuit and a dynamic power supply circuit as described herein. For example, the controller circuit 1206 monitors voltage 1220 produced by the voltage regulator circuit 1255 that is used to convey power from voltage source 1230 to load 1218 (e.g., a dynamic load such as a microprocessor system. Depending on a state (e.g., current value, trend, etc.) of the monitored voltage, the controller circuit 1206 can initiate activation of the dynamic power supply circuit in parallel with the voltage regulator circuit to selectively supply additional power to the load. In other words, controller circuit 1206 generates control signals via transient controller 1210 and main controller 1215 so that voltage regulator circuit 1255 produces a constant voltage such as 1.5 Volts DC, both during transients and under steady-state conditions. Controller circuit 1206 monitors the value of voltage 1220 and adjusts the control signals generated by main controller 1215 so that voltage regulator circuit produces a constant voltage applied to load even when the load 1218 happens to moderately increase or decrease at any given instant in time. That is, the main controller 1215 can react to changes in current demand by load 1218 such that the voltage 1220 remains at a relatively constant value. In general, however, voltage regulator circuit 1255 can maintain voltage 1220 at a constant value in the absence of excessive transients in which current requirements suddenly change on the order of several amperes.

For more substantial changes in load 1218 (e.g., drastic load changes in which load 1218 requires substantially more current at a given instant of time), the voltage regulator circuit 1255 may be unable to respond fast enough to convey power from the voltage source 1230 to the load 1218. Under such circumstances, the controller circuit 1206 will detect that the voltage 1220 droops below a threshold value. Note that in one embodiment, the controller circuit 1206 identifies a change in current consumption by load 1218 based on changes in voltage 1220 over time.

In response to a more drastic voltage droop as a result of increased power consumption, the controller circuit 1206 enables transient controller 1210 to generate respective control signals to activate dynamic power supply circuit 1245. For example, the transient controller 1210 portion of controller circuit 1206 can sense an increase in load 1218 and initiate successive, rapid opening and closing of element 1272 (see FIG. 7 as an example) such that dynamic power supply circuit 1245 conveys power to load 1218 either in addition to or in lieu of voltage regulator circuit 1255 providing power to load 1218. Accordingly, when load 1218 suddenly requires a substantial increase in power, the controller circuit 1206 deploys transient controller 1210 to prevent drooping of voltage 1220 by supplementing an amount of power (e.g., current) conveyed to load 1218. In one embodiment, the controller circuit 1206 is configured to enable a switch (e.g., element 1272) in the dynamic power supply circuit 1245 to convey power from voltage source 1230 to the load 1218 at a same time that a switch (e.g., element 1282) in the voltage regulator circuit 1255 is enabled to supply power to the load. This is shown and discussed above with respect to FIG. 7.

Referring again to FIG. 12, in a similar vein as discussed above, note that the dynamic power supply circuit 1245 can include a switch device that sinks current or power (at a node between element 1272 and element 1273) to ground. The voltage regulator circuit 1255 can include a switch device that sinks current (at a node between element 1282 and element 1283) to ground. Controller circuit 1206 can initiate activation of either or both of such current sinks when the load substantially decreases at a given instant in time to prevent voltage 1220 from exceeding a threshold value. In an instance when the current draw or power consumption of load 1218 suddenly decreases, without implementing proper measures by controller circuit 1206, the value of voltage 1220 may suddenly increase because voltage regulator circuit 1255 may be unable to react fast enough to account for the change. However, activation of one or both sink current devices (based on appropriate control signals produced by controller circuit 1206) prevents the voltage 1220 from increasing above an acceptable threshold value. As previously discussed, in one embodiment, the voltage regulator circuit 1255 can react fast enough to prevent low frequency spikes on voltage 1220, whereas dynamic power supply circuit 1245 can react fast enough to prevent higher frequency voltage spikes.

Accordingly, the controller circuit 1206 can generate appropriate control signals such that voltage 1220 is maintained within an acceptable voltage range such as between 1.45 and 1.55 volts, even when there are moderate and/or substantial changes in power consumption by load 1218.

Note that in one embodiment, the load 1218 in power supply system 1200 is a microprocessor device and the dynamic power supply circuit 1245 (e.g., power boost circuit) includes a switch (e.g., element 1272) that selectively conveys power from voltage source 1230 to the microprocessor during transient conditions when the load increases and requires more current (e.g., an additional number of amperes of current) to keep the voltage 1220 at a substantially constant value.

During operation (e.g., enabling current processor power from voltage source 1230 to load 1218), the respective elements 1273 and 1283 can be rapidly turned on and off at different duty cycles to control a rate of allowing current or power from voltage source 1230 to pass to the load 1218.

In addition to controlling a duty cycle associated with rapid ON and OFF switching, the inductance associated with the filter elements (e.g., element 1273 and element 1283) can be selectively controlled for increased performance. For example, as previously discussed, in one embodiment, element 1273 is an inductor device having a lower inductance than element 1283, which also is an inductor device. Accordingly, in such an embodiment, the dynamic power supply circuit 1245 is able to more quickly react to supplying extra needed current to load 1218 to prevent substantial drooping of voltage 1220 because it has a lower inductance than element 1283.

Thus, one embodiment herein includes a controller circuit 1206 configured to drive the dynamic power supply circuit 1245, which has a faster response time than voltage regulator circuit 1255 for more quickly supplying power to the load 1218. In addition to a faster response time for supplying power to load 1218 because element 1273 has a smaller associated inductance than element 1283, the controller circuit 1206 can be configured to drive the dynamic power supply circuit 1245 with higher frequency switching signals. In other words, the dynamic power supply circuit 1245 can be configured to operate at a higher switching rate than the voltage regulator circuit 1255 to supply power to the load 1218.

In addition to the above embodiments, the controller circuit 1206 (e.g., digital controller circuit) can be further configured to set the voltage regulator circuit to a given operational mode of multiple operational modes. For example, as previously discussed with respect to FIG. 7, the controller circuit 1206 can turn element 1282 ON (as opposed to OFF) such that voltage regulator circuit 1255 conveys power from voltage source 1230 to load 1218. While the voltage regulator circuit 1255 is set to this operational mode (e.g., element 1282 is ON) during a respective voltage droop detected on voltage 1220, the controller circuit 1206 initiates activation (e.g., turns on element 1272) of the dynamic power supply circuit 1245 to supply power to the load 1218 in addition to the power currently conveyed to load 1218 via voltage regulator circuit 1255.

Thus, the controller circuit 1206 can continue to generate control signals to control voltage regulator circuit 1255 and additionally activate dynamic power supply circuit 1245 when needed to prevent a droop or over-voltage condition. In one embodiment, the controller circuit 1206 only activates the dynamic power supply circuit 1245 for a predicted duration of time, $t_A$, until the voltage regulator circuit 1255 is able to compensate for a change in the load 1218. After such time, the dynamic power supply circuit 1245 can be disabled until another droop or over-voltage condition on voltage 1220 occurs.

Figure 13:
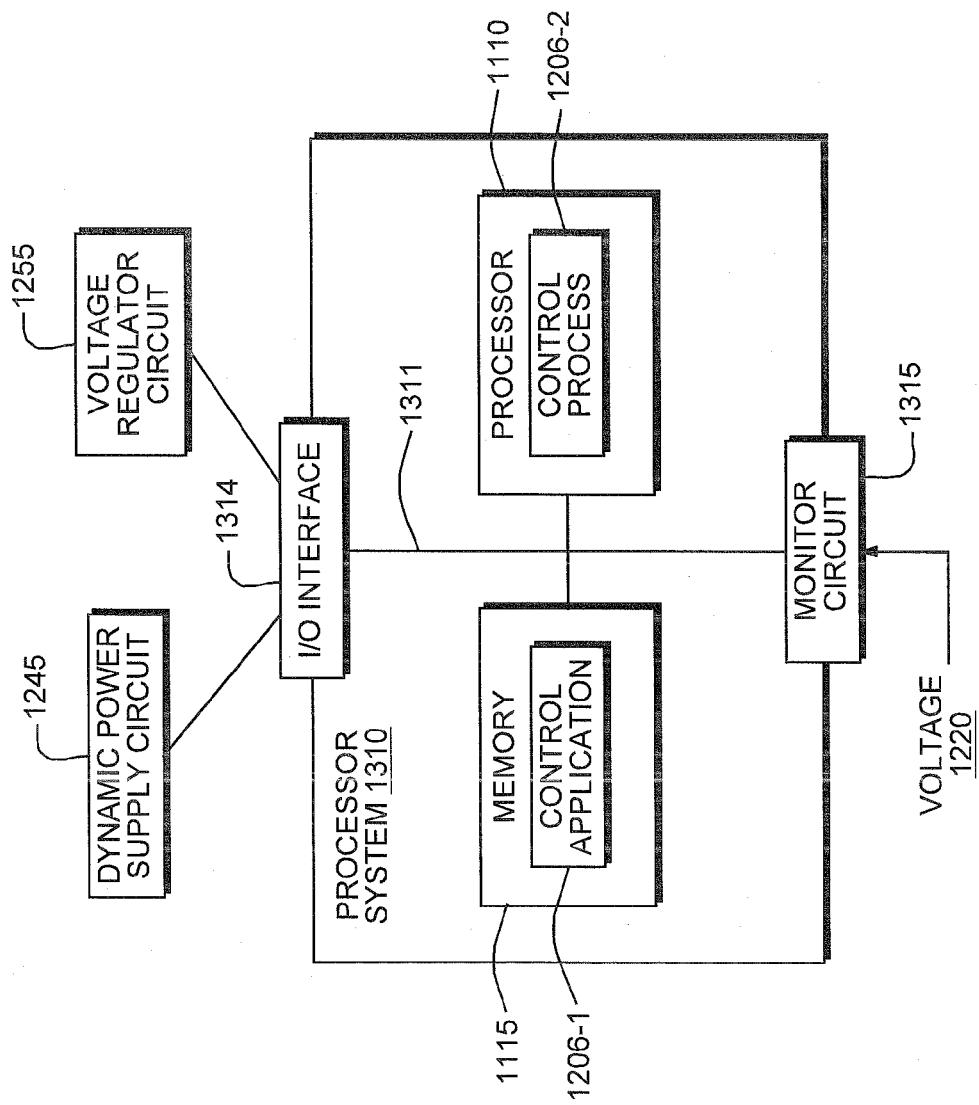
FIG. 13 is a diagram of an example circuit architecture for implementing power supply circuitry according to embodiments herein.

FIG. 13 is a block diagram of an example architecture of a respective control system 1310 for implementing controller circuit 1206 according to embodiments herein. Control system 1310 can be a DSP (Digital Signal Processor), FPGA (Field Programmable Gate Array), micro-controller, etc.

As shown, control system 1310 of the present example includes an interconnect 1311 that couples a memory system 1115, a processor 1110, I/O interface 1314, and a monitor circuit 1315. Monitor circuit 1315 can include an analog-to-digital converter for monitoring voltage 1220 applied to load 1218.

As shown, memory system 1115 can be encoded with a control application 1206-1 (e.g., control laws or rules) that enables control system 1310 to support generation of appropriate control signals to regulate voltage 1220 as discussed above and as discussed further below. Accordingly, control application 1206-1 can be embodied as software code such as data and/or logic instructions (e.g., code stored in the memory or on another computer readable medium such as a disk) that supports processing functionality according to different embodiments described herein.

During operation of one embodiment, processor 1110 accesses memory system 1115 via the use of interconnect 1311 in order to launch, run, execute, interpret or otherwise perform the logic instructions of the control application 1206-1. Execution of the control application 1206-1 produces processing functionality in control process 1206-2. In other words, the control process 1206-2 represents one or more portions of the control application 1206-1 performing within or upon the control system 1310.

It should be noted that, in addition to the control process 1206-2 that carries out method operations as discussed herein, other embodiments herein include the control application 1206-1 itself (i.e., the un-executed or non-performing logic instructions and/or data). The control application 1206-1 may be stored on a computer readable medium (e.g., a repository) such as a floppy disk, hard disk or in an optical medium. According to other embodiments, the control application 1206-1 can also be stored in a memory type system such as in firmware, read only memory (ROM), or, as in this example, as executable code within the memory system 1115 (e.g., within Random Access Memory or RAM).

Functionality supported by controller circuit 1206 will now be discussed via flowchart 1400 in FIG. 14. For purposes of the following discussion, the controller circuit 1206 generally performs steps in the flowchart. Note that there will be some overlap with respect to concepts discussed above. Also, note that the steps in the below flowcharts need not always be executed in the order shown.

Figure 14:
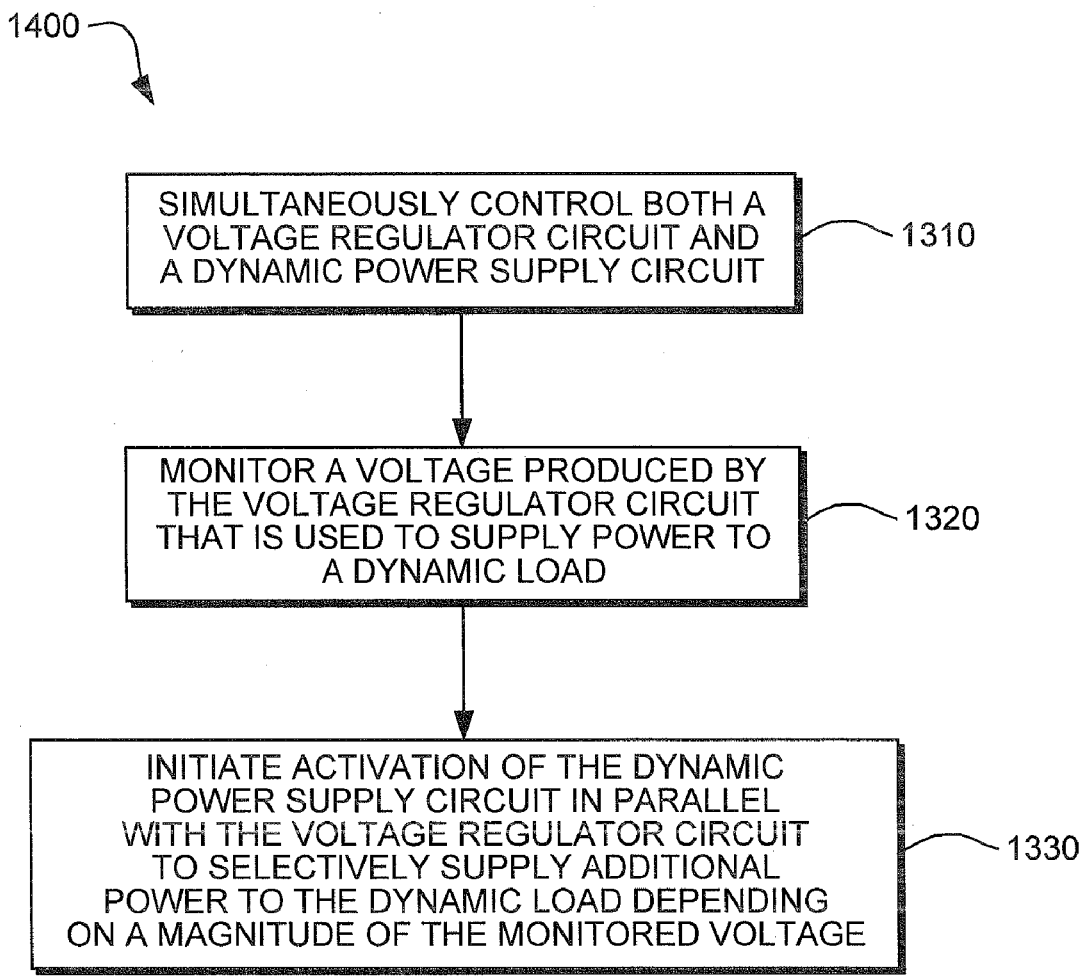
FIG. 14 is a diagram of an example flowchart for implementing a power supply system according to embodiments herein.

FIG. 14 is a flowchart 1400 illustrating a technique of supplying power according to embodiments herein.

In step 1310, the controller circuit 1206 simultaneously controls both voltage regulator circuit 1255 and dynamic power supply circuit 1245 via generation of corresponding control signals.

In step 1320, the controller circuit 1206 monitors a voltage 1220 produced by the voltage regulator circuit 1255 that is used to supply power to (dynamic) load 1218.

In step 1330, the controller circuit 1206 initiates activation of the dynamic power supply circuit 1245 in parallel with the voltage regulator circuit 1255 to selectively supply additional power to the dynamic load 1218 depending on a magnitude of the monitored voltage 1220.

Figure 15:
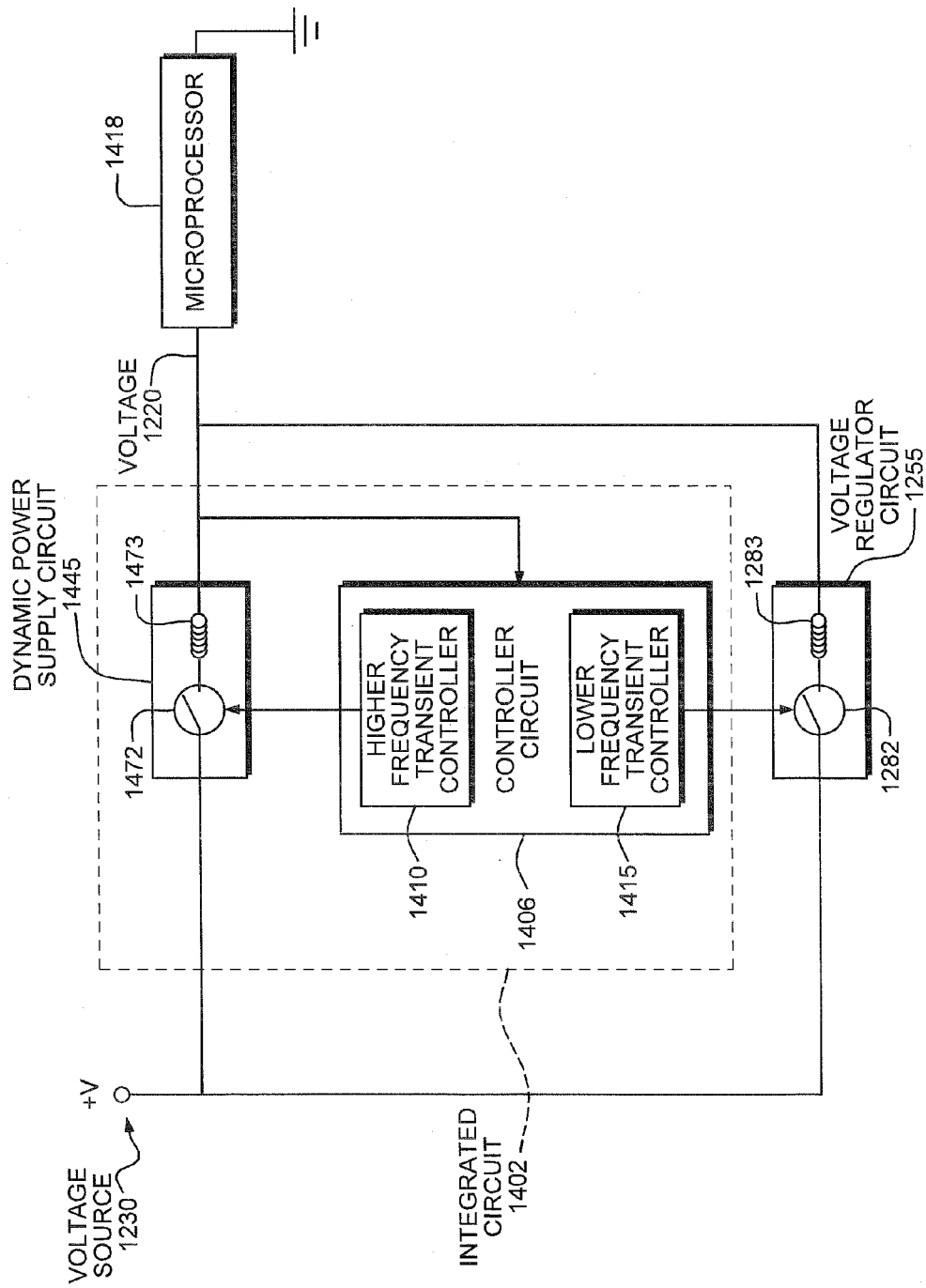
FIG. 15 is a diagram of an example power supply system in which the controller circuit and the dynamic power supply circuit reside in a corresponding integrated circuit according to embodiments herein.

FIG. 15 is an example diagram illustrating an embodiment in which the controller circuit 1406 (including transient controller 1410 and main controller 1415) and the dynamic power supply circuit 1445, except inductor 1473, reside in integrated circuit 1402. In other words, the controller circuit 1406 and the dynamic power supply circuit 1445, except inductor 1473, are packaged in an integrated circuit 1402 separate from a microprocessor chip 1418 and the voltage regulator circuit 1255. Integrated circuit 1402 and inductor 1473 can be easily added to an existing power supply circuit including voltage regulator circuit 1255 (e.g., buck converter) that powers a load such as a microprocessor 1418.

Figure 16:
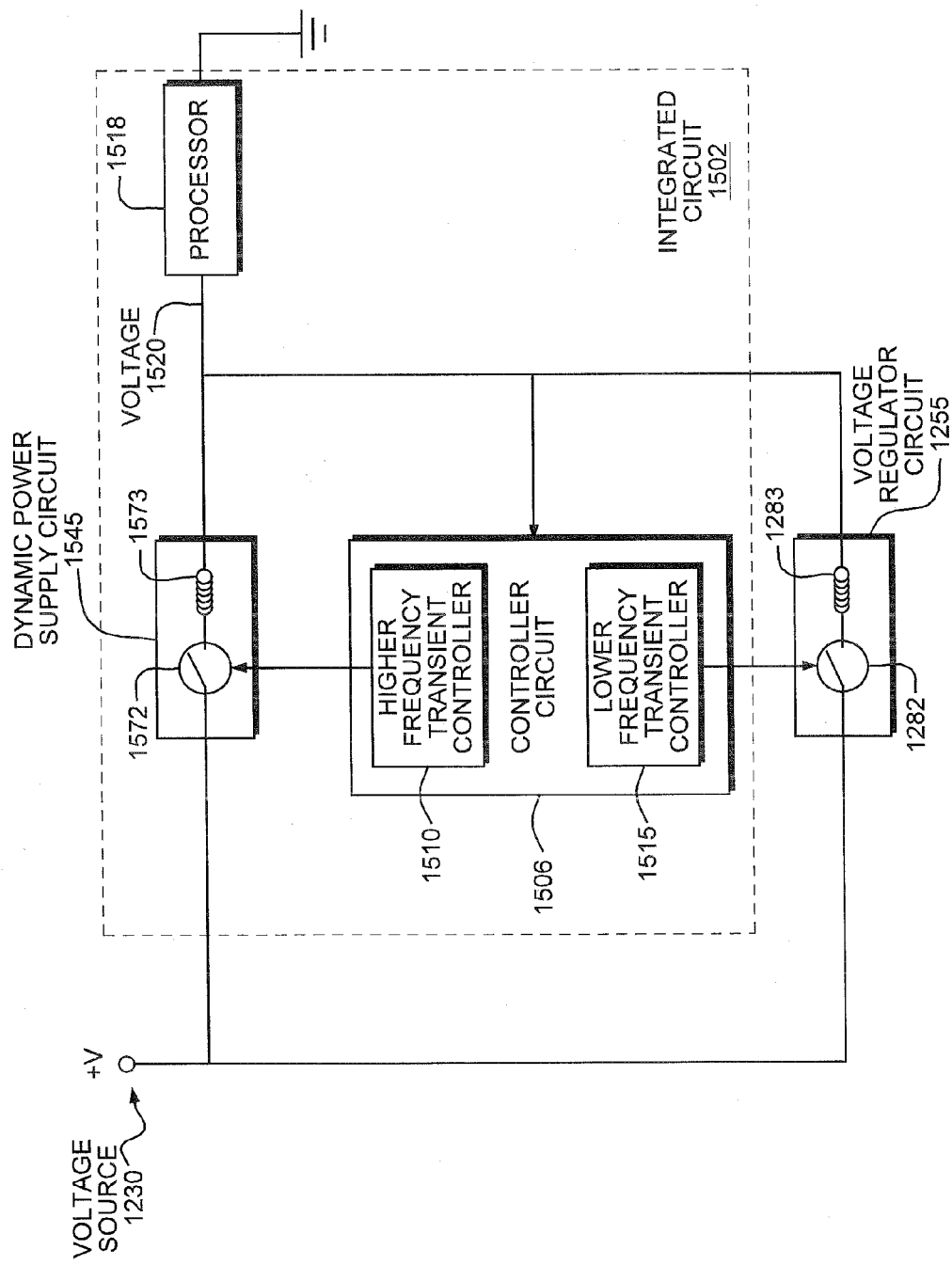
FIG. 16 is a diagram of a power supply system in which the controller circuit, dynamic power supply circuit, and a load such as a microprocessor reside in a corresponding integrated circuit according to embodiments herein.

FIG. 16 is an example diagram illustrating an embodiment in which the controller circuit 1506 (including transient controller 1510 and main controller 1515), the dynamic power supply circuit 1545, except inductor 1573, all reside in a common integrated circuit 1502. Together with the load such as microprocessor 1518 and inductor 1573, the integrated circuit 1502 provides the same functionality as discussed above and. Such an embodiment can save printed circuit board real estate and thus reduce overall circuit size.

Figure 17A:
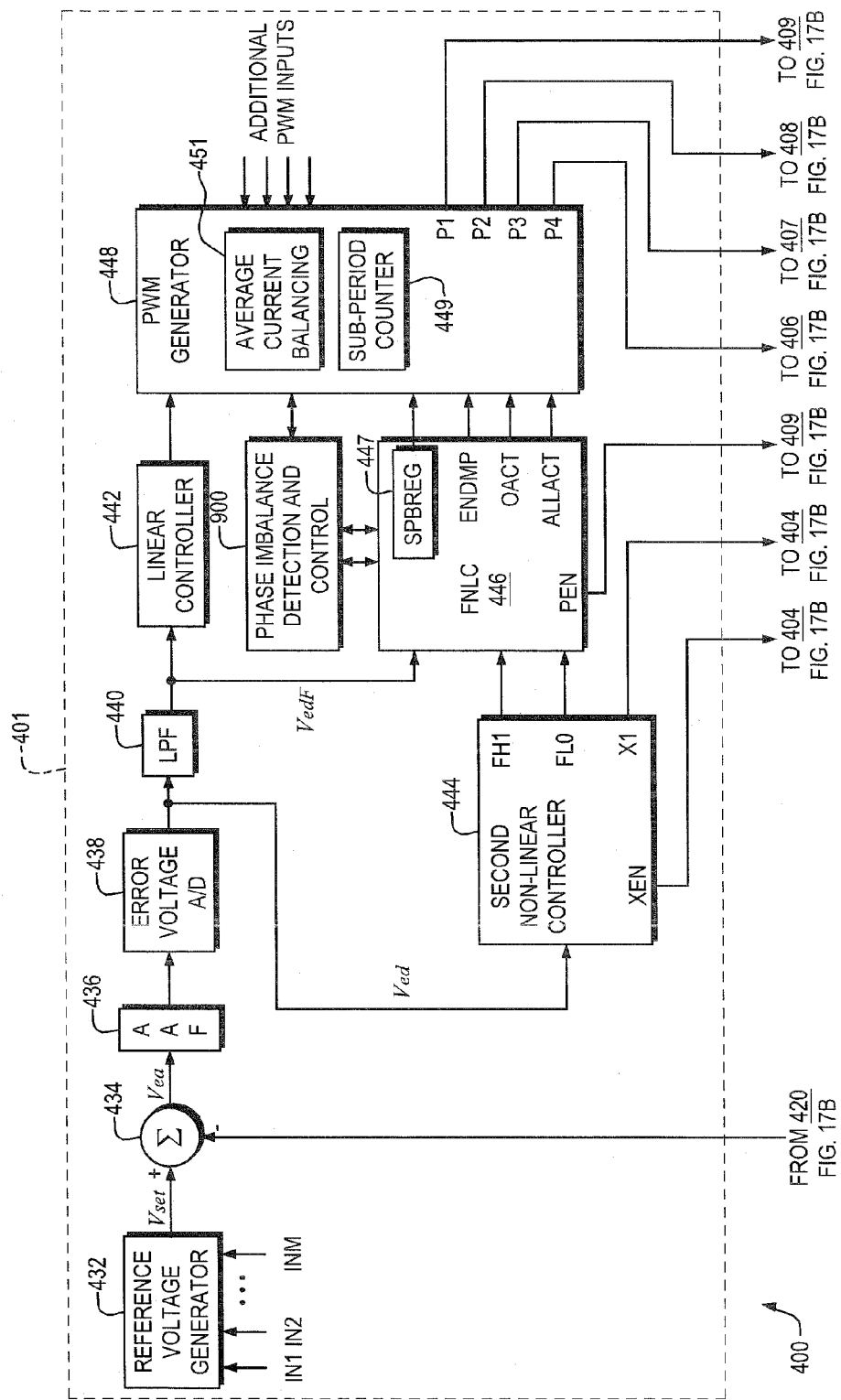
FIG. 17 is an example diagram illustrating a power supply circuit according to embodiments herein.
Figure 17B:
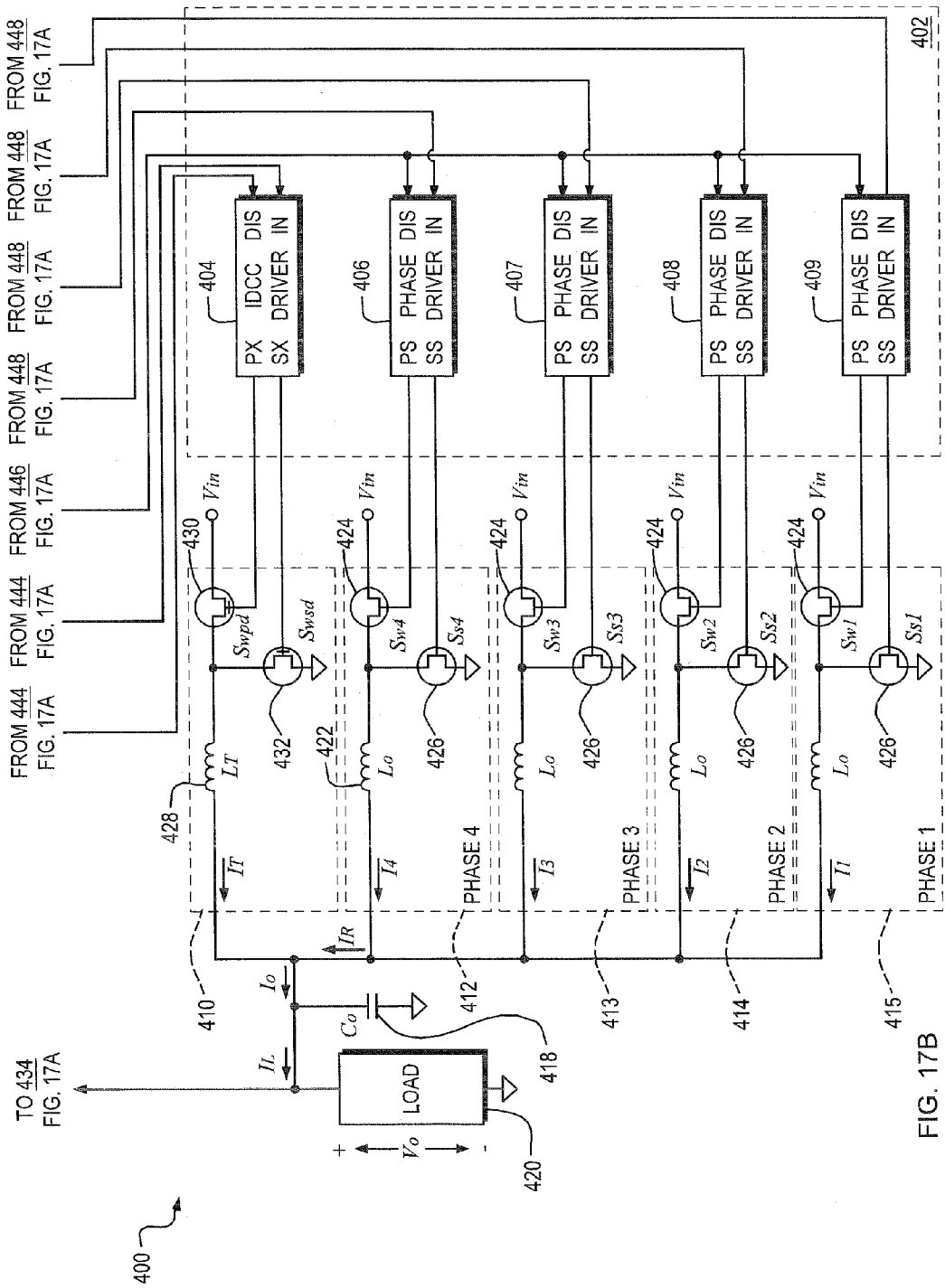

FIG. 17 shows another embodiment of a power supply system 400 according to embodiments herein. The power supply system comprises a controller 401 (e.g., implemented as an integrated circuit or other circuit); a driver assembly 402, comprising five driver circuits (e.g., driver circuit 404, driver circuit 406, driver circuit 407, driver circuit 408, driver circuit 409); a multiphase voltage regulator circuit comprising multiple power conversion phases (e.g., power converter phase 412, power converter phase 413, power converter phase 414, and power converter phase 415); a dynamic conversion circuit 410; and an output storage capacitor bank 418.

The power supply system as shown in FIG. 17 receives input power from an input power source at voltage $V_{IN}$ and delivers output voltage to a load 420 at a load voltage, $V_o$.

Dynamic conversion circuit 410 comprises a dynamic output inductor 428 of value $L_T$, a power switch 430 and a synchronous switch 432.

Power conversion phase 412 comprises a power output inductor 422 of value $L_o$, a power switch 424 and a synchronous switch 426. In one embodiment, the remaining power conversion phases (e.g., power conversion phase 413, power conversion phase 414, and power conversion phase 415) can be configured in a similar manner as power conversion phase 412. In FIG. 17, the power switches in the power conversion phases are labeled SW1, SW2, SW3 and SW4 and the synchronous switches in the power conversion phases are labeled SS1, SS2, SS3 and SS4.

Although four power conversion phases are shown in the figure, it is understood that there may be more or fewer phases. Although one dynamic conversion circuit is shown in the figure, it is understood that there may be more such circuits. Although the power conversion phases and the dynamic conversion circuit are shown to be non-isolated buck switching power converters as an example embodiment, it is understood that many other converter topologies may be alternatively used, as discussed previously.

In the context of the present example, the controller 400 comprises a reference voltage generator 432 for generating a setpoint voltage, $V_{SET}$, indicative of a desired regulated value of the output voltage, $V_o$. As shown in FIG. 17, the setpoint generator may accept one or more inputs (e.g., inputs $IN_1$, $IN_2$ ... $IN_M$) for modifying or choosing the value of the voltage $V_{SET}$ (e.g., the inputs $IN_1$, $IN_2$ ... $IN_M$ may be measurements of power supply current(s) and $V_{SET}$ may be modified according to the value(s) of the current(s) or they may be digital or analog inputs that alter the setpoint voltage value, $V_{SET}$).

Difference amplifier 434 compares the setpoint voltage, $V_{SET}$, to the output voltage, $V_o$, and delivers (i.e., produces) an analog error voltage $V_{ea}$, indicative of the difference between the instantaneous values of $V_{SET}$ and $V_o$, to an anti-aliasing filter 436.

The output of the anti-aliasing filter 436 drives error voltage A/D 438. Error voltage A/D outputs digitized samples of the detected error voltage, $V_{ed}$. By digitizing the error voltage (as opposed to digitizing the load voltage and comparing it digitally to a digital setpoint) the dynamic control range of the controller 401 may be increased.

According to one embodiment, the error voltage A/D 438 operates at a conversion rate (e.g., 100 million samples-per-second) that is very high compared to the operating frequency of the converter. This enables generation of a wideband digitized error signal, $V_{ed}$, of sufficient bandwidth and resolution to track rapid changes in the error voltage.

Wideband digitized error signal, $V_{ed}$, is delivered directly to the second non-linear controller 444 and is filtered by a low pass filter 440 (e.g., a filter having a bandwidth of 5 MHz) for delivery, as the filtered error signal, $V_{edf}$, to linear controller 442 (e.g., a PI or PID controller) and to first non-linear controller 446.

In response to receiving signals from the linear controller 442 and the first non-linear controller 446, the PWM (Pulse Width Modulation) generator 448 adjusts the relative timing and duration of the drive signals P1-P4 delivered to the power phase drivers 406-409.

As shown in FIG. 17, the PWM generator 448 may have additional inputs (e.g., current measurements, logic controls) that may influence the timing and duration of the signals P1-P4.

According to one embodiment as shown in FIG. 17, the first non-linear controller (e.g., FNLC) 446 comprises three outputs that are delivered to the PWM generator 448. A sub-period boundary register 447 (e.g., SPBREG), associated with the operation of the FNLC as described below, delivers a digital value, SPBREG, indicative of when, during a converter operating cycle, the PWM generator 448 may turn on another switch, as also described below.

The output signal ALLACT from FNLC 446 is a binary output that, when high, invokes the PWM generator 448 to turn on all four drive signals P1-P4, as described below. The output signal 0ACT from FNLC 446 is a binary output that, when high, invokes the PWM generator 448 to turn off all of the four drive signals P1-P4, as described below.

In one embodiment, the first non-linear controller 446 can deliver a binary PEN output signal to the DIS input of each of the driver circuits 406-406. When the PEN signal is high, the PS and SS outputs of each switch driver circuit (e.g., 406-409) is under the control of its respective IN input (e.g., when IN is high PS turns on its respective power switch and SS turns off its respective synchronous switch and vice versa). When the PEN signal is low, however, the PS and SS outputs are no longer under the control of the IN input, but are forced to a state that turns both the power and the synchronous switches to their off states.

The second non-linear controller 444 comprises four outputs. The output signal FHI is a binary output that, when high, forces the ALLACT output of the first non-linear controller 446 into a high state; the output signal FLO of second non-linear controller 444 is a binary output that, when high, forces the 0ACT output of the first non-linear controller 446 into a high state; the X1 output of the second non-linear controller 444 is a binary signal that is delivered to the IN input of switch driver 404.

The XEN signal produced by second non-linear controller 444 is a binary output that is delivered to the DIS input of switch driver 404. When the XEN signal is high, the PX and SX outputs of switch driver 404 are under the control of its IN input (when IN is high PX turns on the power switch in the dynamic conversion circuit 410 and SX turns off the synchronous switch in the dynamic conversion circuit and vice versa); when the XEN signal is low, however, the PX and SX outputs are no longer under the control of the IN input, but are forced to a state that turns both the power and the synchronous switches in the dynamic conversion circuit to their off states.

In a Normal Steady State Mode, the power supply system of FIG. 17 can be configured to operate in the same manner as described above with respect FIGS. 7 and 9. For example, the power switches 424 and the synchronous switches 426 in the four power conversion phases 412-415 (FIG. 17) are controlled by the linear controller 442 and the PWM generator 448 to operate in a non-overlapping, interleaved fashion, in a series of converter operating cycles, as a means of regulating the load voltage, $V_o$, at the setpoint value.

For example, in an Normal Steady State Mode, the converter of FIG. 17 may operate with a converter operating cycle having a converter operating period of Ts=2.5 microseconds, corresponding to a converter operating frequency of 400 KHz. For a converter with four power conversion phases, each phase will be activated during a respective phase period, Tpp, that is nominally equal in duration to one quarter of each converter operating period (e.g., for Ts=2.5 microseconds, the phase periods would each be nominally Tpp=625 nanoseconds). An example of such timing is shown in FIG. 20. For small step changes in load current, or for larger changes that occur over a relatively long time period, the load voltage may be regulated to stay within a desired tolerance band by the action of linear controller 442 alone (e.g., by PI or PID control of the duty cycle of the power conversion phases).

In a Normal Steady State Mode of the present example, under linear feedback control, the dynamic response to a step change in current typically takes place over a time scale that is relatively long compared to the period of the converter operating cycle, the time response being limited by, among other factors, the bandwidth of the linear controller. Furthermore, the slew rate of the current delivered by a power conversion phase is limited to $dI/dt=(V_{IN}-V_o)/L_o$. Large step changes in load current, however, often take place on a time scale that is a very small fraction of the converter operating period.

As discussed above, one way to maintain the load voltage within a defined tolerance band, as the load current undergoes a large and rapid change, is to use relatively large amounts of storage capacitance (illustrated in FIG. 17 as capacitor 418) to supply charge to the load until the linear feedback loop can respond.

Another way to maintain the load voltage, Vo, within a defined range is to provide means for increasing the rate at which the output current of the power supply system can be slewed and activate those means promptly in response to a change in current. This "non-linear" response bypasses the linear controller until conditions (e.g., inductor currents, error voltage) are such that linear control can be safely resumed. By increasing the timeliness and rate at which charge (e.g., energy) can be supplied to the load, non-linear control may allow a substantial reduction in output capacitance.

Figure 18A:
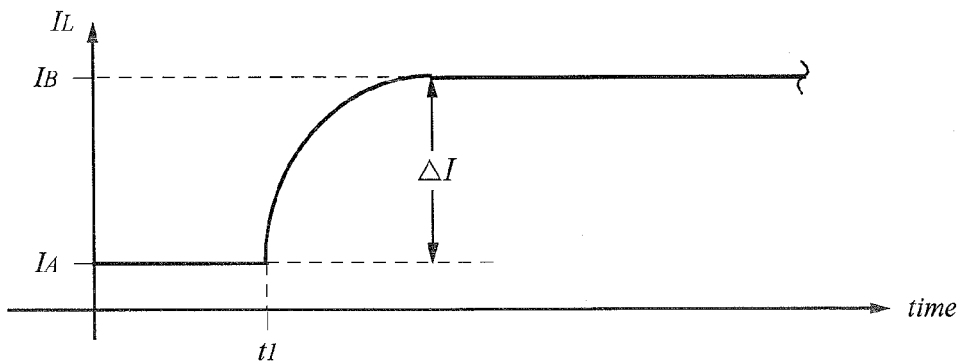
FIGS. 18A and 18B are example diagrams illustrating timing diagrams according to embodiments herein.
Figure 18B:
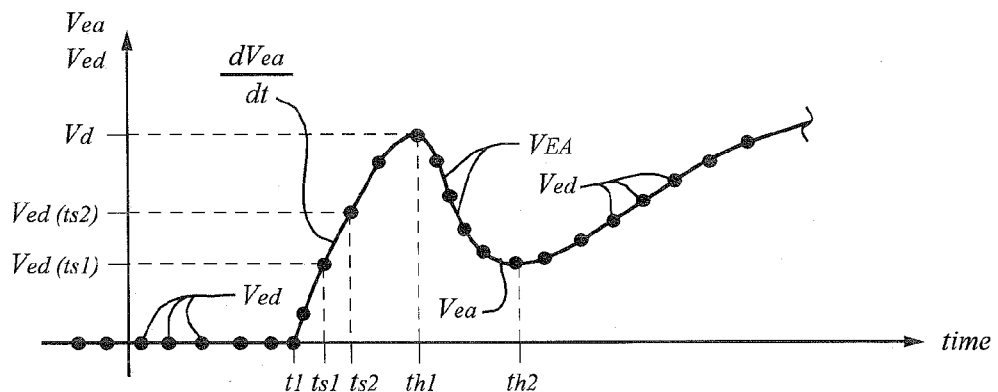

FIG. 18B is an example timing diagram illustrating how the error voltage (i.e., the deviation of the load voltage from its setpoint) may vary in response to a relatively rapid increase in load current, $\Delta I$ (FIG. 18A). By "relatively rapid" we mean that the change in load current occurs over a period which is relatively small (e.g., in one embodiment 50 nanoseconds) compared to the converter operating period (e.g., in the same referenced embodiment, 2.5 microseconds).

The instantaneous magnitude of the error voltage appears in the controller as the analog error voltage signal $V_{ea}$ and is represented in FIG. 18B by a continuous waveform, $V_{EA}$.

Figure 19:
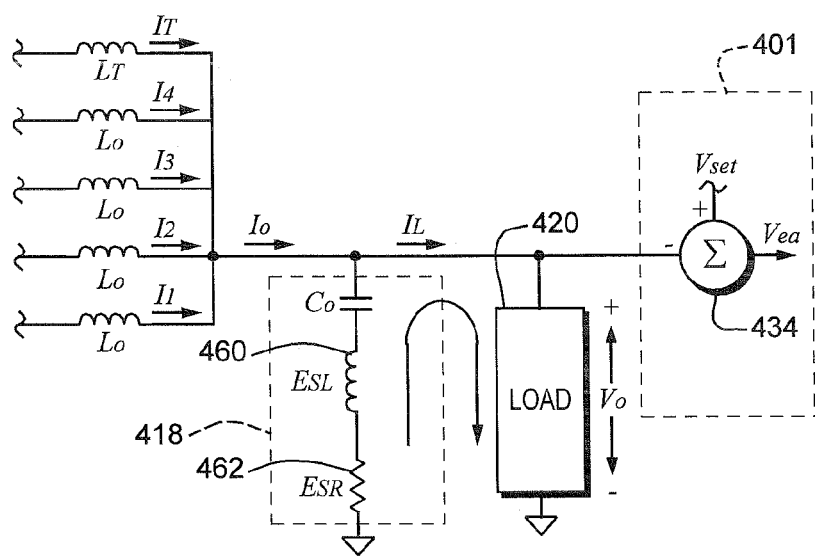
FIG. 19 is a diagram illustrating example circuitry according to embodiments herein.

The digitized output of the error A/D 438, $V_{ed}$, is represented in FIG. 18B by the periodically spaced dots that lay along the continuous waveform, $V_{EA}$. Because the rapid change in current required by load 420 around time $t_1$, current flows from the storage capacitor bank 418 to the load 420 as shown in FIG. 19. The time variation in the error voltage immediately following time $t_1$ will be a function of the equivalent series resistance (ESR) 462 and equivalent series inductance (ESL) 460 associated with the storage capacitor bank 418. As shown in FIG. 18B, the variation in the error may comprise an initial peak deviation in voltage, $V_d$, at time $t_{h1}$, and a "ringback" to lower voltage values (e.g., between times $t_{h1}$ and $t_{h2}$).

For a particular arrangement of storage capacitors (e.g., configuration of storage capacitor bank), the peak deviation ($V_d$, FIG. 18B) in the error voltage and the time rate-of-change (slope) of the error voltage (between, e.g., times t1 and th) may be used to estimate the magnitude, $\Delta I$, and dynamics of the increase in $I_L$. For periodic samples, the time-rate-of change of the error voltage is directly proportional to the difference between the values of equally spaced samples (e.g, in FIG. 18B, $dVea/dt \propto (Ved(ts2)-Ved(ts1))$.

During operation, both the first non-linear controller 446 and second non-linear controller 444 monitor and compare the magnitude and rate-of-change of their respective digitized error voltage signal input, $V_{edf}$ and $V_{ed}$, to a set of pre-defined thresholds. Based on the comparison, the first non-linear controller 446 and the second non-linear controller 444 activate their respective outputs, according to respective algorithms.

In one embodiment, the first non-linear controller 446 provides a graded response to a range of increases in load current by altering the timing of the activation of one or more of the power switches (e.g., switch 1, switch 2, switch 3, and switch 4) in the power conversion phases 412-415, depending on the severity of the step (e.g., change in load current), as described below.

The second non-linear controller 444 can be configured to respond to larger increases in load current by forcing the first non-linear controller 446 to activate (e.g., simultaneously activate) all of the power switches (e.g., switch 1, switch 2, switch 3, and switch 4) in all of the phases 412-415 and by also turning on the power switch (e.g., switch PD) in the dynamic conversion circuit 410, as described below. Thus, the second non-linear controller 444 can be configured to control the power switches for responding almost immediately to a change in the voltage, Vo, with respect to load 420.

In operation, the first non-linear controller ("FNLC") 446 monitors both the magnitude, Vedf, and the rate-of-change (slope) of the filtered error voltage, dVedf/dt, and compares them to corresponding pre-defined thresholds. The rate of comparing can be a rate much higher than the converter operating frequency. If one or more pre-defined magnitude and slope thresholds are exceeded, the algorithm may cause the turn-on time of one or more power switches to be advanced in time (e.g., turned ON earlier in a corresponding timing cycle). The degree or amount of advance may be in accordance with a pre-defined function.

The times at which switches (e.g., switch 1, switch 2, switch 3, and switch 4) are turned off, after being turned on under control of the FNLC 446, may also be based upon magnitude and slope information and may also be in accordance with a pre-defined function. An example illustrating use of such an algorithm is described below with reference to FIGS. 20-24.

FIG. 20 is a timing diagram illustrating and defining certain timing relationships within a converter operating period according to embodiments herein. In the context of the present example, the power converter has four power conversion phases (as in FIG. 17) operating in a Normal Steady State Mode. Note again that the techniques discussed herein be applied to a power converter having any number of phases.

The power converter operating cycle, Ts, comprises four full phase periods, each phase period having a duration Tpp.

According to one embodiment, each phase period is divided into a plurality of sub-periods of equal length (e.g., in FIG. 20 there are 16 sub-periods within each phase period Tpp). The dashed vertical lines in FIG. 20 define sub-period boundaries, i.e., the instants in time that divide sub-periods.

A corresponding sub-period counter (e.g., sub-period counter 449, FIG. 17) keeps track of how much time or sub-periods have elapsed since the most recent turning-on of a power switch in a corresponding phase. The (digital) value, SPCOUNT, produced by the sub-period counter is shown in FIG. 20E.

Whenever a corresponding switch, one of switches SW1-SW4, is turned to an ON state, the corresponding sub-period counter 449 is reset to 1. Resetting of the counter 449 is shown in FIG. 20 at the beginning of each phase period such as at times t1, t2, t3, t4 and t5).

In a Normal Steady State Mode according to one embodiment, the sub-period counter 449 periodically cycles through its full count (i.e., an example full count is 16 as shown in FIG. 20). Each cycle of 16 counts corresponds to a phase period of length, Tpp.

As illustrated in FIG. 17, a sub-period boundary register 447 delivers a digital value, SPBREG, indicative of a sub-period boundary at which the PWM Generator 448 may initiate turning on another switch, as described in more detail below.

In one embodiment, an algorithm associated with the FNLC 446 comprises a plurality of pre-determined magnitude thresholds. For example, it may comprise thirteen discrete pre-determined magnitude thresholds, MT1, MT2, MT3 . . . MT13. The number associated with a threshold label is its numeric identifier (e.g., 12 is the numeric identifier of threshold MT12); higher numeric identifiers corresponding to lower values of threshold (e.g. MT1 is the highest magnitude threshold and MT13 is the lowest).

FIG. 21G is an example timing diagram showing a time plot of Vedf with thirteen magnitude thresholds labeled and superimposed on the plot as dashed horizontal lines, according to embodiments herein. The equal distribution of the dashed lines in the Figure is for ease of illustration only. In practice, the difference between threshold values may or may not be equal.

Note that the FNLC 446 algorithm may also comprise a plurality of pre-determined slope thresholds. For example, the first non-linear controller 446 can maintain two different predefined slope thresholds ST1 and ST2.

The examples that follow are for a four-phase power converter and comprise thirteen magnitude thresholds and two slope thresholds, as previously described. The five highest magnitude thresholds, MT5-MT1, are associated with the first slope threshold, ST1, and form a first control threshold group. The eight remaining lower magnitude thresholds, MT13-MT6, are associated with slope threshold ST2, forming a second control threshold group. As will be discussed below, each threshold group will be used to determine when and/or how long to turn on one or more power switches to account for the increased needs of load 420.

During operation, the first non-linear controller 446 asserts control action (e.g., turns switches ON and/or OFF) if it senses that a perturbation in Vedf: (1) falls within the first control threshold group (i.e., Vedf has a magnitude greater than threshold MT5 and a slope greater than ST1), or (2) falls within the second control threshold group (i.e., Vedf has a magnitude greater than one of thresholds MT13 through MT6 and a slope greater than ST2). Upon sensing either condition, and if no other power switch is currently turned on, the FNLC 446 begins a continuous process of determining when the next switch is to be turned on. During this process, the FNLC updates a value stored in a sub-period boundary register (SPBREG 447, FIG. 17), the value in SPBREG corresponding to the value of SPCOUNT (as previously discussed with respect to FIG. 20) at which the next switch may be turned on. In such an embodiment, the SPBREG value corresponds to the sub-period following the turn-on time of the last switch to be turned on, during which the next switch may be turned on, based on the highest magnitude threshold that is being exceeded within a control threshold group.

For example, according to an example embodiment, the numeric identifiers of the thresholds may correspond directly to an SPCOUNT value. If the slope of Vedf is greater than ST2 and magnitude of Vedf exceeds a threshold such as MT11, but does not exceed threshold MT10, the FNLC 446 will set the sub-period to a value of 11 (rather than the normal value of 16) as the sub-period during which the next switch may be turned on. An illustration of the latter switch timing function is shown in FIG. 21. In this way, the first non-linear controller 446 can advance the turn ON time of a respective one of power switches to account for an increase in current demanded by the load 420. For example, to reduce a respective reduction in output voltage in response to a change in load current, the first non-linear controller 446 enables turning on of switch 2 in fewer than the 16 counts that would otherwise be the case for a steady-state load condition. Advancement is illustrated in FIGS. 21I and 21L, as there are only 10 counts between time t5 and time t6a, instead of the normal 16 counts.

In general, FIGS. 21B-21F show the timing control associated with the power switches, SW1-SW4, in an example four-phase converter as described herein. As previously discussed, the converter operates in Normal Steady State Mode between times t1 and t5 (prior to a change in load 420 current), with a converter operating period Ts and a phase period Tpp. Note that FIGS. 21G-21L show an exploded, detailed, view of the time period between t5 and t8a.

Figure 21A:
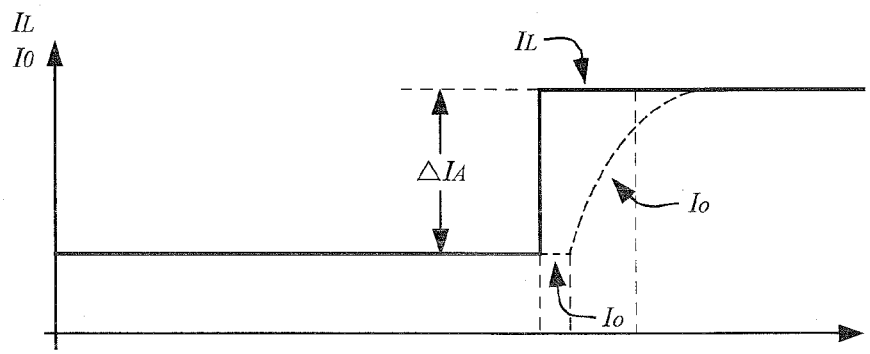
Figure 21B:
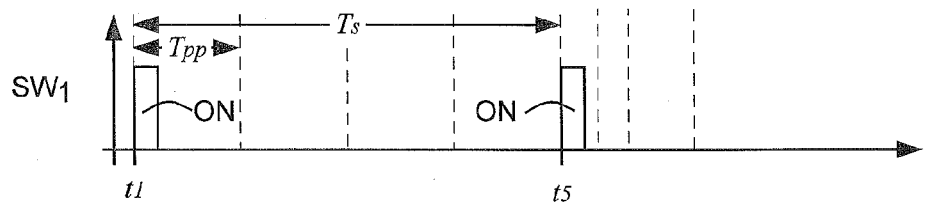

Referring now more specifically to FIGS. 21A and 21G, a (relatively small) load transient (ΔIa, FIG. 21A) occurs during a phase period associated with power switch SW1 (Note: FIG. 21A shows the currents $I_L$ and $I_O$ as being constant and without variation during the period preceding the load transient. There may be variations in the currents $I_L$ and $I_O$ associated with the variations in inductor currents in the various converter phases. For clarity sake, these variations are not shown in FIGS. 21A, 22A, 30A, 32A, 33A and 35A). The change in load 420 causes a perturbation in Vedf to begin at time tx1. As previously discussed, the first non-linear controller 446 monitors voltage Vedf. In this example, the FNLC 446 determines that the slope of Vedf following time tx1 is initially greater than slope threshold ST2. In response to detecting such a condition, the FNLC 446 initiates control action as discussed below to provide extra current to load 420, preventing a droop on output voltage Vo.

In operation, the FNLC 446 continuously monitors the magnitude and slope of Vedf and makes and updates determinations as to when the next switch in the sequence of switches (e.g., switch 1, switch 2, switch 3, and switch 4) is to be turned on. These determinations may be stored in the sub-period boundary counter (447, FIG. 17) as a digital value, SPBREG, indicative of a sub-period boundary at which the next power switch is to be turned on.

Three examples of the FNLC's process of determining and updating are illustrated in FIG. 21G. At time t8, for example, during sub-period 8 (as indicated by an "x" on the Vedf waveform at time t8 and when the SPCOUNT in FIG. 21L is equal to 8), the first non-linear controller detects that slope of Vedf is greater than slope threshold ST2 and the magnitude of Vedf is slightly greater than threshold value MT11, but less than threshold value MT10.

Based on detecting such conditions, the FNLC 446 therefore determines that the next switch (e.g., switch 2) is to be turned on at the boundary following sub-period 11 and sets the SPBREG value in the sub-period boundary register 447 to a value of 11. The PWM generator compares the SPREG value in register 447 to the current value, SPCOUNT, in the sub-period counter 449. In this case, because the value in SPBREG (11), indicative of the sub-period during which the next switch is to be turned on, is greater than the value of SPCOUNT (8), no action is taken by the PWM Generator. At time t9, during sub-period 9 (as indicated by an "x" on the Vedf waveform at time t9), the slope of Vedf is still greater than ST2 and the magnitude of Vedf is slightly greater than threshold value MT10, but less than threshold value MT9. Based on such conditions, the FNLC determines that the next switch (e.g., switch 2) is to be turned on at the boundary following sub-period 10 at time t6a and sets the SPBREG value in the sub-period boundary register 447 to a value of 10.

The PWM Generator 448 compares the value in SPBREG (10) to the value of SPCOUNT (9), and, because a current value of SPCOUNT (e.g., a value of 9) is still less than SPBREG, the PWM generator 448 takes no control action with respect to power switches.

At time t10, during sub-period 10 (as indicated by an "x" on the Vedf waveform at time t10 of FIG. 21G), the slope of Vedf is greater than ST2 and the magnitude of Vedf is slightly greater than threshold value MT9, but less than threshold value MT8. Based on detecting such conditions, the FNLC 446 therefore determines that the next switch is to be turned on at the boundary following sub-period 9 and sets the SPBREG value in the sub-period boundary register 447 to a value of 9. The PWM Generator 448 compares the current value in SPBREG (9) to the current value of SPCOUNT (10), and, because SPCOUNT is now greater than SPBREG, the first non-linear controller 446 takes action to turn the next switch (e.g., switch 2) to an ON state at the end of the current sub-period (sub-period 10). Accordingly, embodiments include monitoring the output voltage Vo and initiating an advanced or earlier turning on of a following next phase than would occur if there were no increased demand for current.

Figure 21C:
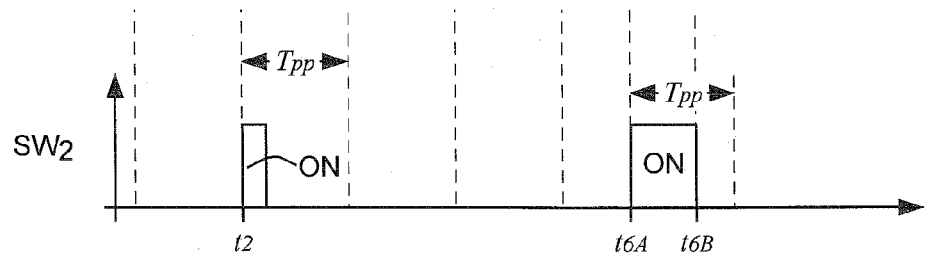
Figure 21E:
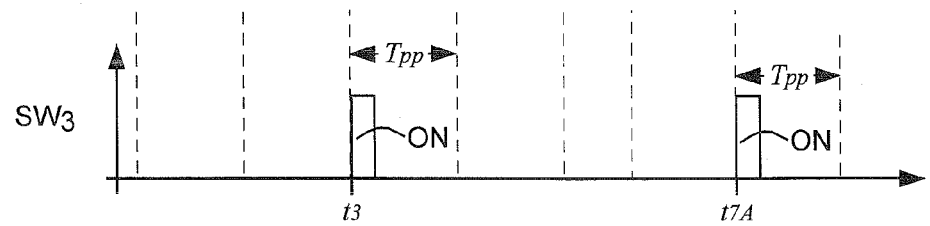
Figure 21F:
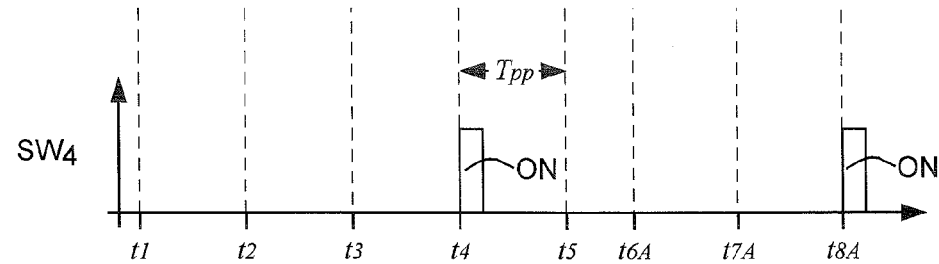

The turning-on of switch SW2, and the resetting of the sub-period counter to a value of 1 at time t6a at the end of sub-period 10 are illustrated in FIGS. 21C, 21I and 21L. Based on the process as described herein, the FNLC 446 causes the turning-on of a switch to be advanced in time relative to the time at which it would otherwise have turned on in Normal Steady State Mode, thereby increasing the rate at which energy is delivered to the load.

The FNLC 446 continues to monitor both the magnitude and slope of Vedf to determine whether and when additional switches might need to be turned on and to also determine, based on its pre-defined function, when switches must be turned off. As previously discussed, each time that a corresponding switch is turned to an ON state, the sub-period counter 449 is reset to 1 and the FNLC process continues the processing of its algorithm to detect changes in the output voltage Vo. This may result in the turning on of several switches in a sequence one after the other or multiple switches at the same time.

Continuing with the example of FIG. 21, at time tm1 (FIG. 21G), during sub-period 3 following the turn-on of switch SW2, the slope of Vedf declines to zero as the magnitude of Vedf reaches a maximum. Thereafter, the slope of Vedf remains negative, indicating that the load voltage is returning toward its setpoint value. When the FNLC 446 senses that the slope of Vedf has been negative, or that the value of Vedf is below the lowest threshold (MT13), for a pre-determined number of sample periods (i.e., the periods between the samples indicated by the dots in FIG. 18B) (e.g., for a power converter in which each phase period comprises 16 sub-periods, the pre-determined number of sample periods may correspond to a total time period of approximately one sub-period), the FNLC 446 will set the value in the SPBREG register 447 to 16, which is interpreted by the PWM generator 448 as an instruction to turn switch SW2 off.

In the example of FIG. 21, for example, the FNLC 446 may set the value in the SPBREG register 447 to 16 at time t6f (FIGS. 21G and 21I). In response, the PWM generator 448 will determine whether switch SW2 has been on for a time period that is greater than the on-time period that would otherwise have been effective during Normal Steady State Mode just prior to assertion of FNLC action (the "NSSM Period"): if true, the PWM generator 448 will turn SW2 off essentially immediately; if false, it will wait until switch SW2 has been on for a period essentially equal to the NSSM Period and then turn SW2 off. In FIG. 21H, the NSSM Period (the on-time of switch SW1) is shown to be approximately 4.5 sub-periods. At time t6f, switch SW2 has not yet been on for a period equal to an NSSM Period; therefore, the PWM generator 448 waits until time t6b (when the on-time of SW2 equals one NSSM period), at which time it turns switch SW2 off. Because no further FNLC action is asserted after time tm1, Normal Steady State Mode will resume after the sub-period counter 449 reaches it full cycle count of 16, at time t7a (FIGS. 21E, 21J, 21L), with the turning on of switch SW3. In certain cases, described below, it may also be necessary to meet additional test criteria prior to turning a switch off.

A more severe transient condition, sufficient to cause the FNLC 446 to advance the timing of more than one switch, is illustrated in FIG. 22. In FIGS. 22A-22F, between times t1 and t5, the operation of the converter and use of control threshold groups is similar as described above with respect to FIG. 21. However, in this example, because the transient condition is so large, the first non-linear controller 446 initiates advancing turn ON of multiple switches such that multiple switches are at least temporarily turned to an ON state at the same time.

Figure 22A:
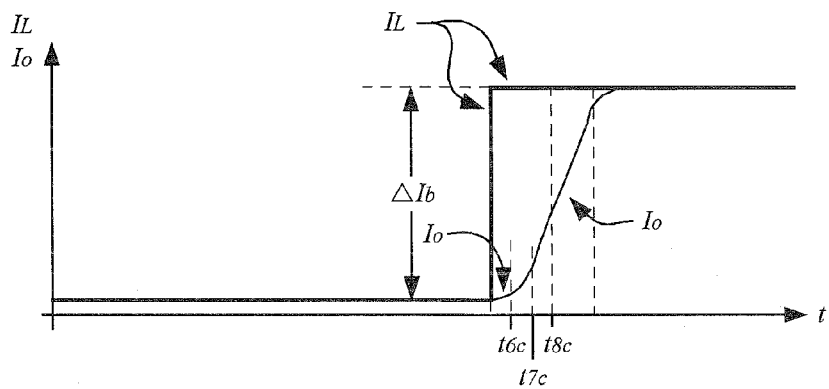
Figure 22B:
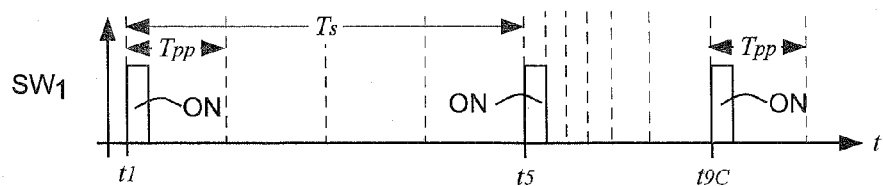
Figure 22C:
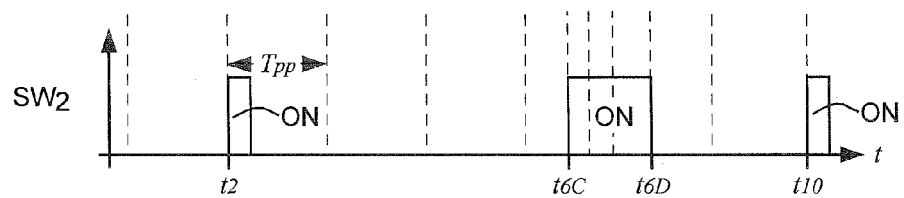
Figure 22E:
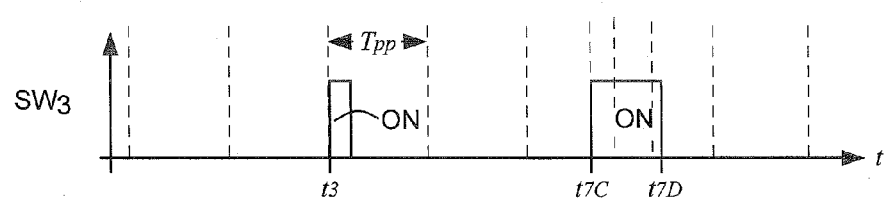
Figure 22F:
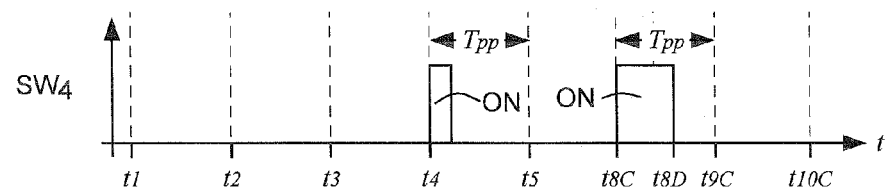
Figure 23A:
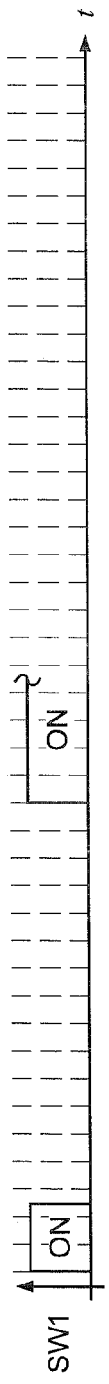
FIGS. 23A, 23B, 23C, 23D, and 23E are example timing diagrams illustrating activation of multiple power converter phases in parallel according to embodiments herein.
Figure 23B:
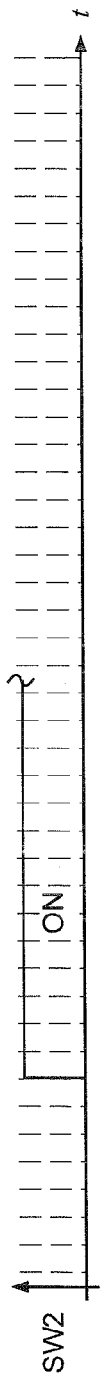
Figure 23C:
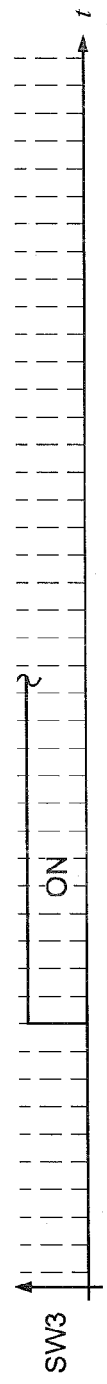
Figure 23D:
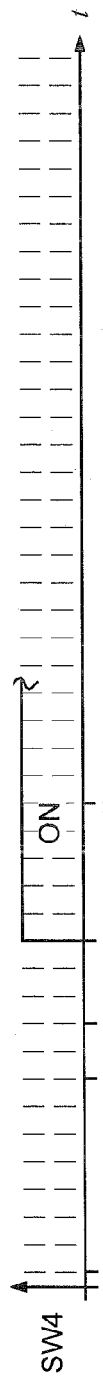
Figure 23E:
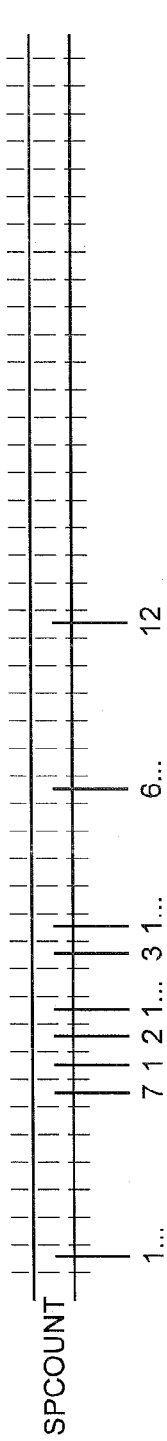

Referring to FIGS. 22A and 22G (FIGS. 22G-22L show an exploded, detailed, timing view of the time period following time t5), a (relatively large) load transient (ΔIb as shown in FIG. 22A) occurs during or near a phase period associated with power switch SW1. The change in load 420 causes a perturbation in Vedf to begin at time tx2. Based on corresponding monitoring of the output voltage Vo, the FNLC 446 determines that the slope of Vedf following time tx2 (in FIG. 22G) is greater than slope ST1.

As described above for the example of FIG. 21, the FNLC 446 continuously monitors the magnitude and slope of Vedf and makes and updates determinations as to when the next switch or switches are to be turned on. As also discussed earlier, if no power switch is currently in an ON state, the FNLC 446 may set the value, SPBREG, in the sub-period boundary register 447, equal to the numeric identifier of the highest magnitude threshold that is being exceeded (within a control threshold group), to indicate to the PWM generator 448 the SPCOUNT value at which the next switch is to be turned on.

Because the rate-of-change of output current, dIo/dt, through the load 420 is proportional to the number of switches that are turned on, the PWM Generator 448 may feature a graded approach to turning on additional switches. For example, delaying the point in time at which an additional switch is to be turned on can provide extra time during which the FNLC can determine whether Vedf may be coming under control and not require the boost in energy delivery that would be afforded by another switch also in the ON state.

As shown in FIG. 22, the PWM generator 448 uses a so-called "1,2,4 sequence" set of rules for turning on additional switches. For example, (1) if one switch is already on, the PWM Generator 448 will add one to the value, SPBREG, stored in the sub-period boundary register 447 (i.e., the numeric identifier of the highest magnitude threshold that is being exceeded within a control threshold group) to determine the SPCOUNT value at which the next switch in the sequence is to be turned on; (2) if two switches are already on, the PWM Generator 448 will add two to the value, SPBREG, stored in the sub-period boundary register 447 to determine the SPCOUNT value at which the next switch is to be turned on; and (3) if three switches are already on, the PWM Generator 448 will add four to the value, SPBREG, stored in the sub-period boundary register 447 to determine the SPCOUNT value at which the next switch is to be turned on.

As Vedf increases from a value of zero in response to a transient load condition, voltage Vedf passes through magnitude thresholds (e.g., MT13, MT12, MT11, . . . , MT1) having decreasing numeric identifiers. Under these circumstances, the increasing value of SPCOUNT may eventually converge with the decreasing value of the numeric identifier of the threshold and cause a switch to turn on. In some cases, however, a threshold may be exceeded whose numeric identifier is greater than or equal to the SPCOUNT value currently in the sub-period counter. In such a circumstance, and if no other switches are on, the next switch may be turned on essentially immediately.

An example of this is shown in FIG. 22: at time t10, during sub-period 7 (as indicated by an "x" on the Vedf voltage waveform at time t10 as shown in FIG. 22G), Vedf has risen above threshold MT3. Because the SPCOUNT of the sub-period (i.e., 7) is greater than the numeric identifier of the magnitude threshold (i.e., the value, SPBREG=3, stored in the sub-period boundary register 447), the PWM Generator 448 will turn on switch SW2 essentially immediately, at time t6c (FIG. 22I) at the sub-period boundary at the end of sub-period 7.

For large transients, the magnitude of Vedf may be increasing and remain above the MT1 threshold for a period of time. Under this circumstance, switches may be turned on sequentially in the "1,2,4" sequence described above. An example of this is shown in FIG. 22 at time t11, during sub-period 1 (e.g., when SPCOUNT=1) following the turn-on of switch SW2. At such time, the slope of Vedf is greater than slope ST1 and Vedf has risen above threshold MT1 (as indicated by an "x" on the Vedf waveform, FIG. 22G, at time t11). Thus, at time t11, one other switch, SW2, is on, and the FNLC 446 has set the sub-period boundary register 447 to a value of SPBREG=1.

In one embodiment, the "1,2,4" rules require an additional delay of one sub-period, so, the PWM Generator 448 will add one to the value in the sub-period boundary register and turn on the next switch, SW3 (FIG. 22J), at the end of sub-period 2, at time t7c, at which time the sub-period counter is also reset to 1. During sub-period 1 following the turn-on of SW3, Vedf continues to increase to a voltage above threshold MT1, so the "1,2,4" rules will require an additional delay of two sub-periods—thus, at time t8c, the PWM Generator 448 will add two to the value, SPBREG=1, in the sub-period boundary register 447 and turn on the next switch, SW4 (FIG. 22K), at the end of sub-period 3, at time t8c, at which time the sub-period counter is again reset to 1.

If voltage Vedf were to continue to rise, the PWM Generator 448 may, in accordance with the "1,2,4 sequence" rule, cause another switch, SW1, be turned on at the end of sub-period 5 following the turn-on of switch SW4. An example of this is shown in FIG. 23 in which the successive switches are turned ON in a similar manner as discussed with respect to FIG. 22, but with switch SW1 being turned on, at time t9c, at the end of the fourth sub-period following the sub-period during which SW4 was turned-on so that all switches are at least temporarily turned on simultaneously. However, in the example of FIG. 22, Vedf reaches its maximum value, and its slope declines to zero, at time tm, during sub-period 5. Thus, the switches SW2, SW3, and SW4 are turned OFF prior to SW1 being turned ON in a following cycle.

In a similar manner as discussed above with respect to FIG. 21, when the FNLC 446 senses that the slope of Vedf has been negative, or that the value of Vedf is below the lowest threshold (MT13), for a pre-determined number of sample periods (e.g, as described above, for a total time period of approximately one sub-period), the FNLC 446 will set the value in the SPBREG register 447 to a value of 16, which is interpreted by the PWM generator 448 as a signal to turn power switches off. If more than one power switch has been turned on under the control of the first non-linear controller 446, as is the case in the example of FIG. 22, the PWM generator 448 will turn switches off in the order in which they were turned on: the switch that has been on the longest is turned off first. In the example of FIG. 22, for example, the FNLC 446 may set the value in the SPBREG register 447 to 16 at time t6d (FIGS. 22G and 22I). In response, the PWM generator 448 will determine whether the first switch that was turned on under FNLC control (in FIG. 22, SW2) has been on for a time period that is greater than the on-time period that would otherwise have been effective during Normal Steady State Mode just prior to assertion of FNLC action (the "NSSM Period"): if true, the PWM generator 448 will turn SW2 off essentially immediately; if false, it will wait until SW2 has been on for a period essentially equal to the NSSM Period and then turn SW2 off. In FIG. 22H, the NSSM Period (the on-time of SW1) is shown to be approximately 2.5 sub-periods. At time t6d, switch SW2 has been on for a period greater than an NSSM Period; therefore, the PWM generator 448 turns SW2 off essentially immediately following time t6d. Thereafter, each remaining switch will be turned off in the order in which they were turned on, with a fixed delay between the turning-off of the switches. The delay may, for example, be a time period approximately equal to one sub-period. Thus, in FIG. 22, SW3 is turned off at time t7d (FIG. 22J); and SW4 is turned off at time t8d (FIG. 22K). Normal Steady State Mode resumes once the sub-period counter reaches it full cycle count of 16, at time t9c (FIGS. 22B, 22H, 22L), with the turning on of switch SW1.

Figure 38A:
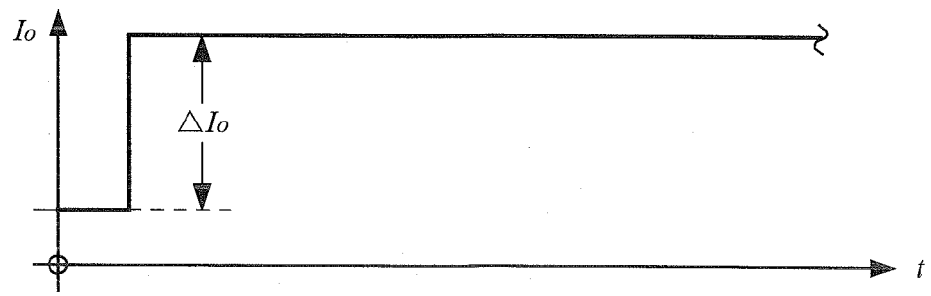
FIGS. 38A, 38B and 38C are example diagrams illustrating timing diagrams according to embodiments herein.
Figure 38B:
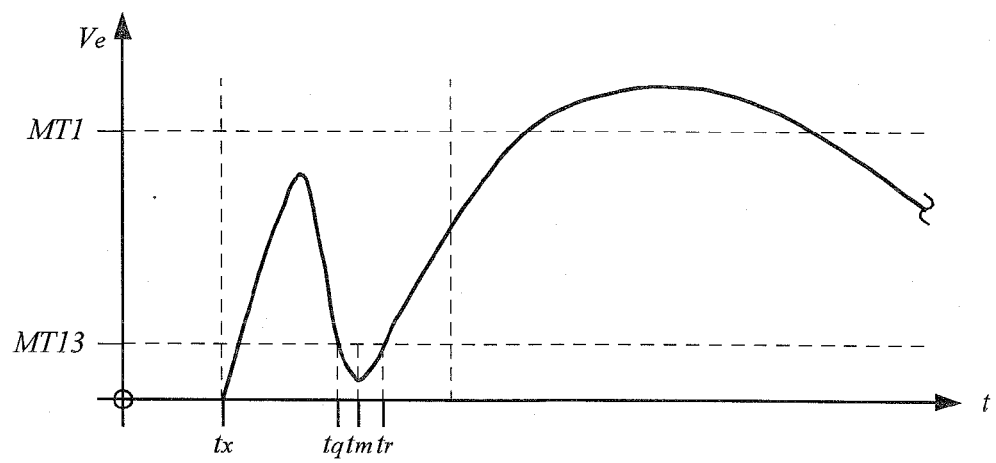

Large steps in load current may cause a large initial peak deviation and a "ringback" in the error voltage waveform, as discussed above with reference to FIG. 18, and this may, if additional steps are not taken, result in switches being turned off prematurely. For example, FIG. 38B shows an example of an error voltage waveform resulting from a large change in load current, $\Delta I_o$ (FIG. 38A). In FIG. 38B, the error voltage waveform, Ve, includes a relatively fast initial "spike," between times tx and tm, followed by a relatively longer and slower variation in Ve after time tm. Following time tm, the error voltage Ve is shown to exceed a maximum threshold, MT1, for a relatively long period of time relative to the length of the spike. In the example of FIG. 38, the lowest and highest magnitude thresholds used by the FNLC are, as in prior examples, MT13 and MT1, respectively.

Figure 38C:
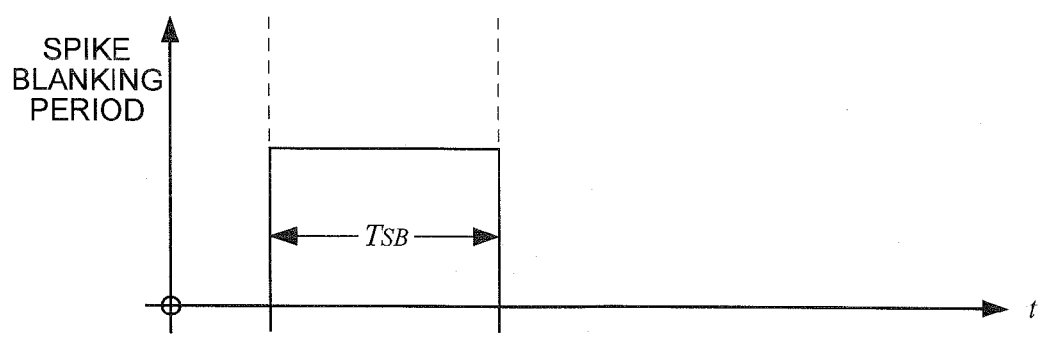

In the example of FIG. 38, the current transient is severe enough so that the ringback causes the error voltage, Ve, to drop below the minimum threshold (MT13) between times tq and tr (FIG. 38B). Because the ringback causes the slope of Ve to be negative and the magnitude of Ve to be below the lowest threshold, MT13, the FNLC may incorrectly interpret these temporary conditions as indications that switches must be turned off. To prevent false turning-off of switches owing to ringback following a large "spike," the FNLC 446 senses when the peak deviation (e.g., $V_p$, FIG. 38B) or slope of the spike are relatively very large and, in response, asserts a short spike blanking period during which both the magnitude and slope of Ve are essentially ignored (provided, in some embodiments, that the error voltage remains positive (i.e., $V_o < V_{SET}$), as discussed below). For example, FIG. 38C shows the duration of a spike blanking period, Tsb, that is long relative to the "spike," but that is short relative to the period during which Ve varies following time tm. During the spike blanking period the FNLC 446 may also force the value in the SBREG 447 at the minimum threshold value (e.g., MT13). If, during the spike blanking period, the magnitude of the error voltage goes positive, the FNLC 446 may signal the PWM generator 448 to turn switches off, as such a condition may indicate that the sudden increase in current that caused the large initial spike was quickly followed by a sharp reduction in current.

In the examples of FIGS. 21 and 22, the change in load current is shown to occur at a time when all of the power switches are turned off. Note that if a change in current is sensed by the first non-linear controller 446 during a time when a power switch is already on, the power switch will be held on and other switches may be activated, depending on the severity of the change in current, in accordance with the FNLC algorithm.

Furthermore, the error voltage waveforms in the examples are always shown to be positive in magnitude. In practice, the error voltage may become negative and the FNLC algorithm may respond to a circumstance where both the magnitude and slope of the error voltage are negative by essentially immediately turning all power switches off.

In the examples of FIGS. 21 and 22 the FNLC 446 uses magnitude and/or slope information to determine when to activate switches in drivers 412-415. In some applications, however, note that the FNLC 446 may monitor both magnitude and slope to determine when to assert control over switch timing, but, once control is asserted, may then ignore slope information and make switch timing decisions solely on the basis of magnitude information for a pre-determined period of time (the "blanking period").

Figure 24A:
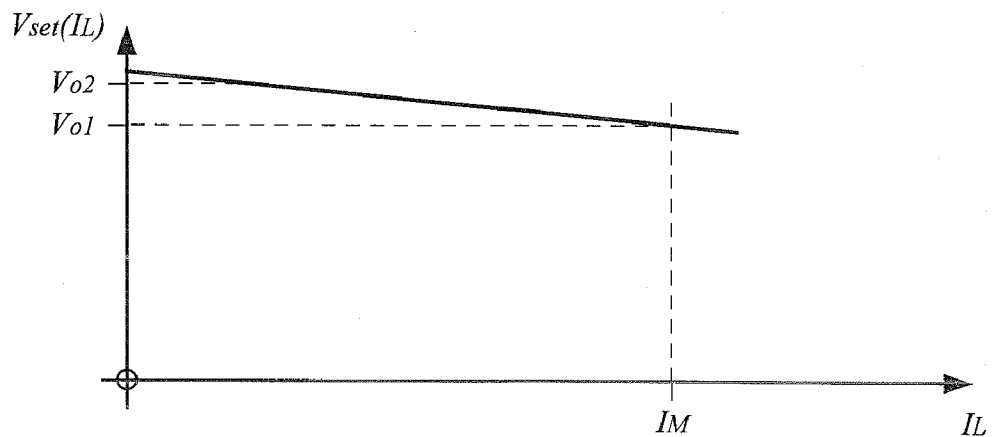
FIGS. 24A, 24B, and 24C are example timing diagrams according to embodiments herein.

One example of such an application may be a power converter using "droop control." As shown in FIG. 24A, the output voltage, Vo, of such a power converter is controlled to decrease ("droop") as the load current, $I_L$, increases. One way to accomplish droop control is to measure the load current and vary the setpoint voltage of the power supply, Vset, as a function of the current measurement. This may, however, have the effect of causing distortions (e.g., flattening) in the error voltage waveform, Ve, relative to the actual variation of the output voltage $\Delta$Vo, as shown in FIGS. 24B and 24C.

Figure 24B:
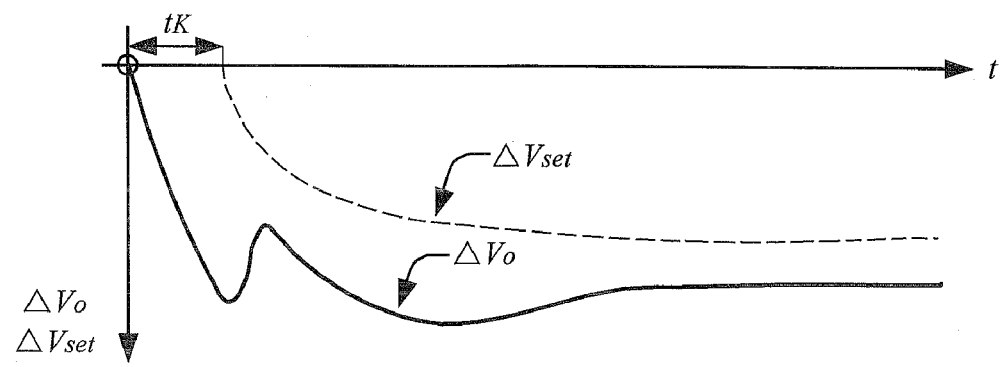

For example, in FIG. 24B, increase in load current (e.g., based on a change in current demanded by load 420) causes the converter output voltage, Vo, to be perturbed, as shown by the waveform labeled $\Delta$Vo. Because Vset is a controlled function of load current, it too will vary with increasing load current, as shown in FIG. 24B by the waveform labeled $\Delta$Vset, but variations in Vset may be delayed in time (e.g., by time tk, FIG. 24B) owing to delays in circuitry used to measure and process the load current information. As a result, the resultant error voltage waveform, Ve=Vset−Vo, may be as shown in FIG. 24C.

Comparing the waveform of $\Delta$Vo in FIG. 24B with the waveform of $\Delta$Vset in FIG. 24B indicates that the slope of $\Delta$Vset may not accurately reflect the slope of $\Delta$Vo. For example, in FIG. 24C, the error voltage Ve may "flatten" (i.e., the slope of the waveform in the section labeled "B" may be small) even though the converter output voltage may still be declining.

Figure 24C:
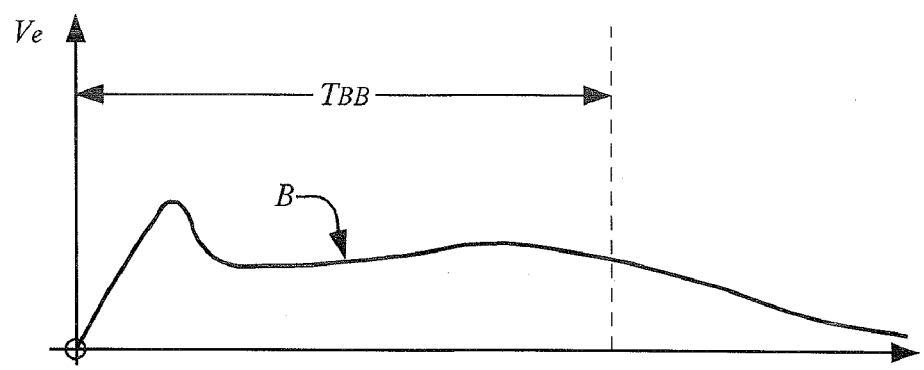

Under the circumstances of FIG. 24, reduction or reversal of the slope of Ve may be misinterpreted by the FNLC as an indication that the output voltage Vo is coming under control. To account for such a condition, it may be desirable for the FNLC 446 to be configured to make switch control decisions solely on the basis of error magnitude during a blanking period of time (e.g., time period $T_{BB}$, FIG. 24C). The blanking period may be a pre-determined interval. For example, in a four phase converter operating with a converter operating frequency of 400 KHz, the blanking period may be set to 650 nanoseconds, which is comparable in length to the Normal Steady State phase period of 625 nanoseconds. Note that the blanking period of FIG. 24 is relatively much longer than the spike blanking period of FIG. 38.

To prevent a large over reaction to a load step that might occur if the slope blanking period is too long, the FNLC 446 may be configured to compare multiple consecutive samples of the slope of the error voltage to a negative blanking slope threshold. When the slope is negative and exceeds the blanking slope threshold for several consecutive samples, an ENDMP signal is sent from the FNLC 446 to the PWM Generator 448 (FIG. 17), The PWM Generator 448 responds to the ENDMP signal only when there are multiple power switches active (e.g., as in the example of FIG. 22). If multiple power switches are active and the FNLC 446 asserts ENDMP, the PWM Generator 448 will turn one of the power switches off. If, after one additional sub-period, ENDMP is still asserted and there are still more than one power switch turned on, the PWM generator 448 will turn another power switch off. This process continues until only one power switch remains active. This last power switch is turned off when the blanking period is over, provided that the slope of Ve is less than the FNLC slope thresholds (e.g, ST2) or the error magnitude is less than MT13. The examples above are illustrative of particular FNLC embodiments. In practice, the FNLC algorithm may be adapted to a particular application. Furthermore, the preceding FNLC examples, comprising a discrete number of thresholds and decomposition of the phase period into discrete sub-periods, lend themselves to digital implementation involving logic circuitry, digital processors, memory and software algorithms. There are, however, many ways to embody a controller comprising an FNLC according to embodiments herein.

Figure 25:
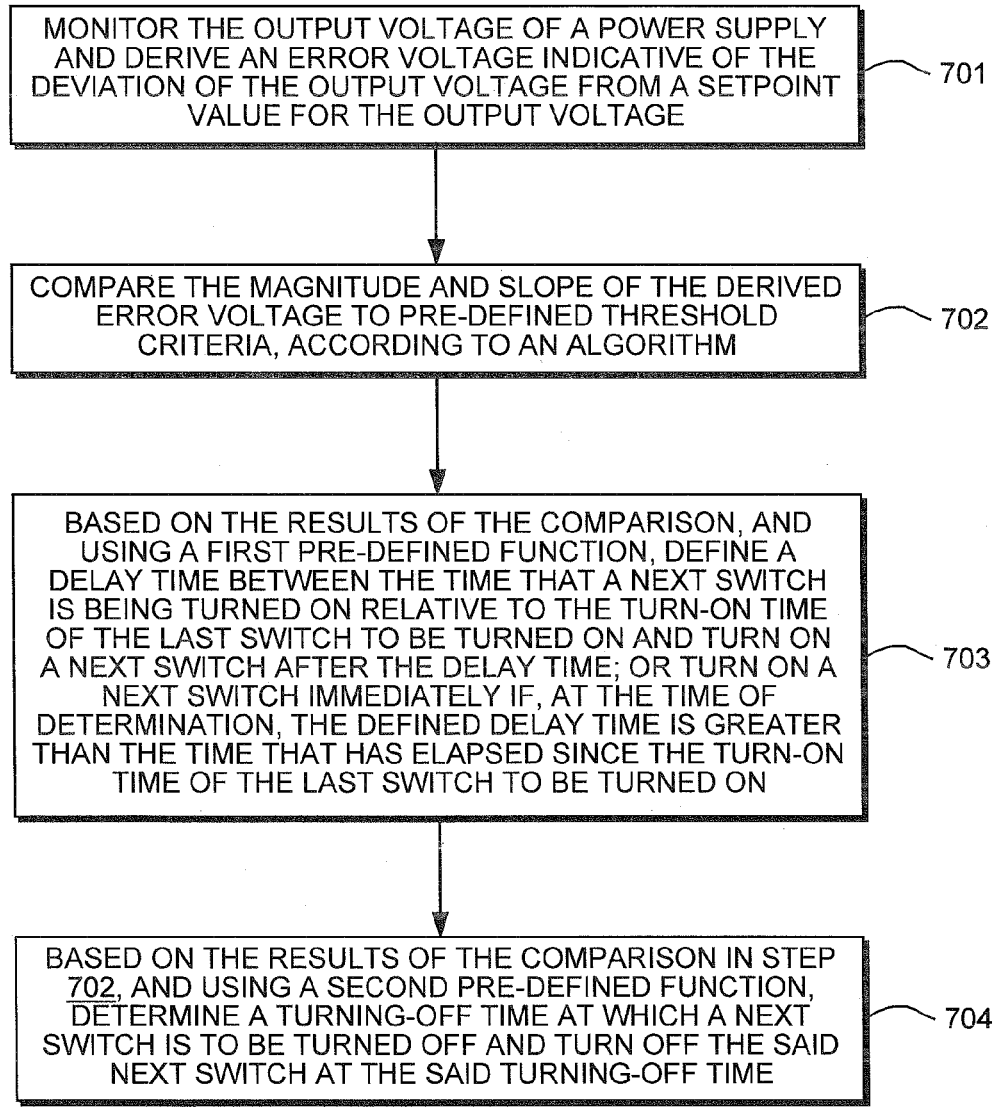
FIG. 25 is an example diagram illustrating a flowchart according to embodiments herein.

In general, as shown in the logic flow diagram of FIG. 25, an FNLC algorithm according to the embodiments herein may comprise the following logical steps:

(1) Monitoring the power converter output voltage (e.g., Vo) to derive an error voltage that is indicative of the deviation of the output voltage from a setpoint value for the output voltage (step 701, FIG. 25);

(2) Comparing the magnitude and slope of the derived error voltage to pre-defined threshold criteria (e.g., slope threshold criteria and/or magnitude threshold criteria), according to an algorithm (step 702, FIG. 25);

(3) Based on the results of the comparison in step 702, and using a first pre-defined function, define a delay time between the time that a next switch is be turned on relative to the turn-on time of the last switch to be turned on and turn on a next switch after the delay time; or turn on a next switch essentially immediately if, at the time of determination, the defined delay time is greater than or equal to the time that has elapsed since the turn-on time of the last switch to be turned on (step 703, FIG. 25).

(4) Based on the results of the comparison in step 702, and using a second pre-defined function, determine a turning-off time at which a next switch is turned off and turn off the said next switch at the said turning-off time (step 704, FIG. 25).

In the examples of FIGS. 21 and 22, the first pre-defined function comprised use of the numeric identifier of the highest magnitude threshold that had been exceeded within a control threshold group to determine the SPCOUNT value at which the next switch may be turned on, and the "1,2,4" sequence for turning multiple switches on. In the examples of FIGS. 21 and 22, the second pre-defined function comprises steps of determining whether to turn off a power switch based on a count of the number of sample periods during which the slope of the error voltage is negative; comparing the time period during which a first power switch has been on to the NSSM Period, the said first power switch being the power switch that has been on for the longest period of time; based on the latter comparison, determining the time at which to turn off the first power switch; and determining the sequence in which the remainder of power switches are to be turned off based on the length of time that each said remaining power switch has been on. These are examples of many possible first and second pre-defined functions.

Figure 29:
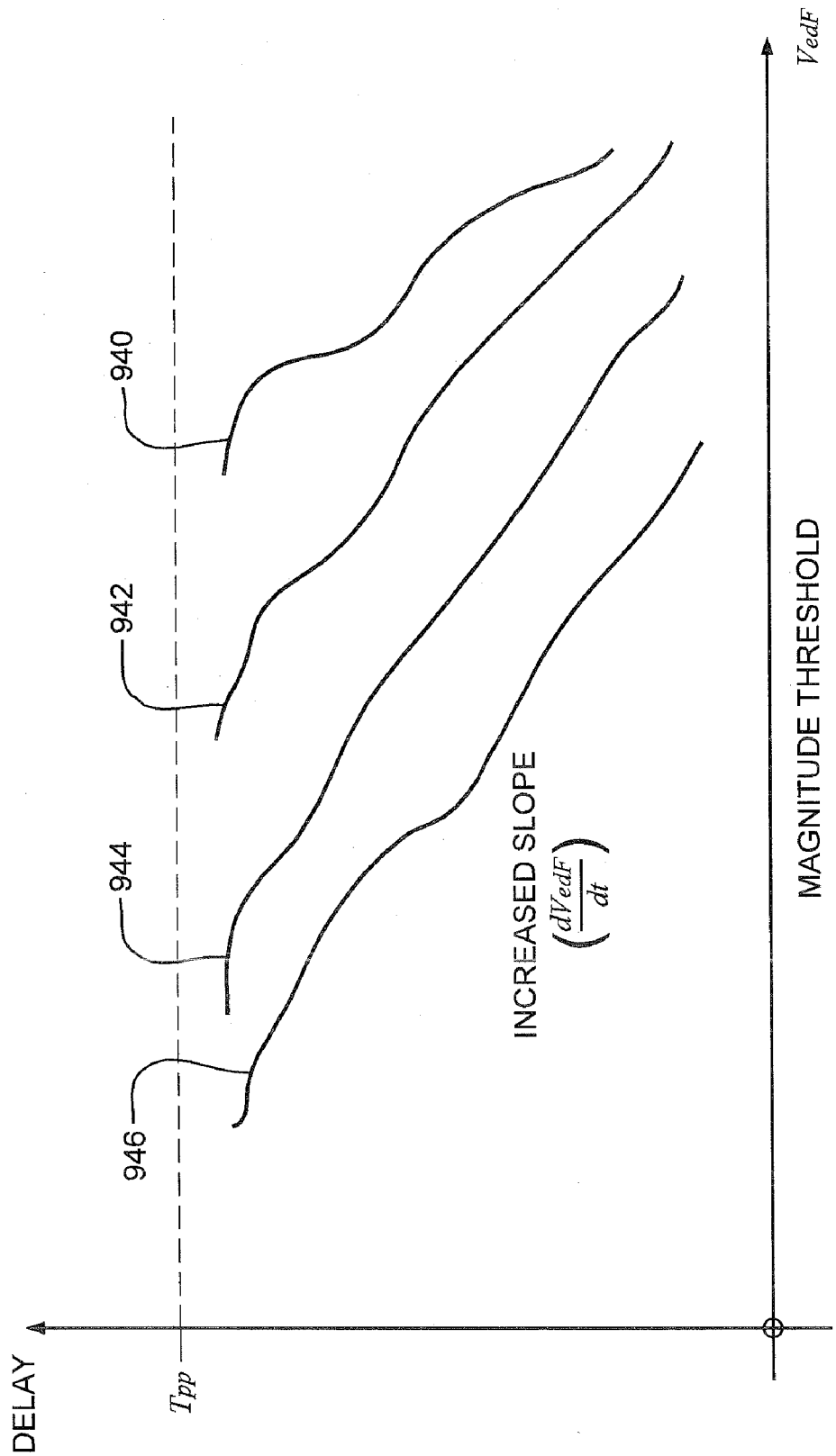
FIG. 29 is an example diagram illustrating a graph according to embodiments herein.

For example, the first and second pre-defined functions might be continuous functions that are implemented in an analog circuitry (or calculated by a digital processor), and the delay time between the turn-on times of switches under FNLC control might be a continuous function. For example, the first pre-defined function might be of the form illustrated in FIG. 29, in which the delay between turn-on times of power switches under FNLC control is a continuous function that decreases with increasing magnitude and slope of Vedf and dVedf/dt (each curve in FIG. 29 942 . . . 946 represents a delay vs. magnitude curve for a particular value of dVedf/dt). The second pre-defined function may also be of a similar, continuous, form. Implementing the algorithm may comprise steps that are carried out by the FNLC itself (e.g., monitoring the slope and magnitude of Vedf, threshold comparisons; storing a value indicative of when a next switch it to turn on) and other carried out by other parts of the controller (e.g., the PWM Generator applying a "1,2,4 sequence" to the timing of multiple switches; turning off switches in a particular order).

In a multiphase power converter with M switching power converter phases (the examples of FIGS. 21 and 22 are for a multiphase power converter with M=4), the rate-of-change of the output current, $I_o$, is a function of the number of power switches, N, that are turned on and the number, M−N, of the synchronous switches that are turned on in the phases whose power switches are off: $dI_o/dt = N*(V_{IN}-V_o)/L_o - (M-N)*V_o/L_o$. Simultaneously enabling more switches results in a greater increase in current within a given time period than would be possible than if fewer switches were turned on. Simultaneously activating more switches enables delivery of relatively more charge to counteract relatively large changes in current. Conversely, turning on fewer switches in response to smaller current steps, and providing a longer time for the current to increase relative to the time it would take with more switches enabled, reduces the current overshoots or undershoots that would otherwise result from measurement delays and switch timing tolerances.

According to one embodiment, the second non-linear controller responds to larger changes in load current than those responded to by the first non-linear controller. In FIG. 26 (e.g., FIGS. 26A, 26B, 26C, 26D, 26E, 26F, and 26G), for example, the power supply system is operating in Normal Steady State Mode prior to time $t_S$, at which time there is a relatively large change in load current ($\Delta I_S$, FIG. 26A). At time $t_1$, after a delay time $T_M$ (discussed below), the second non-linear controller 444 senses that the rate-of-change and magnitude of the error voltage exceeds a pre-determined set of transient thresholds. The second non-linear controller 444 responds to detecting such a condition by: (1) driving signal FHI high, causing the ALLACT output of the first non-linear controller 446 to go high, thereby forcing the P1-P4 outputs of the PWM generator to turn on all of the power switches, SW1-SW4, in the power conversion phases (FIGS. 26D-26G); and (2) driving signals X1 and XEN high, which turns on the power switch 430, SWPD, in the dynamic conversion circuit 410.

According to one embodiment, the second non-linear controller 444 also tracks the length of time that switch SWPD is on (the "dynamic circuit control period") by means of a pulse duration counter. When all four of its power switches (e.g., SW1, SW2, SW3, and SW4) are on connecting Vin via a respective low impedance path to the corresponding inductor Lo, the effective output inductance of the multiphase voltage regulator is $L_{EQ}=L_o/N$, where N is the number of phases (e.g., in FIG. 17, N=4); with the power switch in the dynamic conversion cell also being on, the effective circuit inductance is the paralleled value of $L_T$ and $L_{EQ}$.

With all of the power switches turned on, currents ramp up in all of the inductors and these currents sum to form the total system output current, $I_o=I_R+I_T$, where, as shown by the dashed waveform in FIG. 26B, $I_R$ is the aggregate current from all of the power conversion phases 412-415 and $I_T$ is the current delivered by the dynamic conversion circuit 410.

Because of the relative values of inductors (e.g., $L_T$ typically being much smaller than $L_{EQ}=L_o/4$), the dynamic conversion circuit 410 supplies most of the total system output current $I_o$ during the dynamic circuit control period (in the Figure, the period $T_{DY}$ between times $t_1$ and $t_p$) when switch SWPD is activated.

At time $t_p$ the total system output current $I_o$ is essentially equal to the stepped value of load current, $I_S$, and the signal X1 is brought low. This results in turning off the power switch 430 (e.g., SWPD); turning on the synchronous switch 432 in the dynamic conversion circuit 410; and connecting the dynamic output inductor $L_T$ across (e.g., in parallel with) the storage capacitor bank 428.

Between times $t_p$ and time $t_x$, when switches SW1-SW4 remain on (e.g., each of the power converter phases 412-415 is activated to provide current to load 420), the current continues to ramp up in all of the power output inductors 422 (of each respective power converter phase 412-415); and the current in the dynamic output inductor 428 (e.g., inductor $L_T$) declines as its energy is discharged at a rate equal to $dI_T/dt=-V_o/L_T$.

If the system input and output voltages are $V_{IN}$ and $V_o$, respectively, then the rate-of-increase of the current $I_R$ will approximately be equal to $dI_R/dt=(V_{IN}-V_o)/L_{EQ}$ and the rate-of-decline of the current $I_T$ (between times $t_p$ and $t_x$) will approximately be equal to $dI_T/dt=-V_o/L_T$. By sizing the inductors so that $L_{EQ}/L_T=(V_{IN}/V_o-1)-R_V$, the current $I_R$ will ramp to its desired value in approximately the same time that it takes for the current $I_T$ to decline to zero. If the inductors are sized in this way, the duration of the time period between $t_p$ and time $t_x$ may be preset by the second non-linear controller 444 to approximately $R_V*T_{DY}$, where $T_{DY}$ is the value saved in the pulse duration counter.

As previously discussed, the first non-linear controller 446 uses a feedback technique (directly comparing measurements of error voltage to thresholds) to determine when to terminate non-linear control action, in part because the worst case rate-of-change of current $(dI_o/dt=(V_{IN}-V_o)/L_{EQ})$ was relatively small, and the period of non-linear control relatively long enough, so that timing delays and errors would not result in large overshoots in current $I_o$. Because the rate-of change of current delivered by the dynamic conversion circuit 410 (when so used) may be (in relative terms) much greater (approximately by a factor $R_V$) than current delivered by a combination of current delivered by power converter phases 412-415, and because aggregate circuit delays associated with measurements of the error voltage (e.g., delays in the anti-aliasing filter 436 and in the error voltage A/D 438) may be of the same order of magnitude as the duration of the dynamic circuit control period, $T_{DY}$, it may be impractical to use error voltage feedback as a means of turning off the switch SWPD in the dynamic conversion circuit 410.

FIG. 26, for example, shows an aggregate measurement delay, $T_M$, between time $t_S$, at which the step in load current occurs, and time $t_1$, at which the step is sensed and control action is initiated by turning ON switch SWPD as well as each of switches SW1, SW2, SW3, and SW4. If the ending time of the period $T_{DY}$ were to be controlled by comparing measurements to thresholds, the sensing and control action derived from those measurements would also be delayed by $T_M$, and the turning-off of the power switch would be delayed $T_M$ seconds beyond the time $t_p$ (the desired turn-off time), possibly resulting in a substantial overshoot in the current $I_o$. For this reason, the second non-linear controller 444 may not need to be configured to rely on feedback to determine when to end the dynamic circuit control period; rather, upon sensing, at time $t_1$, that the rate-of-change of the error voltage and magnitude of the error voltage exceed the pre-determined set of transient thresholds, the second non-linear controller 444 uses these values to calculate a predicted value for the period $T_{DY}$ (as discussed above with respect to FIG. 18B) in which to turn ON switch SWPD. Although the time period prediction resulting from such a calculation is an estimate, it can be sufficiently accurate to produce better results (e.g., less overshoot) than a measurement-based approach.

Operation of the second non-linear controller 444 in response to a relatively very large decrease in load current is illustrated in FIG. 27. In the figure, the power supply system is operating in Normal Steady State Mode prior to time $t_S$, at which time there occurs a large decrease in load current (quantified as $\Delta I_6$, FIG. 27A). At time $t_1$, after a delay time $T_M$ (discussed earlier), the second non-linear controller 444 determines that the rate-of-change and magnitude of the error voltage (FIG. 27B) exceed a pre-determined set of transient thresholds (not shown in the Figure) and responds by: (1) driving signal FLO high, causing the 0ACT output of the first non-linear controller to go high, thereby forcing the P1-P4 outputs of the PWM generator 448 low, turning off all of the power switches, SW1-SW4, and turning on all of the synchronous switches, in the power conversion phases 412-415; and (2) driving signals X1 low and XEN high, turning on the synchronous switch 432 SWSD (FIG. 27D) in the dynamic conversion circuit 410. The second non-linear controller 444 process also tracks the length of time, $T_{DS}$, that switch SWSD is on ("the dynamic synchronous switch period") by means of a pulse duration counter.

Figure 27A:
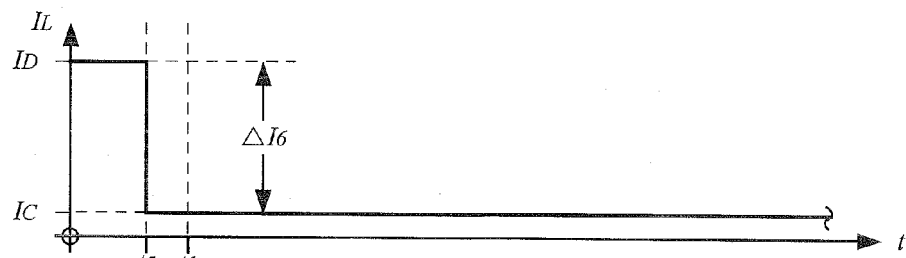
FIGS. 27A, 27B, 27C, and 27D are example timing diagrams illustrating occurrence of a transient load condition and control of the multiple power converter phases according to embodiments herein.
Figure 27B:
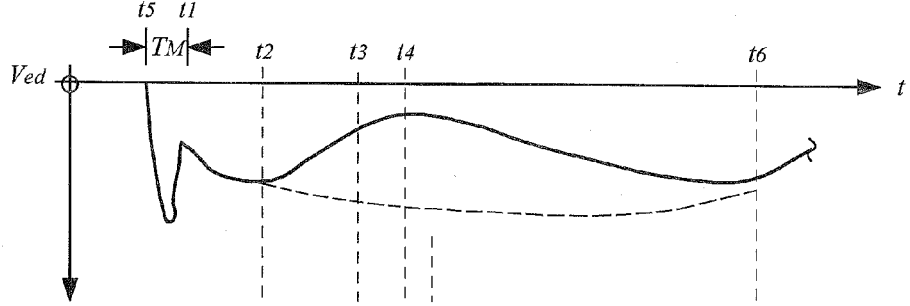
Figure 27C:
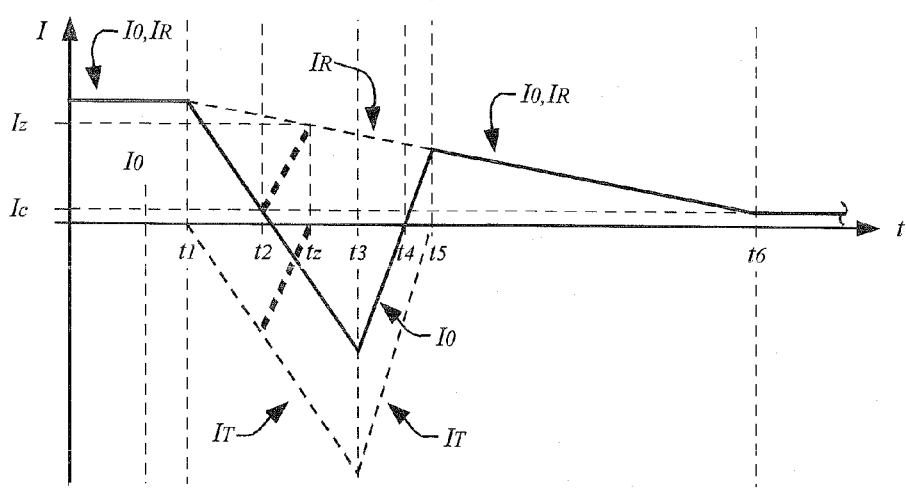
Figure 27D:
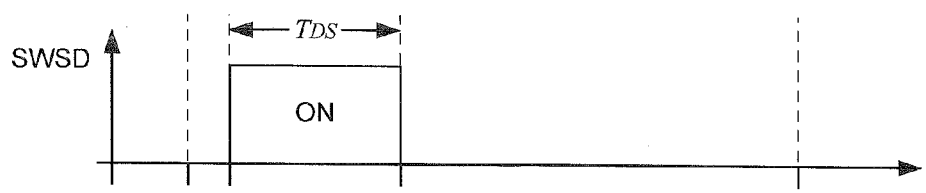

With all of the synchronous switches of the dynamic converter circuit 410 and power converter phases 412-415 turned on, currents ramp down in all of the inductors. The currents sum to form the total system output current, $I_o=I_R+I_T$, where, as shown in FIG. 27C, $I_R$ is the aggregate current flowing in all of the power conversion phases 412-415 and $I_T$ is the current flowing in the dynamic conversion circuit 410. During the time that switch SWSD is on, the voltage across the dynamic inductor 428 is essentially equal to the output voltage $V_o$, the current in the dynamic inductor 428 ramps negatively and the aggregate current, $I_o$, decreases. At time $t_2$, $I_o=I_L=I_C$. If switch SWSD were turned off at time $t_2$, the current in the dynamic inductor 428 would rapidly ramp back to zero at time $t_z$ (because the negative current $I_T$ would flow into the input source via the intrinsic diode of switch SWPD and the voltage across the inductor would increase to equal $V_{IN}-V_o$) and the output current would rise to a value $I_Z$ (as indicated by the dotted lines in the waveforms for $I_T$ and $I_o$ in FIG. 27C), resulting in a relatively large deviation in output voltage, as indicated by the dashed error voltage waveform 2700 in FIG. 27B.

To reduce the deviation in the output voltage, the turning off of switch SWSD is delayed until time $t_3$, allowing the total system output current $I_o$ to go negative. By delaying the turn-off of SWSD and allowing $I_o$ to go negative, more charge may be withdrawn from the converter output storage capacitor bank 418, more effectively offsetting the positive charge delivered to the output from the inductors in the power conversion phases and resulting in a reduction in the peak-to-peak variation in the output voltage, as illustrated by the solid waveform in FIG. 27B. Delayed turn-off of the switch SWSD is accomplished by appropriate setting of slope and magnitude thresholds, SlopeN and THN, as indicated in FIG. 27B. Whereas the slope thresholds in previous examples (e.g., FIGS. 20-22) were preferably set close to zero to indicate a plateau in the error voltage associated with near equality of $I_o$ and $I_L$, the slope threshold for a large reduction in load current in this example is set to a positive value, as shown in FIG. 27B.

The synchronous switches in the power conversion phases 412-415 are held on after switch SWSD is turned off, to allow inductor currents in the power conversion phases to continue to ramp down. The time period between $t_3$ and $t_6$ is set by the second non-linear controller 444 to be $M*T_{DS}$, where M is a pre-determined constant and $T_{DS}$ is the dynamic synchronous switch period that was stored in the pulse duration counter. Precise control of time $t_6$ is not typically required because the ending current, $I_L$, is relatively small. The value M can be chosen empirically based on measurements of power system response.

Figure 28A:
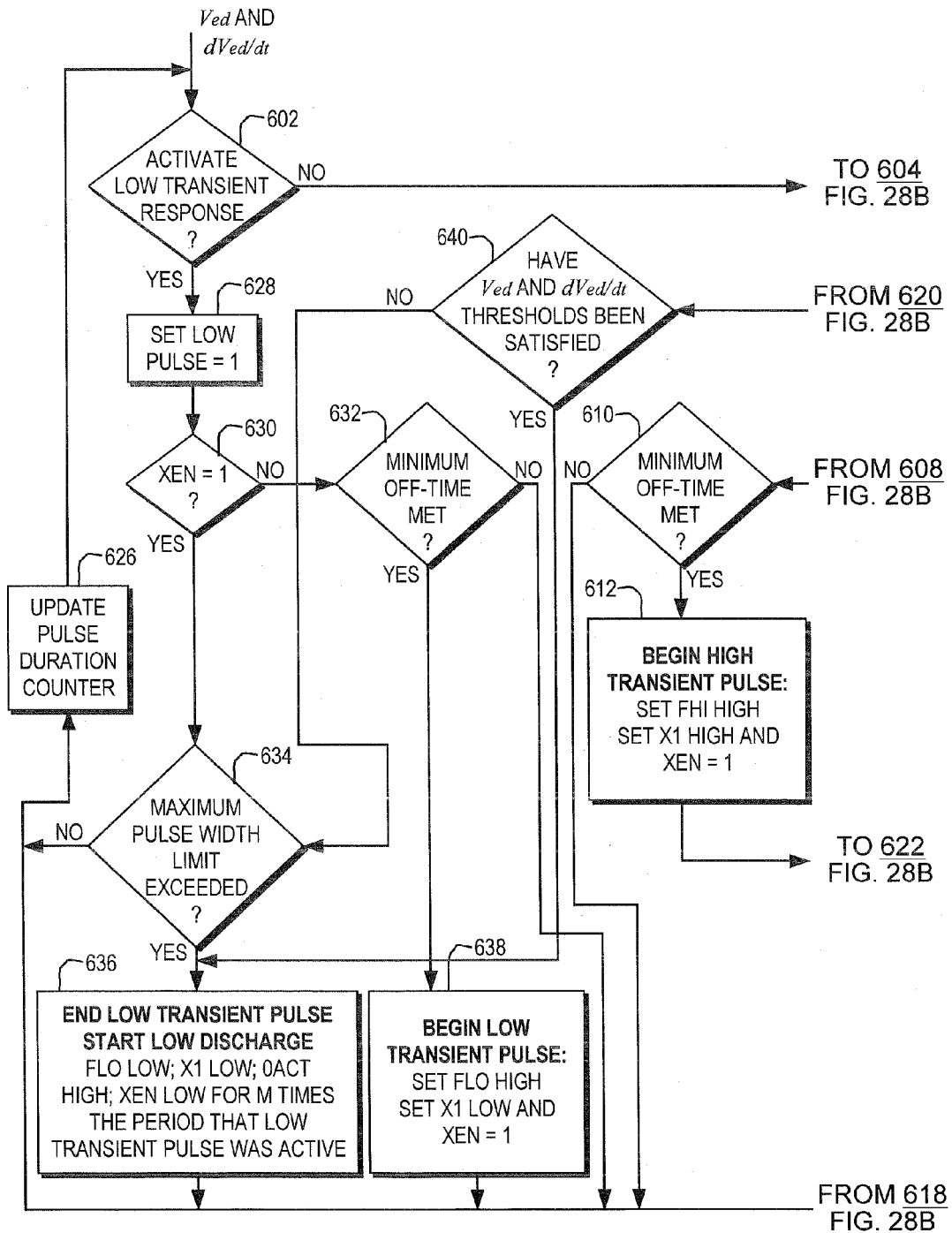
FIG. 28 is an example diagram illustrating a flowchart according to embodiments herein.
Figure 28B:
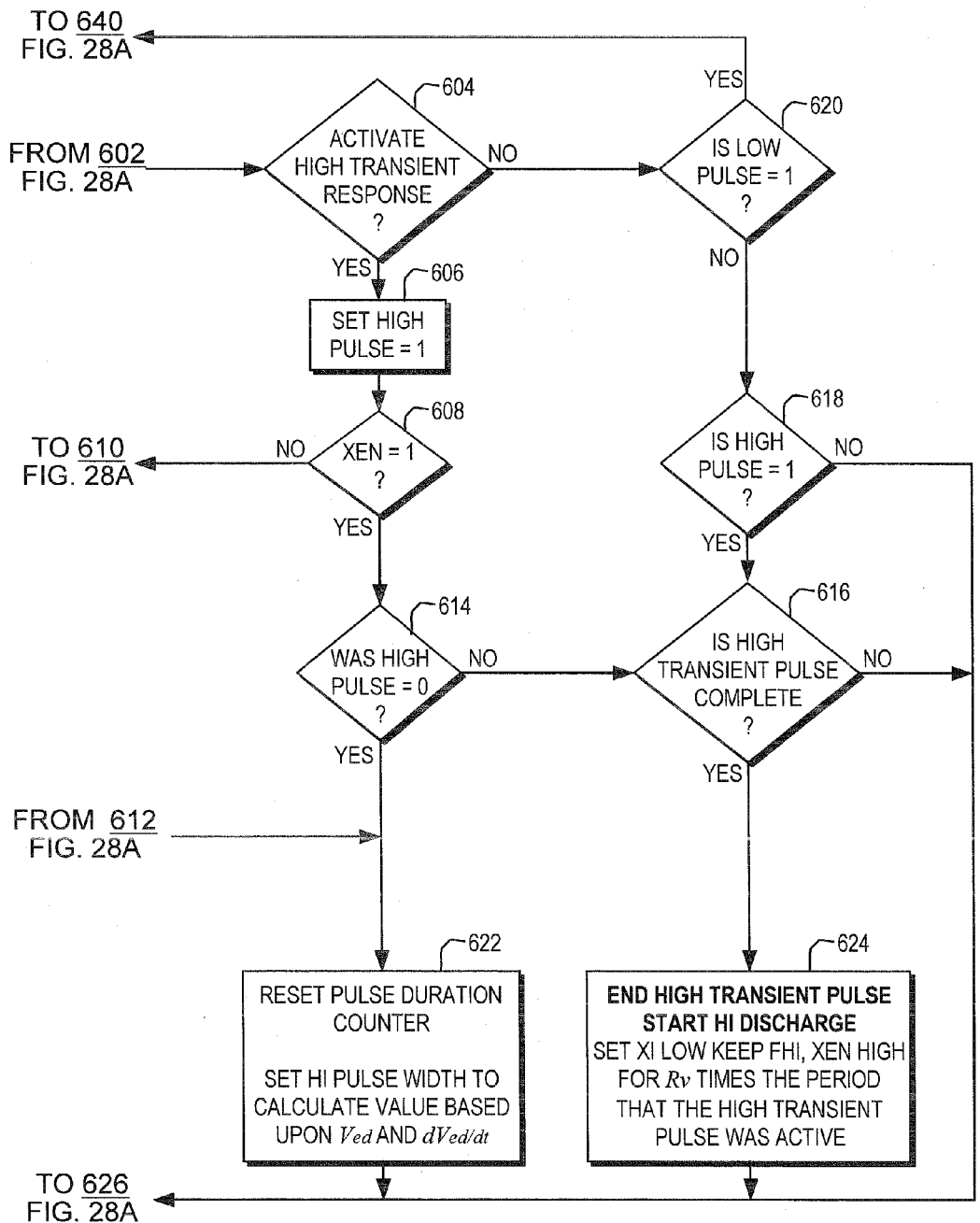

An example of a logic flow diagram for the second non-linear controller 444 is shown in FIG. 28. Step 602 determines whether the magnitude and rate-of-change of the error voltage exceed pre-determined thresholds associated with a substantial decrease in load current; step 604 determines whether the magnitude and rate-of-change of the error voltage exceed other pre-determined thresholds associated with a substantial increase in load current.

(1) If step 602 is not affirmative and step 604 is affirmative a High Pulse flag logic state is set to a logical value of 1 (step 606). If step 604 is newly affirmative (i.e., it occurs when XEN≠1, step 608, meaning that the SWPD switch in dynamic conversion circuit 410 is OFF), and a minimum off-time requirement has been met (since the time that the signal X1 had been last asserted, to respect possible thermal limitations on the power switch in the dynamic conversion circuit 410 and/or to prevent false triggering of another second non-linear controller cycle due to transients associated with ending of a previous cycle) (step 610), a High Transient Pulse (e.g., switch SWPD is turned ON) is started by setting FHI, X1 and XEN high (step 612). In step 622 a predicted value for the duration of the dynamic circuit control period (the "Hi Pulse Width" value referenced as being set in step 622 is the time period, $T_{DY}$, FIG. 26, during which switch SWPD is ON) is calculated based upon $V_{ed}$ and $dV_{ed}/dt$ and this value is stored. A Pulse Duration Counter (referred to above as the means by which the second non-linear controller tracks the length of time that switches SWPD or SWSD are ON) is updated in step 626 and the logic loop re-entered at step 602. In subsequent passes, and assuming no significant changes in load current that would cause either of steps 602 or 604 to be affirmative, the logic flow will be through steps 602, 604, 620, 618, 616 and 626 until the Pulse Duration Counter equals or exceeds the Hi Pulse Width value (set in step 622) and the result of step 616 is affirmative. This results in the High Transient Pulse being terminated (step 624), by bringing X1 low (and keeping XEN high), and the initiation of a high discharge period, of preset duration equal to $R_V*$(High Pulse Width), during which FHI is kept high. At the end of the discharge period, XEN and FHI are brought low (not shown).

(2) If step 602 is affirmative, the Low Pulse flag is set high (step 628). If step 602 is newly affirmative (i.e., it occurs when XEN≠1, step 630, meaning that switch SWPD in the dynamic conversion circuit 410 is not ON), and a minimum off-time requirement has been met (step 632), a Low Transient Pulse is started by setting X1 low and FLO and XEN high (step 638). During the Low Transient Pulse, as described above, setting X1 low and FLO and XEN high causes all of the power switches in all of the phases (e.g., switches SW1, SW2, SW3, SW4 and SWPD) to be turned OFF and all synchronous switches in all phases (e.g., switches SS1, SS2, SS3, SS4 and SWSD) to be turned ON). In subsequent passes, and assuming no significant changes in load current that would cause either of steps 602 or 604 to be affirmative, the logic flow will be through steps 602, 604, 620, 640, 634 and 626 (the duration of the Low Transient Pulse may be tracked by updating the Pulse Duration Counter with each pass through step 626) until either the threshold test at step 640, or the maximum pulse width test at step 634 (setting a safe upper limit on the on-time of the synchronous switch in the dynamic conversion cell), is affirmative. This results in the Low Transient Pulse being terminated (step 636), by bringing FLO, X1, and XEN low (the intrinsic diode in the MOSFET synchronous switch SWSD 432 being used to discharge the dynamic inductor $L_T$) and keeping 0ACT high, and the initiation of a low discharge period, of preset duration equal to M*(Low Transient Pulse Width), at the end of which FLO is brought low.

Figure 36:
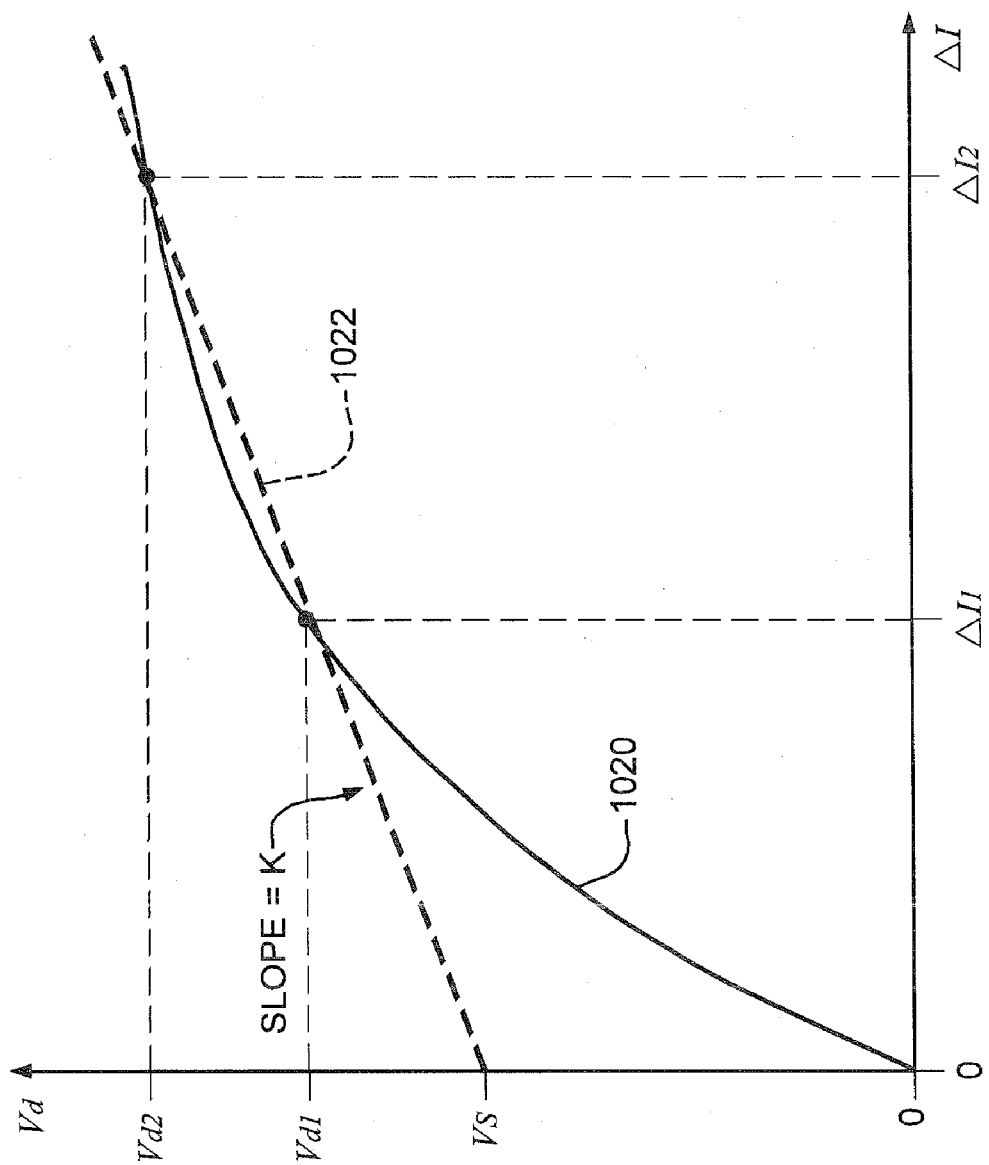
FIG. 36 is an example diagram illustrating peak deviation in voltage as a function of change in load current.

An example of a technique for predicting a value for the period TDY is discussed with respect to FIGS. 18 and 36. FIG. 36 shows a graph illustrating how the peak deviation in the error voltage (e.g., Vd, FIG. 18B) may vary with the size of a step in load current, DI (e.g., DI, FIG. 18A), where, as discussed above with respect to FIG. 18, the step in current, DI, occurs during a time period which is relatively small (e.g., in one embodiment 50 nanoseconds) compared to the converter operating period (e.g., in the same referenced embodiment, 2.5 microseconds).

In FIG. 36, curve 1020 is a plot of Vd versus DI, as DI varies between zero and values greater than DI2, where DI2 represents the maximum change in current that the power supply is designed to deliver (e.g., DI2 is a step change from zero to full rated load current). As illustrated in FIG. 36, curve 1020 may be a non-linear function of DI because, e.g., of non-linearities in power supply components, such as inductors with magnetic cores. In practice, because the second non-linear controller is generally only asserted over a range of relatively large current steps, the controller will generally only need to predict values of TDY over a limited range; in FIG. 36, for example, the current steps of interest are shown to range between DI1 (e.g. 40 Amperes) and DI2 (e.g. 100 Amperes). Over the illustrated range, a linear approximation to curve 1020, shown in FIG. 36 by the dashed line 1022, may be created by drawing a straight line between the points on curve 1020 that correspond to current steps of values DI1 and DI2, respectively. Linear curve 1022 may be used to estimate the value of a current step, DI, as a function of the measured peak deviation in error voltage, Vd, as shown in equation 4:

$$DI = K*(Vd-Vs) \qquad (4)$$

where, as illustrated in FIG. 36, K is the slope of curve 1022 and Vs is the intercept of curve 1022 with the Vd axis.

The predicted time, TDY, needed to produce a given change in current DI through an inductance is given by equation 5:

$$TDY = L*\Delta I/V \qquad (5)$$

where L is the value of the inductance, $\Delta I$ is the change in current and V is the voltage impressed across the inductance. For the power converter of FIG. 17, the value of L, with all power switches (SW1, SW2, SW3, SW4 and SWPD) on, is, as discussed above, the paralleled value of LT and LEQ, where LT is the value of the dynamic output inductor 428 and LEQ=Lo/N, where Lo is the value of each power output inductor 422 and N is the number of power conversion phases (e.g., N=4 for the four phases 412-415 in FIG. 17). Ignoring deviations in the converter output voltage during a current transient, V may be estimated to be VIN−Vo, where VIN is the input source voltage and Vo is the converter output voltage.

Equation 4 and 5 may be combined to determine an estimated value of TDY based upon a measured value of the peak deviation, Vd, and a few constant values that are derived based upon empirical measurements (e.g., the constant K may be determined by plotting curve 1020 (FIG. 36) for a particular power supply; overlaying a linearized approximation 1022; and calculating the slope constant, K, from the curve 1022) or that can be estimated based upon circuit component values (e.g., L is the paralleled value of LT and LEQ; V=(VIN−Vo)).

With reference to FIG. 18B, the rate-of-change of the error voltage, dVea/dt, following a fast step in current DI, can be approximated by equation 6:

$$dVea/dt \gg Vd/(tA-t1) \quad (6)$$

where Vd is the peak deviation in the error voltage and (tA−t1) is the time period over which the error voltage rises to the value Vd. For a fast change in current, DI, the time period, tA−t1, may, to first order, be estimated to be essentially constant (e.g., (tA−t1)° Kt) and therefore the value of dVea/dt may also be estimated to be proportional to the peak deviation Vd, as shown in equation 7:

$$dVea/dt \gg Vd/Kt = Vd*K2 \quad (7)$$

where K2=1/Kt is also a constant.

Figure 37A:
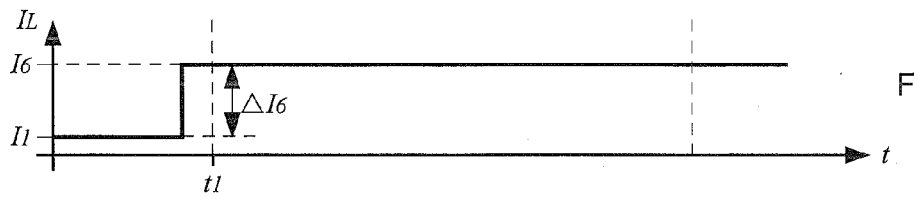
FIGS. 37A, 37B, 37C, 37D, 37E, 37F, 37G and 37H are example timing diagrams illustrating control of multiple power converter phases according to embodiments herein.

In the embodiment of FIGS. 26 and 28, the second non-linear controller 444 predicts the time, TDY, during which the power switch, SWPD, in the dynamic conversion circuit 410 (FIG. 17) is turned on; it may also determine how long the remainder of the power switches in remainder of the power conversion phases are to be turned on based upon the ratios of the inductances, LT 428 and Lo 422. In another embodiment, illustrated in the timing diagram of FIG. 37, the controller predicts a time period (time period TX, between times t1 and tX, FIG. 37) that is an estimate of the time that will be required for the current delivered by the power conversion phases (exclusive of the current delivered by the dynamic conversion circuit), IR (FIG. 17; FIG. 37H), to increase in value in an amount equal to the change in the current delivered to the load (DI6, FIG. 37A). As shown in FIGS. 37D, 37E, 37F, and -37G, all of the power switches, SW1-SW4, in the power conversion phases are turned on by the second non-linear controller during the time period TX.

Figure 37B:
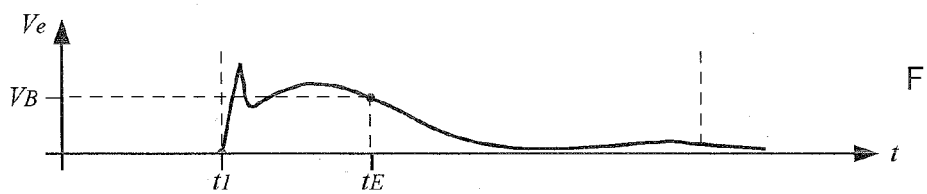
Figure 37C:
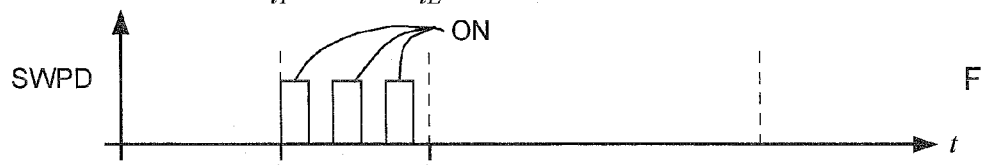
Figure 37D:
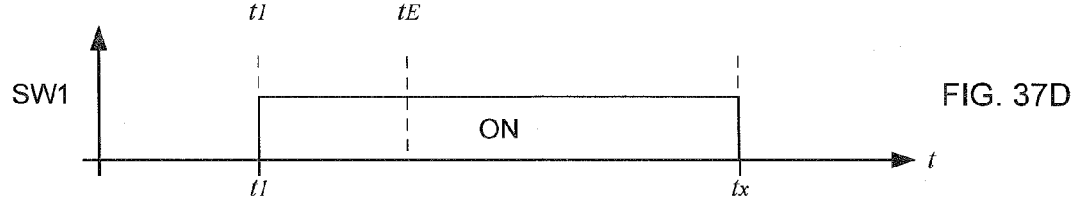
Figure 37E:
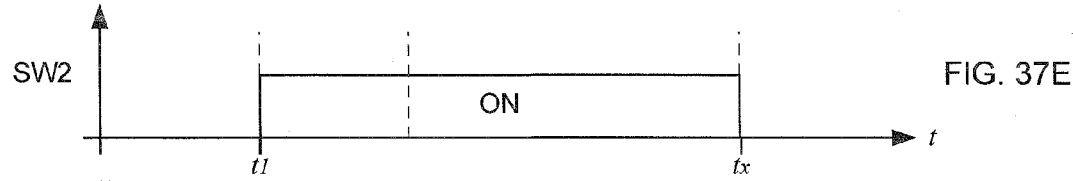
Figure 37F:
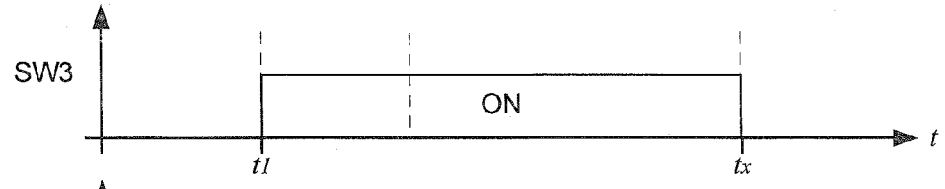
Figure 37G:
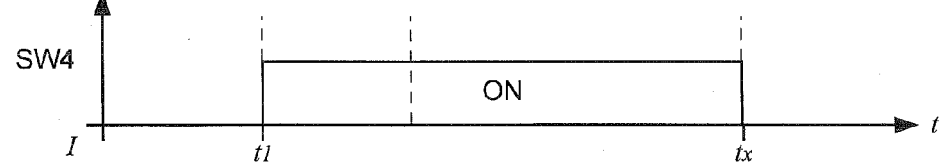
Figure 37H:
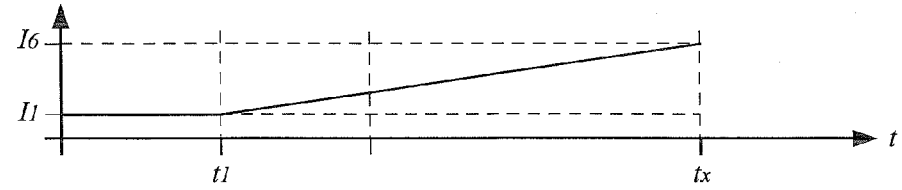

At time t1, the second non-linear controller 444 also turns on the power switch, SWSD, in the dynamic conversion circuit, and monitors the error voltage VE (shown in FIG. 37B) to determine when VE becomes less than a pre-determined threshold, VB (e.g., at time tE, FIG. 37B). When the second non-linear controller determines that VE is less than VB, the power switch, SWPD, in the dynamic conversion circuit is turned off. As shown in FIG. 37C, the power switch, SWPD, in the dynamic conversion circuit may be cycled ON and OFF by the controller between times t1 and tE. One advantage of cycling SWPD ON and OFF is that the current delivered by the dynamic conversion circuit will increase relatively more slowly (i.e., relative to the rate at which the current would otherwise increase if SWPD were continuously ON), thereby increasing the relative duration of the period of between t1 and tE (i.e., relative to the period that would be required if SWPD were continuously ON). This provides relatively more time for the second non-linear controller to take samples of VE, improving the accuracy of measurement and reducing the likelihood of an overshoot in output current, Io.

One way to control the ON and OFF cycling of switch SWPD is to ON and OFF is to set a pre-determined duty cycle (i.e., the duty cycle is the fraction of the time that the switch is turned ON) for the switch and allow the switch to run at that duty cycle until, as discussed above, the error voltage VE is determined by the second non-linear controller to be below the threshold value VB. In FIG. 37, for example, switch SWPD might be activated with a 40% duty cycle (e.g., during each cycle SWPD is turned on for 20 nanoseconds and then turned off for 30 nanoseconds). Switch SWPD will continue to operate at the pre-determined duty cycle until VE falls below the threshold value VB (i.e., at time tE in FIG. 37), after which the switch is no longer turned on. The proper duty cycle is a function of the specific power system implementation and the requirements and characteristics of the load and may be determined empirically. Once a value for the duty cycle is determined, it can be stored in memory for access by the controller.

With reference to equations 4, 5, 6 and 7, estimation of the time period TX for the predictive technique illustrated in FIG. 37 is essentially the same as that described above for the technique illustrated in FIG. 26. For the example of FIG. 37, however, the time that is being predicted is an estimate of the time that will be required for the current delivered by the power conversion phases (exclusive of the current delivered by the dynamic conversion circuit) to increase in value in an amount equal to the change in the current delivered to the load. Therefore, equation 4 is modified as shown in the following equation 8:

$$TX = LEQ*\Delta I/V \quad (8)$$

where, as discussed above, LEQ=Lo/N, where Lo is the value of each power output inductor 422 and N is the number of power conversion phases; and V may be estimated to be VIN−Vo, where VIN is the input source voltage and Vo is the converter output voltage.

Measurement of error voltage, comparison of the magnitude and rate-of-change of error voltage to pre-determined thresholds, and control action in response thereto, occurs continuously. For example, depending on the severity and timing of a load current increase, either or both the FNLC 446 and second non-linear controller 444 may be invoked as described above.

Embodiments herein also feature apparatus and methods for preventing saturation of a power output inductor owing to current imbalances among the phases in a multiphase power converter. Although a variety of techniques for balancing the currents among the phases of a multiphase power converter are known in the art, one example can be found in related application entitled "Method and Apparatus for Equalizing Phase Currents in Multiphase Switching Power Converters", which has been assigned U.S. patent application Ser. No. 11/897,290, and was filed on Aug. 30, 2007. The entire teachings of this application are incorporated herein by this reference. Such current balancing techniques typically work over time periods that are long compared to a converter operating cycle. However, phase current imbalances may also occur over much shorter time periods and the imbalances may lead to inductor saturation and possible power converter failure.

FIG. 30 (i.e., FIGS. 30A, 30B, 30C, 30D, and 30E), for example, illustrates one way that saturation of an inductor may occur relatively rapidly in a multi-phase switching power converter. In the Figure, a load current waveform (FIG. 30A) and waveforms of the on-times of the four power switches (SW1-SW4) (FIGS. 30B-30E) of each power converter phase are shown for three successive converter operating cycles.

Figure 30A:
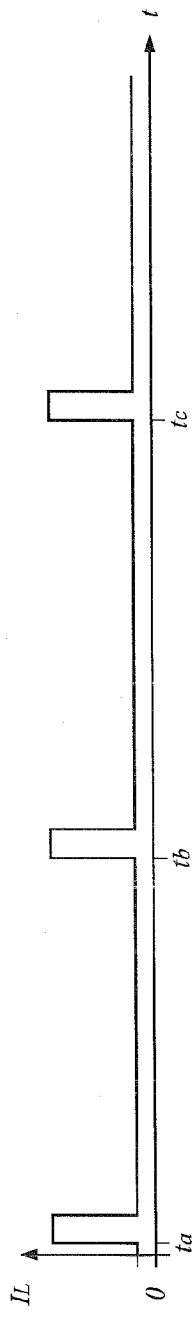
FIGS. 30A, 30B, 30C, 30D, and 30E are example timing diagrams illustrating activation of multiple power converter phases according to embodiments herein.
Figure 30B:
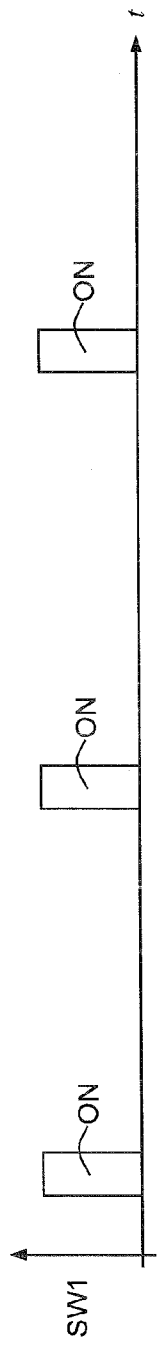
Figure 30C:
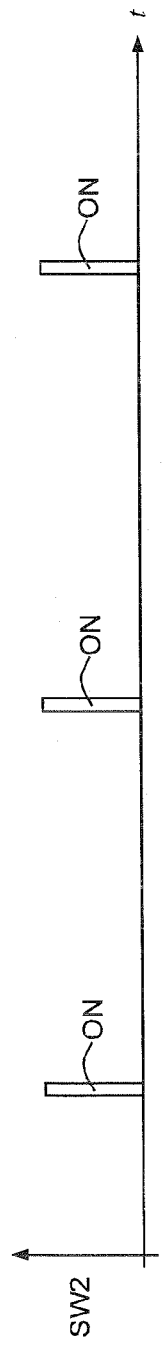
Figure 30D:
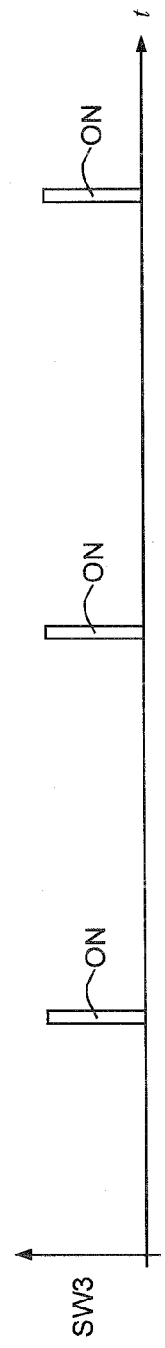
Figure 30E:
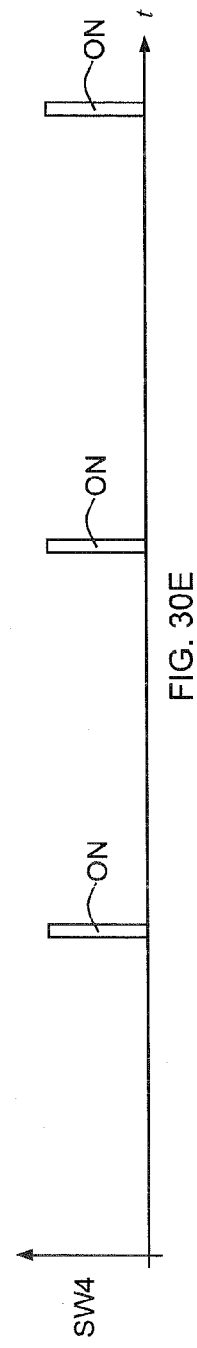

In FIG. 30A, transient increases in load current, $I_L$, demanded by load 420, are shown to occur at times ta, tb and tc, each time being closely coincident with, and prior to, the beginning of the on-time of SW1. In other words, the transient increases in load current occur at a frequency close to the frequency at which switch SW1 is being activated.

In response to the repeated increases in load current, the duration of the on-time of SW1 may be increased to a higher overall value relative to the on-times of other switches SW2-SW4 (e.g., by an FNLC, in the fashion described above with respect to FIG. 21). As mentioned above, because of the synchronicity between the current transients and the on-times of switch SW1, and in the absence of any mechanism to prevent current imbalances among the different power converter phases, the current flowing in the power output inductor associated with SW1 (e.g., current I1 flowing in inductor $L_o$ in phase 1 415, in FIG. 17) will increase relative to the inductor currents in the phases associated with power switches SW2-SW4 (e.g. currents I2-I4 in FIG. 17). Unfortunately, this may result in eventual saturation of the power output inductor ("phase inductor") associated with SW1.

Embodiments herein include different ways to reduce or eliminate saturation, current imbalances, etc. For example, embodiments herein are directed towards balancing or modifying an amount of current provided by each of multiple phases of a multi-phase power converter system based on a relative activation time of the phases.

For example, to detect imbalances among phase inductor currents over short time periods (e.g., time periods that are not long relative to a phase period), embodiments herein include accumulating, for a power conversion phase, a value that is indicative of the degree to which the on-time of the power switch (e.g., switches SW1-SW4, FIG. 17) in that phase differs from the on-time of the power switch in other phases. The accumulated values may be compared to a threshold and, if the threshold is exceeded, a corresponding controller configured according to embodiments herein can modify the sequence in which power switches are turned on in order to limit the degree of current imbalance among the phases.

Figure 31:
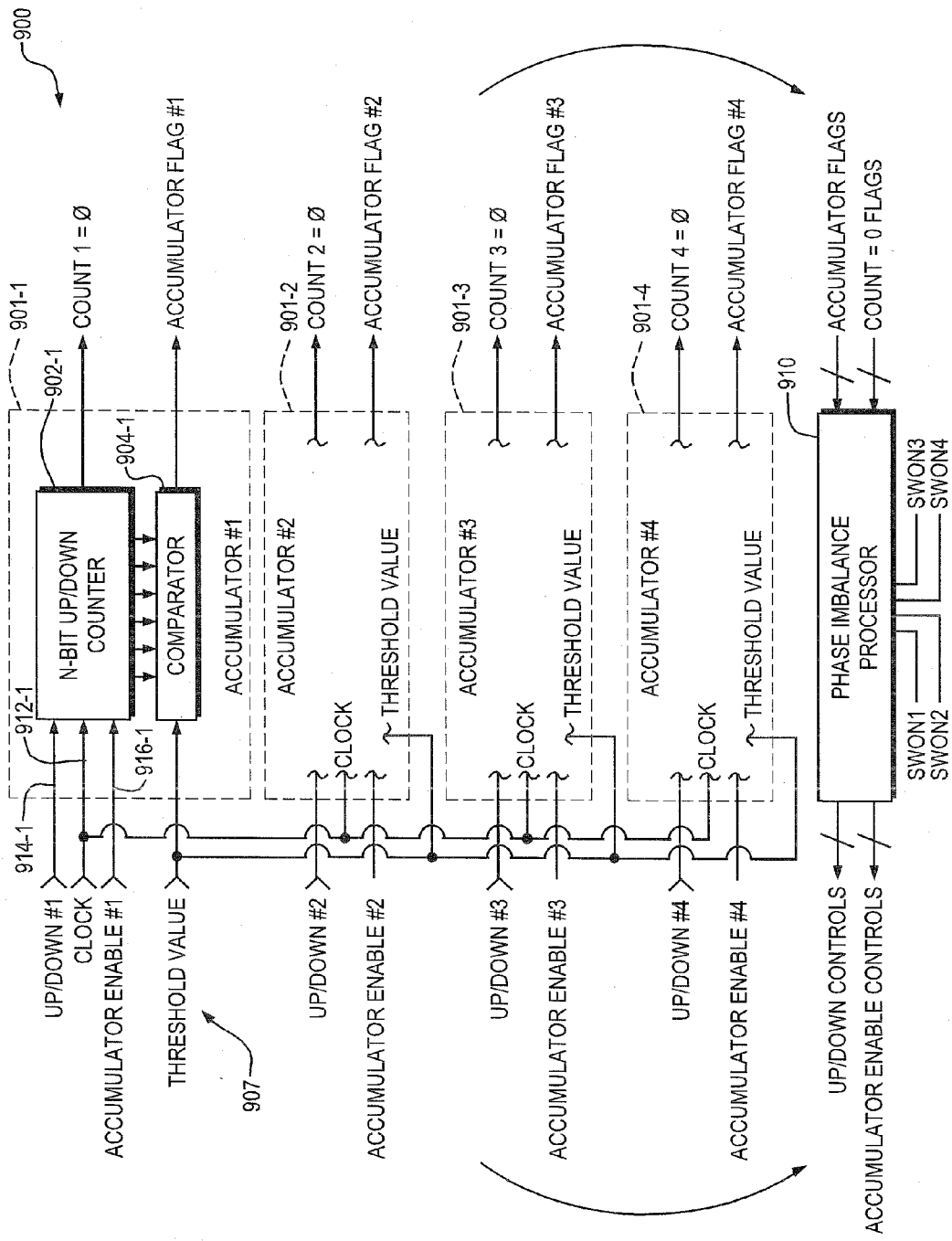
FIG. 31 is an example diagram illustrating an accumulator circuit for monitoring delivery of energy by multiple power converter phases according to embodiments herein.

FIG. 31 shows a schematic diagram of a phase imbalance detection and control circuit 900 for a multi-phase power converter such as that as shown in FIG. 17. The control circuit 900 comprises four accumulators 901-1 ... 901-4, each accumulator being associated with a respective power conversion phase (e.g., power conversion phases 412-415, FIG. 17) in the four-phase power converter, and a phase imbalance controller 910.

Each accumulator associated with a corresponding power converter phase can be configured to include an n-bit digital up/down counter 902-1 and an n-bit digital comparator 904-1. Each accumulator has an associated Count flag (labeled Count1, Count2 ... Count4 in FIG. 31) indicating whether the n-bit counter in a respective accumulator contains a value of zero; the digital comparator in each accumulator has an associated Accumulator Flag output (labeled Accumulator Flag 1, Accumulator Flag 2 ... Accumulator Flag 4 in FIG. 31) indicating whether the n-bit counter contains a value that is greater than or equal to a pre-defined Threshold Value 907 (also delivered to each accumulator).

Each accumulator receives Clock input 912-1, an Up/down Control input 914-1, and an Accumulator Enable input 916-1. Each accumulator is enabled to count periodic pulses received on its Clock input when its respective Accumulator Enable signal is high; when so enabled, the value in an n-bit counter will increase when the Up/down Control signal is high and will decrease when the Up/down Control signal is low; counting is disabled when an Accumulator Enable signal is low.

The period of the Clock signal applied to each accumulator can be relatively small compared to a phase period. For example, the ratio of the phase period in Normal Steady State Mode to the Clock signal period may be greater than 64.

The phase imbalance controller 910 receives phase switch timing inputs SWON1-SWON4. Each input signal (e.g., SWON1, SWON2, SWON3, etc.), depending on its respective state, indicates the amount of time that the corresponding power switch in its respective power converter phase is turned on.

For example, according to one embodiment herein, a corresponding one of the signals SWON1-SWON4 will be high whenever a power switch in a corresponding phase is turned on by its respective power switch drive signal (e.g., signal PS as shown in respective phase drivers 406-409, FIG. 17). The SWON signal will be low whenever the power switch for the corresponding power converter phase is turned off.

Figure 34:
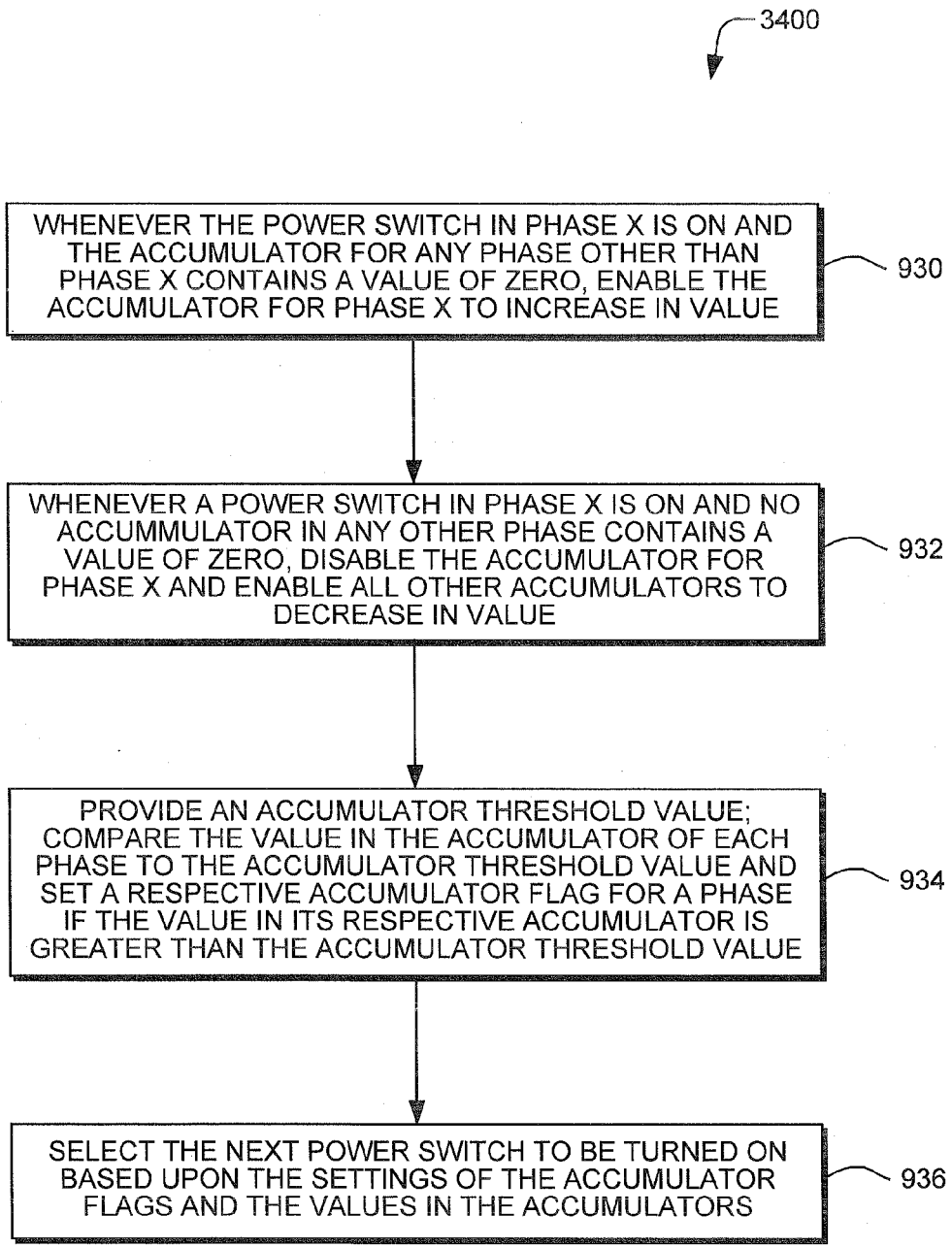
FIG. 34 is an example diagram illustrating a flowchart according to embodiments herein.

The phase imbalance controller 910 receives the phase switch timing inputs, SWON1-SWON4, and the logical values of the Count Flags, and delivers Up/down Control and Accumulator Enable signals to each Accumulator in accordance with the accumulation algorithm of FIG. 34.

When applied to the digital phase imbalance detection and control circuit 900 embodiment of FIG. 31, the general accumulation algorithm 3400 of FIG. 34 may be repeatedly executed as follows:

1.) As shown in step 930 of algorithm 3400, if a power switch in phase X is on (where X is an integer value such as 1, 2, 3, 4 and indicates the identification number of the phase), as indicated by its respective SWON signal, and the accumulator for any of one or more other phase contains a value of zero, as indicated by the Count Flags from the other accumulators, the phase imbalance controller will enable the n-bit counter in accumulator X to count up (by delivering appropriate Accumulator Enable and Up/down Control signals to accumulator X).

2.) As shown in step 932 of algorithm 3400, if a power switch in phase X is on, as indicated by its respective SWON signal, and no accumulator for any other phase contains a value of zero, as indicated by the Count Flags from the other accumulators, the phase imbalance controller will disable counting in accumulator X and enable all other accumulators to count down (by delivering appropriate Accumulator Enable and Up/down Control signals to each accumulator).

3.) As shown in step 934 in algorithm 3400, if the value in an n-bit counter in an accumulator exceeds the Threshold Value delivered to the accumulator, the Accumulator Flag for that accumulator will be set.

4.) As shown in step 936 of algorithm 3400, the sequence in which power switches are turned on may be modified based upon the states of the Accumulator Flags and the values in the accumulators. In other words, a sequence of activating the power converter phases to supply power to load 420 can be modified as a means of reducing imbalances in the amount of energy delivered by the converter phases to the load 420.

As mentioned above, this algorithm is repeated over time to balance an amount of current provided by each of multiple power converter phases.

According to one embodiment, the values in accumulators do not track the total accumulated time that a power switch has been on for each of multiple successive operating cycles. Instead, the accumulators track the differences between the accumulated times that power switches have been on relative to other power switches within the operating cycles. In Normal Steady State Mode, for example, all switches are on for essentially the same amount of time during each operating cycle: over many cycles, the total accumulated time that a switch has been on may grow without bound; however, the differences between the accumulated times that various switches have been on will be zero at the end of each cycle, no matter how long or short the actual on-times are within the cycle. By accumulating differences, as opposed to aggregate values, the phase balance apparatus of embodiments herein simplifies the task of tracking whether or not an inductor may be approaching saturation, as illustrated in the examples of FIGS. 32 and 33.

FIGS. 32A, 32B, 32C, 32D, and 32E are timing waveforms illustrating operation of the circuit 900 and algorithm 3400 in an example four-phase power converter. In general, these figures illustrate how multiple load transient conditions (at times Ta, Tb, and Tc) can cause one or more power converter phases to become saturated or overloaded relative to other power converter phases.

Figure 32:
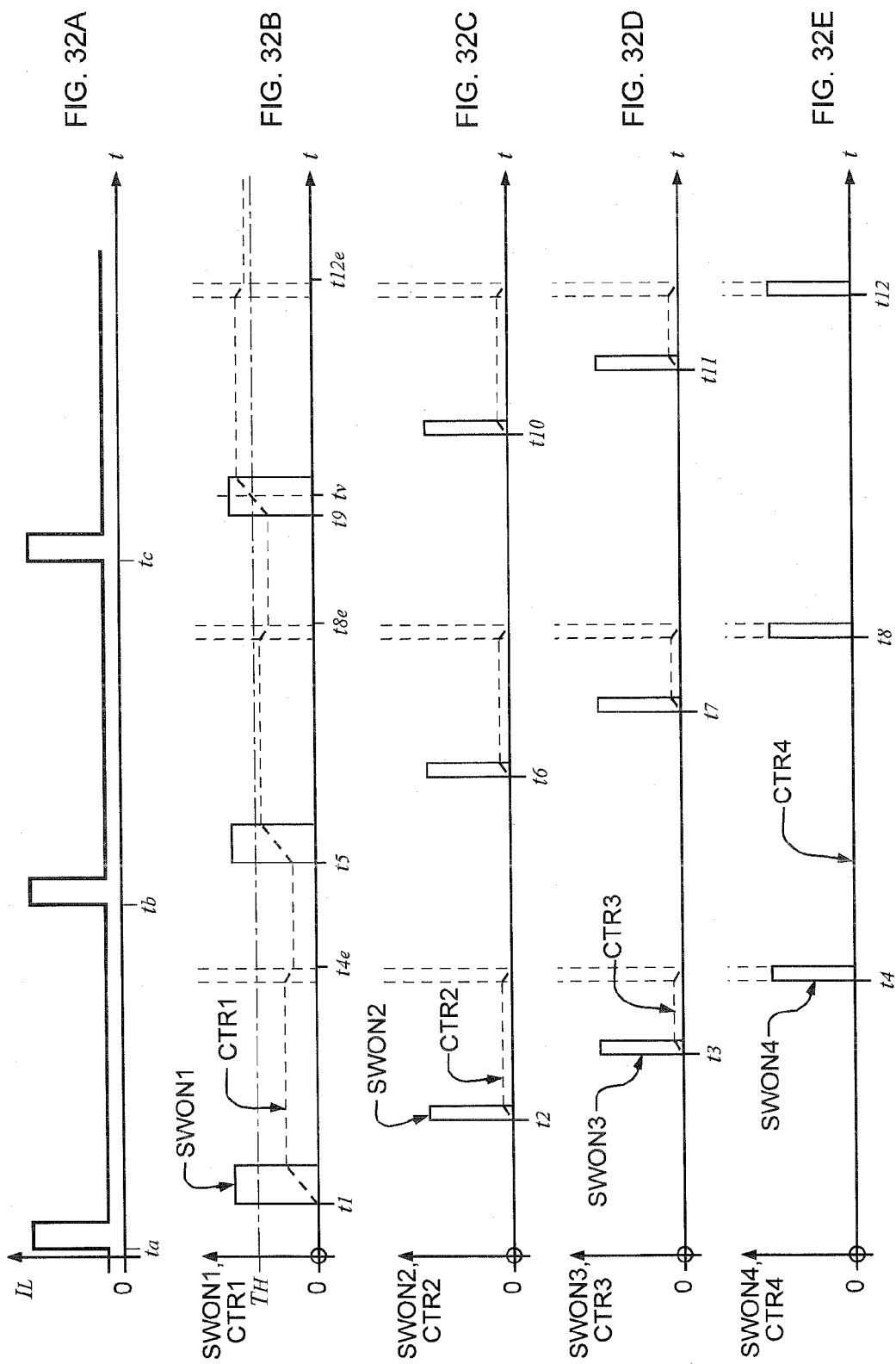
FIGS. 32A, 32B, 32C, 32D, and 32E are example timing diagrams illustrating control of multiple power converter phases according to embodiments herein.
Figure 33:
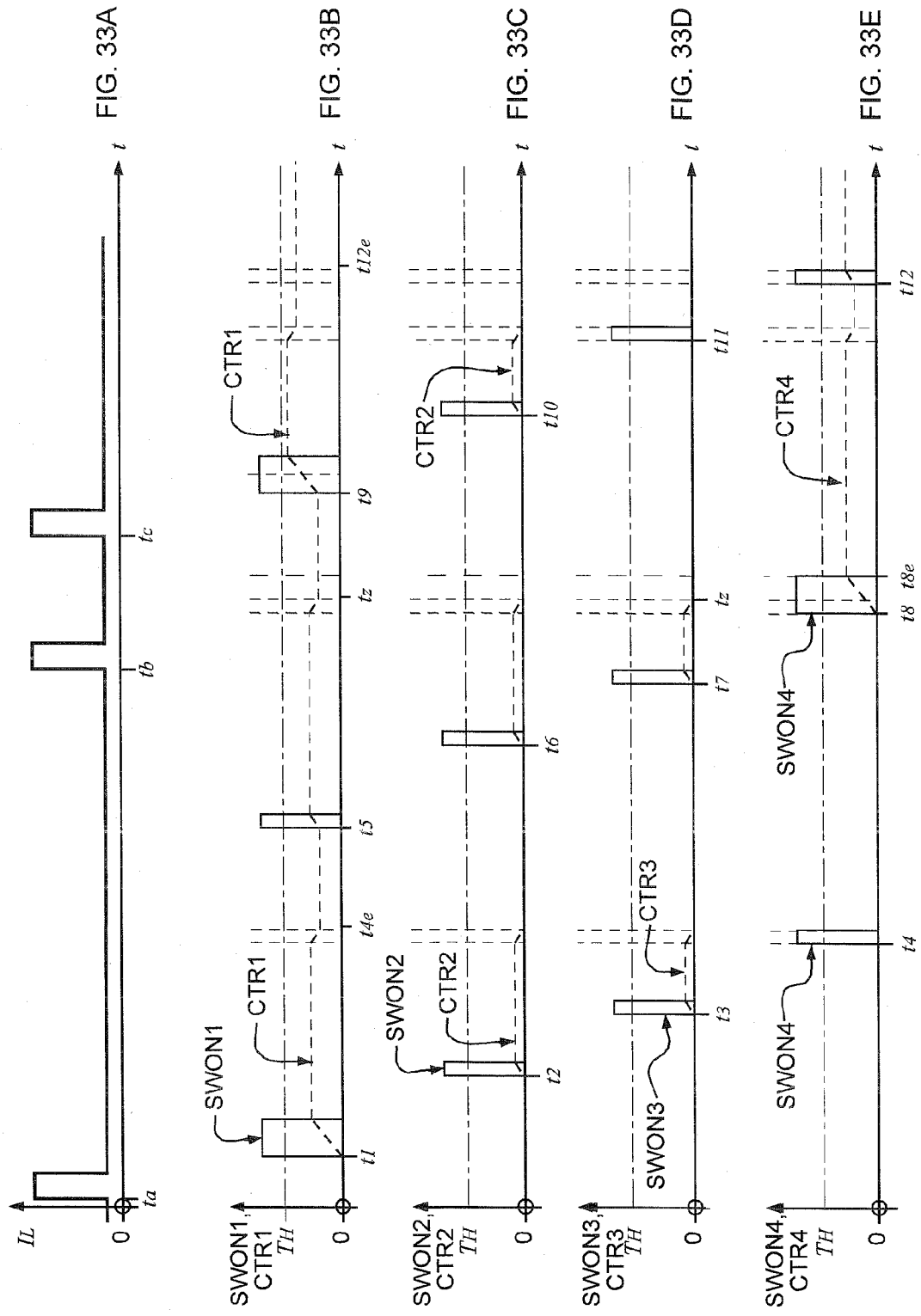
FIGS. 33A, 33B, 33C, 33D, and 33E are example timing diagrams illustrating control of multiple power converter phases according to embodiments herein.

More specifically, FIG. 32A is a load current waveform showing transient increases in current at times ta, tb and tc; FIG. 32B shows both a waveform for the on-time of the phase 1 power switch, SWON1, and the contents of the up/down counter 902-1, CTR1, in Accumulator #1 901-1. A Threshold Value 907, TH, is also shown in FIG. 32B. FIGS. 32C-32E show, respectively, counterpart waveforms, for phases 2, 3 and 4, to those shown in FIG. 32B for phase 1. In FIG. 32, assume that prior to t=0, the converter has operated in Normal Steady State Mode and the count values, CTR1-CTR4, in all accumulators are zero.

In the same manner discussed above with respect to FIG. 30A, a current transient at time ta causes the time duration of SWON1 at time t1 (FIG. 32B) to increase relative to the value it would otherwise have had in Normal Steady State Mode. In other words, the PWM generator 448 in FIG. 17 activates power switch SW1 in power converter phase 415 for a longer time to account for the increased load current requirement. In accordance with step 930 of the algorithm 3400 (FIG. 34), the value in Accumulator #1, CTR1, increases throughout the SWON1 time period because at least one corresponding accumulator for the other phases is zero. For example, when SW1 is ON around time t1, the value of accumulator #2, accumulator #3, and accumulator #4 are all zero counts. The accumulator #1 discontinues counting up when SW1 is turned OFF.

During each of times t2 and t3, and in accordance with step 930, values stored in Accumulators #2 and #3 will increase during their respective ON time periods SWON2 and SWON3 (FIGS. 32C and 32D) because at least one accumulator other than the accumulator being incremented has a corresponding value of zero. For example, when SW2 is in an ON state around time t2, accumulator #2 is incremented because the accumulators for both SW3 and SW4 are zero. When SW3 is in an ON state around time t3, accumulator #3 is incremented because the accumulator for SW4 is zero.

At time t4, the switch in power converter phase 412 turns ON, as indicated by the SWON4 waveform in FIG. 32E. Since no other accumulator contains a value of zero at or around time t4 when SW4 is ON, step 932 in algorithm 3400 is invoked: CTR4 of accumulator #4 will be disabled and CTR1 of accumulator #1, CTR2 of accumulator #2, and CTR3 of accumulator #3 will all count down during the SWON4 time period. Because the ON-times for SWON2, SWON3 and SWON4 are approximately equal, the values in CTR2 and CTR3 will return to zero at the end of the SWON4 period. However, because the duration of SWON 1 was relatively longer than the on-times of the other switches, Accumulator #1 will not count down to zero, but will instead retain a CTR1 value that is indicative of how much longer SW1 was in an ON state relative to the ON-times of SW2-SW4 during the operating cycle ending at time t4e.

This process of applying the concepts as in algorithm 3400 of FIG. 34 is repeated in each of the two succeeding operating cycles. For example, load current transients (e.g., caused by a change in dynamic load 420) at times tb and tc cause the SWON1 pulses at following times t5 and t9 to be relatively long compared to ON times of the other switches at times t6, t7, t8, t10, t11, and t12.

At times t8e and t12e, respectively, the counters in Accumulators #2 and #3, (e.g., CTR2 and CTR3), count down to zero in a similar manner as previously discussed above. The value in CTR1 of accumulator #1 has again increased based on the long duration of the SWON1 pulses. At time tv, the value in CTR1 rises above the Threshold Value, TH. This causes the corresponding Accumulator Flag #1 associated with accumulator #1 to be set.

FIGS. 33A, 33B, 33C, 33D, and 33E are example timing diagrams illustrating a similar set of waveforms as those in FIG. 32, under the same set of initial conditions at time t=0, for a different set of load current transients. However, in this example, the transient load conditions occur asynchronously or randomly with respect to the ON cycle of switch SW1. The randomness of the load transients at times Ta, Tb, and Tc, have the effect of spreading the increased burden of powering the load to different power converter phases.

As shown in FIG. 33A, the load current transient at time ta has the same timing and effect as previously discussed with respect to the counterpart transient in FIG. 32A, causing CTR1 of accumulator #1 to have an accumulated value at the end of the first operating cycle (at time t4e, FIG. 33B).

A second current transient occurs later in the second operating cycle (between times t4e and t8e), at time tb, resulting in an increase in the width of SWON4. Because CTR1-CTR3 (of accumulators 1-3) are all nonzero values at time t8, step 932 in algorithm 3400 is invoked and CTR1-CTR3 will all count down until, at time tz, CTR2 and CTR3 each count to zero.

Note that according to one embodiment, the counters do not decrement below a value of zero.

Because accumulator 2 and accumulator 3 decrement to zero at time tz, step 930 of algorithm 3400 is invoked and CTR4 (of accumulator 4) alone counts up between times tz and t8e. At the end of the second operating cycle, at time t8e, CTR2 and CTR3 (of accumulators 2 and 3) are each zero and CTR1 and CTR4 are each non-zero. This indicates that SW1 and SW4 have accumulated more ON-time (counts) than switch SW2 and switch SW3 and that switch SW2 and switch SW3 were on for approximately equal amounts of time during the operating cycles.

The differences between the CTR values in accumulators 1-4 represent the differences between their respective accumulated ON-times.

Note that a third current transient occurs at time tc in the third operating cycle (between times t8e and t12e), resulting again in an increase in the pulse width of SWON1. Because CTR2 and CTR3 (of respective accumulators 2 and 3) are zero at time t9, step 930 is invoked and CTR1 counts up.

At time t10, SW2 turns ON (SWON2) and, since CTR3 is zero, CTR2 counts up.

At time t11, SW3 turns ON with all other accumulators being non-zero, so CTR1, CTR2 and CTR4 count down during SWON3, causing CTR2 to return to a count of zero.

At time t12, SW4 turns ON (SWON4) and CTR4 counts up. At the end of the third operating cycle, at time t12e, CTR1 has increased in value, owing to the second period of extended ON-time beginning at time t9; the values of CT2 through CT4 are the same as they were at the end of the second operating period (t8e) because SW2-SW4 all exhibited essentially equal on-times during the third operating cycle.

Step 936 of the algorithm 3400 provides for re-sequencing an order of activating the power converter phases based upon settings of the accumulator flags and the values in the accumulators. In other words, in response to detecting that one or more of the power switches is activated for a relatively longer amount of time than the other power switches, the controller as described herein can initiate activation of the power switches in the power phases in a different order.

Figure 35:
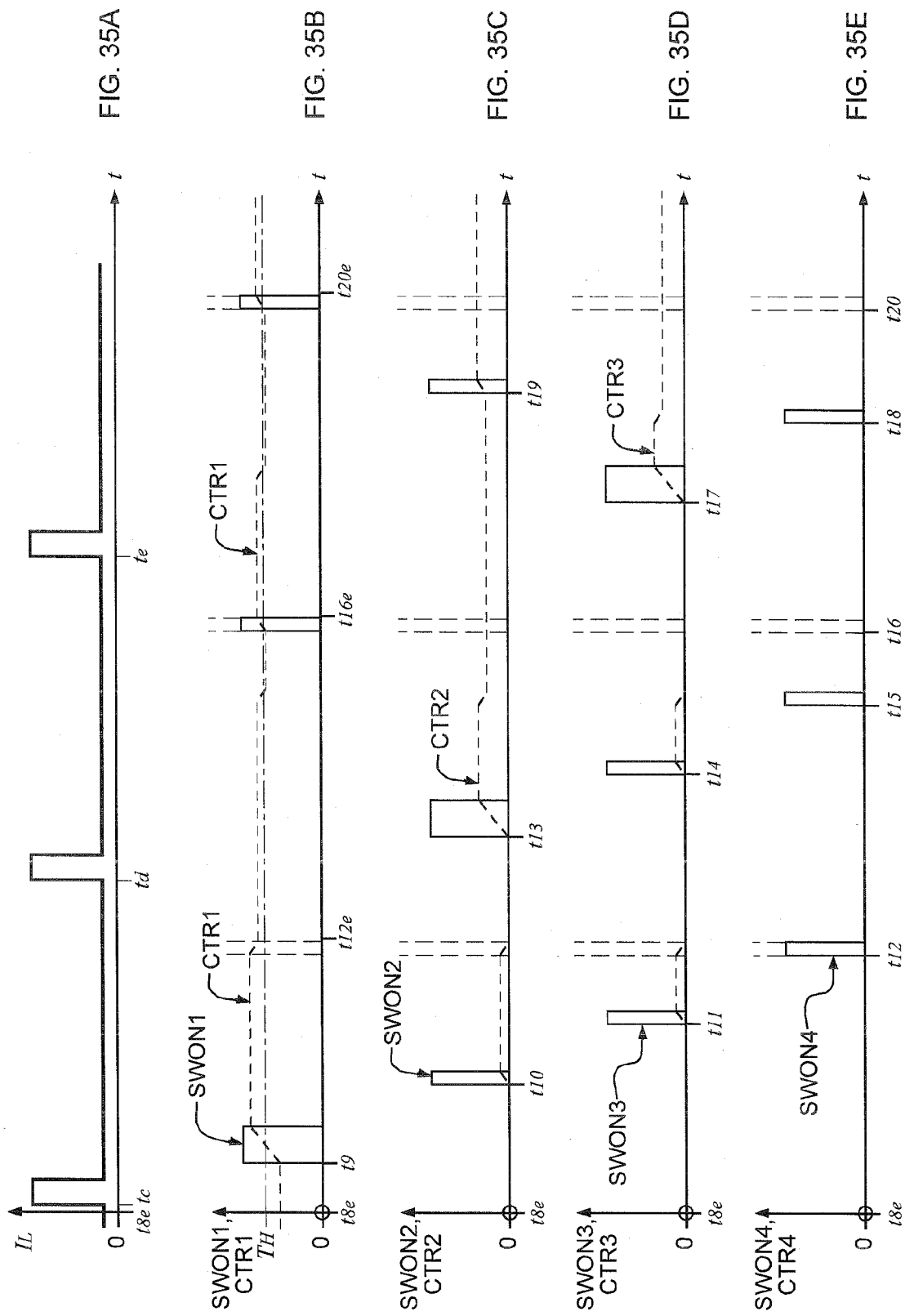
FIGS. 35A, 35B, 35C, 35D, and 35E are example timing diagrams illustrating control of multiple power converter phases according to embodiments herein.

Examples of re-sequencing are shown in FIG. 35, which shows an extension of the waveforms of the example of FIGS. 32A, 32B, 32C, 32D and 32E over an additional two converter operating cycles (the first operating cycle in FIG. 35B, between times t8e and t12e, reproduces the third operating cycle of FIG. 32). Accordingly, new FIG. 35 generally illustrate a modification to an activation order of power converter phases. For example, prior to time t12e, the controller according to embodiments herein activated the power converter phases in the following order: SW1, SW2, SW3, and SW4. Based on detected current imbalances as a result of the transient at time td, the controller according to embodiments herein initiates an activation ordering as SW2, SW3, SW4, SW1 between time t12e and time t16e. Based on detected current imbalances as a result of the transient at time te, the controller according to embodiments herein initiates an activation ordering as SW3, SW4, SW2, SW1 between time t16e and time t20e.

One way to re-sequence the switches associated with each of the power converter phases is to modify the sequencing and/or timing of one or more switches if an accumulated value exceeds a pre-determined threshold (e.g., the Threshold Value). In FIG. 35A, for example, at time tv during the first illustrated operating cycle, CTR1 of accumulator #1 exceeds the Threshold Value, TH, setting Accumulator Flag #1 (not shown). Thereafter, a current transient occurs at time td, early in the second operating cycle (between times t12e and t16e). Absent the transient, the sequence of switches (illustrated in FIG. 32) would call for switch SW1 to be turned on at time t13. However, because Accumulator Flag #1 is set, and because the next switch to be turned on will have its turn-on time extended in response to the current transient at td, the switch controller (e.g., FNLC 446 and/or PWM Generator 448, FIG. 17) re-sequences the activation of phases or switches so that SW2, instead of SW1, is the first switch to turn on in response to the transient at time td. As a result, as shown in FIGS. 35A, 35B, 35C, 35D, and 35E, the new sequence of switches during the second operating cycle (e.g., between time t13 and time t16e) is SW2, followed by SW3, followed by SW4, followed by SW1. By this means, instead of yet more current building up and flowing in the phase 1 inductor of power converter phase 415, additional current instead builds up in the phase 2 inductor of power converter phase 414, mitigating further divergence in currents among the phases.

Another way to re-sequence the switches is to modify the sequencing and/or timing of one or more power switches based upon the relative values in the accumulators. In FIG. 35A, for example, another current transient occurs at time te, early in the third operating cycle (between times t16e and t20e). At the time of the current transient, the accumulator for phase 1 contains the highest value (CTR1), the accumulator for phase 2 contains the next highest value (CTR2) and the accumulators for phases 3 and 4 both contain zero. According to one embodiment, the switch controller (e.g., FNLC and/or PWM Generator, FIG. 17) may re-sequence the switches so that switches are turned on in a sequence from lowest to highest accumulator based on corresponding values of counters in the accumulators. In such an embodiment, the activation of power converter phases for the third cycle can be as follows: switch SW3 will be turned on first (and extended in duration to compensate for the current transient at time te), followed by SW4, followed by SW2, followed by SW1.

In a power converter of the kind shown in FIG. 17, comprising a first non-linear controller 446, a PWM generator 448, and an average phase current balancing circuit 451 such as the type as discussed in related earlier filed U.S. patent application Ser. No. 11/897,290 entitled "METHOD AND APPARATUS FOR EQUALIZING PHASE CURRENTS IN MULTIPHASE SWITCHING POWER CONVERTERS," filed on Aug. 30, 2007, the entire teachings of which are incorporated herein by this reference.

The phase imbalance detection and control circuit 900 and corresponding high speed current balancing techniques described with reference to FIGS. 30-35 may be invoked in coordination with FNLC operation. During periods of "normal" operation (i.e., under PID control), average phase current balancing may be invoked via average current balancing circuit 451. However, when a current transient occurs with respect to load 420 requiring FNLC 446 intervention as discussed above, high speed current balancing can be invoked by means of phase imbalance detection and control circuitry (e.g., control circuit 900, FIG. 31) and an associated algorithm 3400. Once "normal" operation resumes (e.g., when there are no longer transient load conditions), the high speed current balancing process may be disabled and all accumulators reset to zero.

Note that, according to embodiments herein, the controller 400 of FIG. 17 can include a first non-linear controller and/or a second non-linear controller and/or digital phase imbalance detection and control circuit including, but are not limited to, digital implementation involving logic circuitry, digital processors, memory and software algorithms. One embodiment comprises one or more Application Specific Integrated Circuits ("ASICs"), the ASICs further comprising fixed logic state machines and storage of provisionable parameters, such as threshold values. There are, however, many ways to configure a controller comprising an FNLC according to embodiments herein.

Note that techniques herein are well suited for use in power supply applications. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A power supply system comprising:
   a multiphase switching power converter for delivering power from an input source to a load, the multiphase switching power converter comprising two or more switching power conversion phases, each power conversion phase comprising a respective first switch, and a controller configured to:
monitor an output voltage from the multiphase power converter;
based on the monitoring, detect: i) a magnitude of an error signal representing a difference between the output voltage and a predetermined setpoint value, and ii) a rate-of-change associated with the output voltage;
turn on the phase switches in a sequence, the time between the turning-on of successive switches under steady-state load conditions defining a phase period, and
in response to detecting that the rate-of-change associated with the output voltage exceeds a slope threshold, determine a duration of a modified phase period, the length of the modified phase period depending on the magnitude of the error signal.

2. The power supply system of claim 1 in which detection comprises sampling and the controller is configured to determine a duration of a modified phase period at a sampling rate that is greater than a rate at which successive switches are turned on.

3. The power supply system of claim 2 in which, based on detection of successively larger magnitudes of the error signal over successive error signal samples, the duration of the modified phase period is reduced.

4. The power supply system of claim 1 in which the duration of the modified phase period decreases as the rate-of-change associated with the output voltage increases.

5. The power supply system of claim 1 in which the controller turns on the next phase switch in the sequence if the time that has elapsed since a time of turning-on of the last phase switch is greater than or equal to the duration of the modified phase period.

6. The power supply system of claim 1 in which the duration of the modified phase period is determined using a pre-defined function.

7. The power supply system of claim 6 in which the pre-defined function comprises one or more pre-determined error voltage magnitude threshold values, each magnitude threshold corresponding to a pre-determined value for the duration.

8. The power supply system of claim 1 in which, subsequent to a slope threshold being exceeded, the controller continues to determine the duration of a modified phase period if the magnitude of the error signal exceeds a pre-determined error voltage threshold.

9. The power supply system of claim 1 in which the duration of a modified phase period is a function of how many first switches are turned on.

10. The power supply system of claim 1 in which the phase period comprises a fixed number of sub-periods of equal duration, each sub-period beginning and ending on a sub-period boundary, and in which the controller is configured to determine values for the duration of the modified phase period that correspond to a whole number of sub-periods.

11. The power supply system of claim 10 in which the controller is configured to turn on the next phase switch in the sequence at the sub-period boundary at the end of a first sub-period, if during the said first sub-period, the number of sub-periods that have elapsed since the time of turning-on of the last phase switch is greater than or equal to the said whole number of sub-periods.

12. A power supply system, for delivering power to a load at an output voltage, comprising two or more switching power conversion phases, each power conversion phase comprising a respective phase switch, and a controller, the controller configured to:
monitor an output voltage from the multiphase power converter;
based on the monitoring, detect: i) a magnitude of an error signal representing a relative difference between the output voltage and a predetermined setpoint value, and ii) a rate-of-change associated with the output voltage;
turn on the phase switches in a sequence, the time between the turning-on of successive switches under steady-state load conditions defining a phase period for the multiphase switching power supply, and
compare the magnitude of the error signal and the rate-of-change associated with the output voltage to respective pre-defined threshold criteria, according to an algorithm, and
based on the results of the comparisons, and using a first pre-defined function, determine a delay time between the time that a next phase switch is be turned on in the sequence relative to the turn-on time of the last phase switch that was turned on in the sequence, and:
turn on a next switch at or after the delay time; or
turn on a next switch immediately if, at the time of determination, the determined delay time is greater than or equal to the time that has elapsed since the turn-on time of the last first switch to be turned on.

13. The power supply system of claim 12 in which the controller is further configured to use a second pre-defined function to determine a delay time between the time that the next first switch is be turned on relative to the turn-on time of the last first switch to be turned on, based on the results of the comparison, and:
turn on a next switch after the delay time; or
turn on a next switch immediately if, at the time of determination, the determined delay time is greater than or equal to the time that has elapsed since the turn-on time of the last first switch to be turned on.

14. A method comprising:
monitoring an output voltage generated by a combination of multiple power converter phases that supply power to a load, each of the power converter phases comprising a phase switch;
based on the monitoring, detecting: i) a magnitude of an error signal representing a relative difference between the output voltage and a predetermined setpoint value, and ii) a rate-of-change associated with the output voltage; and
in response to detecting that the rate-of-change associated with the output voltage exceeds a threshold value, adjusting a time of turning on of a phase switch in a first power converter phase of the multiple power converter phases depending on the magnitude of the error signal.

15. The method as in claim 14, wherein adjusting the time of turning on of a phase switch in the first power converter phase further comprises modifying the time of turning on of the phase switch in the first power converter phase relative to a time of turning on of a phase switch in another power converter of the multiple power converters phases.

16. The method as in claim 14, wherein adjusting the time of turning on of a phase switch in the first power converter phase further comprises:
based on detection of successively larger magnitudes of the error signal over multiple error signal sampling cycles, turning on the phase switch in the first power converter phase at earlier times relative to a time at which a phase switch another one of the multiple power converter phases was turned on.

17. The method as in claim 14, wherein detecting the rate of change associated with the output voltage includes:
   detecting that the error signal increases in response to a transient increase in a load current.

18. The method as in claim 14 further comprising:
   prior to detecting that the rate-of-change associated with the output voltage exceeds the threshold value, initiating activation of the multiple power converter phases in a sequential manner one after another to maintain the output voltage within a desired range; and
   wherein adjusting the time of turning on of a phase switch in the first power converter phase includes activating the phase switch in the first power converter phase at least for a portion of time when another phase switch in another one of the multiple power converter phases is also on to deliver current to the load and maintain the output voltage within an acceptable voltage range during a transient increase in the load.

19. The method as in claim 14 further comprising:
   after activating the first power converter phase, detecting that the rate-of-change associated with the output voltage still exceeds the threshold value;
   after waiting a first delay time, initiating activation of a second power converter phase to supply power to the load;
   after activating the second power converter phase, detecting that the rate-of-change associated with the output voltage still exceeds the threshold value;
   after waiting a second delay time, which is greater than the first delay time, initiating activation of a third power converter phase to supply power to the load.

20. The method as in claim 14 further comprising:
   delaying activation of each additional power converter phase of the multiple power converter phases depending on how many of the multiple power converter phases are currently activated.

21. A controller comprising:
   a processor;
   a memory unit that stores instructions associated with a control algorithm;
   an interconnect coupling the processor and the memory unit, the interconnect enabling the processor to execute the application and perform operations of:
      monitor an output voltage generated by a combination of multiple power converter phases that supply power to a load, each of the power converter phases comprising a phase switch;
      based on monitoring of the output voltage, detect: i) a magnitude of an error signal representing a relative difference between the output voltage and a predetermined setpoint value, and ii) a rate-of-change associated with the output voltage; and
      in response to detecting that the rate of change of the output voltage exceeds a threshold value, adjust a time of turning on of a phase switch in a first power converter phase of the multiple power converter phases depending on the magnitude of the error signal.

22. A controller comprising:
   one or more ASICs, comprising a fixed logic state machine and storage registers for storing parameters, such as a threshold value;
   the ASICs configured to perform operations of:
      monitoring an output voltage generated by a combination of multiple power converter phases that supply power to a load, each of the power converter phases comprising a phase switch;
      based on monitoring of the output voltage, detecting: i) a magnitude of an error signal representing a relative difference between the output voltage and a predetermined setpoint value, and ii) a rate-of-change associated with the output voltage; and
      in response to detecting that the rate-of-change associated with the output voltage exceeds a threshold value, adjust a time of turning on of a phase switch in a first power converter phase of the multiple power converter phases depending on the magnitude of the error signal.

23. The power supply system of claim 1 wherein monitoring and detecting a rate-of-change associated with the output voltage comprises monitoring and detecting the rate-of-change of the error signal.

24. The power supply system of claim 1 wherein monitoring and detecting a rate-of-change associated with the output voltage comprises monitoring and detecting the rate-of-change of the output voltage.

25. The method of claim 14 wherein the step of monitoring and detecting a rate-of-change associated with the output voltage comprises monitoring and detecting the rate-of-change of the error signal.

26. The method of claim 14 wherein the step of monitoring and detecting a rate-of-change associated with the output voltage comprises monitoring and detecting the rate-of-change of the output voltage.

27. The power supply system of claim 12 wherein monitoring and detecting a rate-of-change associated with the output voltage comprises monitoring and detecting the rate-of-change of the error signal.

28. The power supply system of claim 12 wherein monitoring and detecting a rate-of-change associated with the output voltage comprises monitoring and detecting the rate-of-change of the output voltage.

* * * * *